(12) United States Patent
Beaumont

(10) Patent No.: US 7,780,895 B2
(45) Date of Patent: Aug. 24, 2010

(54) ADJUSTABLE MELT ROTATION POSITIONING AND METHOD

(75) Inventor: John P. Beaumont, Harborcreek, PA (US)

(73) Assignee: Beaumont Technologies, Inc., Erie, PA (US)

( * ) Notice: Subject to any disclaimer, the term of this patent is extended or adjusted under 35 U.S.C. 154(b) by 1040 days.

(21) Appl. No.: 11/434,806

(22) Filed: May 17, 2006

(65) Prior Publication Data
US 2006/0261521 A1 Nov. 23, 2006

Related U.S. Application Data

(60) Provisional application No. 60/681,442, filed on May 17, 2005.

(51) Int. Cl.
*B29C 45/17* (2006.01)
(52) U.S. Cl. .............................. 264/328.12; 264/328.1; 264/328.17; 264/328.18; 425/562
(58) Field of Classification Search ........................ None
See application file for complete search history.

(56) References Cited

U.S. PATENT DOCUMENTS

| | | | |
|---|---|---|---|
| 5,441,680 A | 8/1995 | Guergov | 264/40.1 |
| 5,683,731 A | 11/1997 | Deardurff et al. | 425/572 |
| 6,001,296 A | 12/1999 | Rodenburgh et al. | 264/328.12 |
| 6,027,328 A | 2/2000 | Herbst | 425/553 |
| 6,077,470 A | 6/2000 | Beaumont | |
| 6,503,438 B2 | 1/2003 | Beaumont et al. | |
| 6,852,268 B1 | 2/2005 | Valyi et al. | 264/510 |
| 2004/0164459 A1 | 8/2004 | Babin et al. | 264/328.15 |

FOREIGN PATENT DOCUMENTS

| | | |
|---|---|---|
| GB | 1570853 | 7/1980 |
| JP | 02283412 | 11/1990 |
| JP | 04251652 | 9/1992 |
| JP | 09141704 | 6/1997 |
| WO | WO 03/057448 A1 | 7/2003 |

OTHER PUBLICATIONS

PCT Written Opinion of the International Searching Authority, dated Sep. 6, 2007.
European Search Report dated Apr. 22, 2009.

*Primary Examiner*—Monica A Huson
(74) *Attorney, Agent, or Firm*—Edward W. Goebel, Jr.; Jonathan M. D'Silva; MacDonald, Illig, Jones & Britton LLP

(57) ABSTRACT

Methods and apparatus adjustably control the repositioning of non-homogeneous fluid conditions across the stream of a laminar flowing fluid to a desirable circumferential position. The invention is particularly applicable to controlling non-homogeneous melt conditions in hot or cold runner systems. Various mechanisms are provided that enable simple adjustments of a flow diverter within a fluid rotation device, making either static or dynamic adjustments, so that the degree of fluid flow repositioning in a runner system can be changed without the need for mold disassembly or retooling. Various forms of actuators effect adjustment and may be manually manipulated or manipulated through various powered devices.

90 Claims, 35 Drawing Sheets

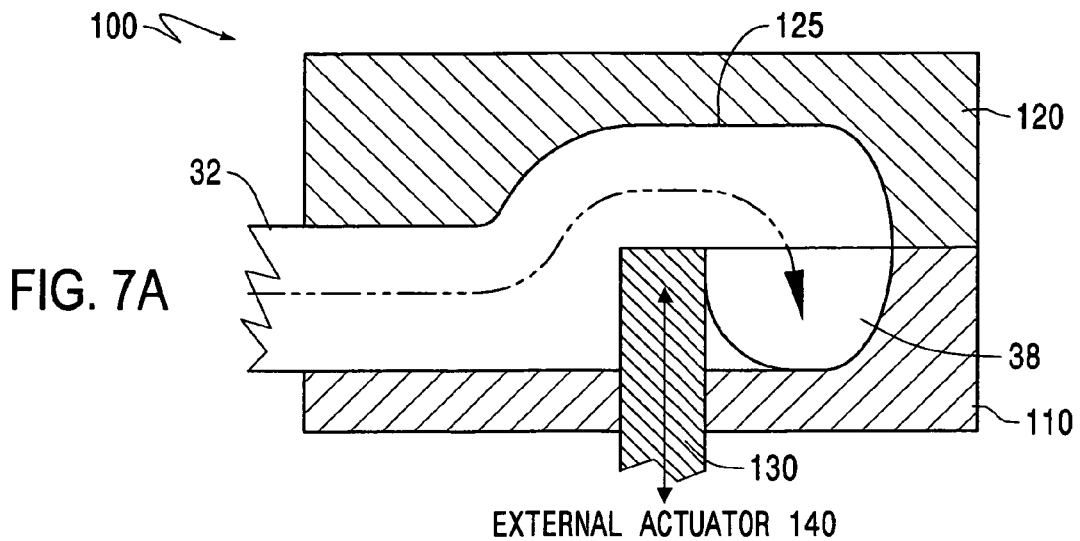
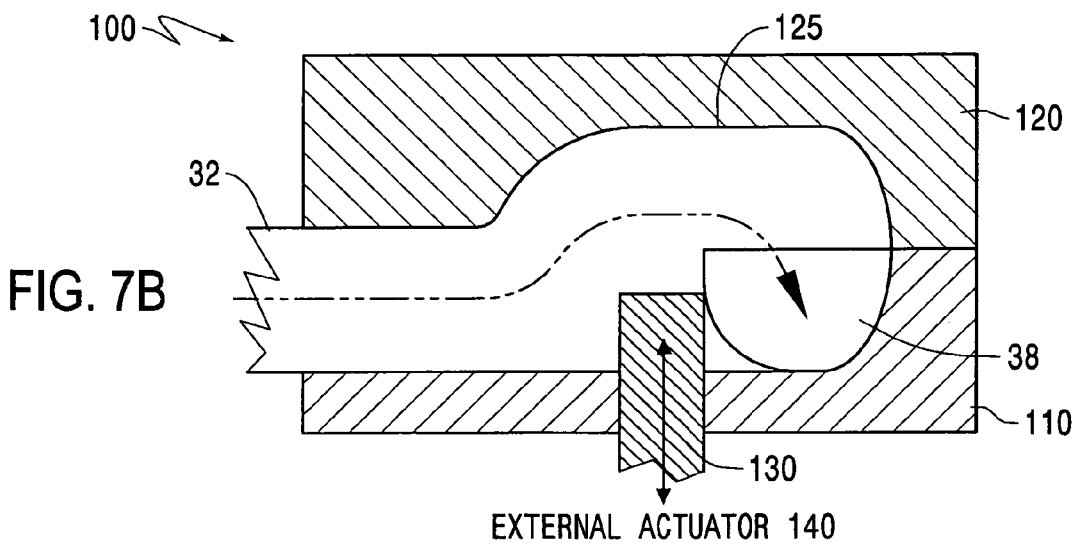
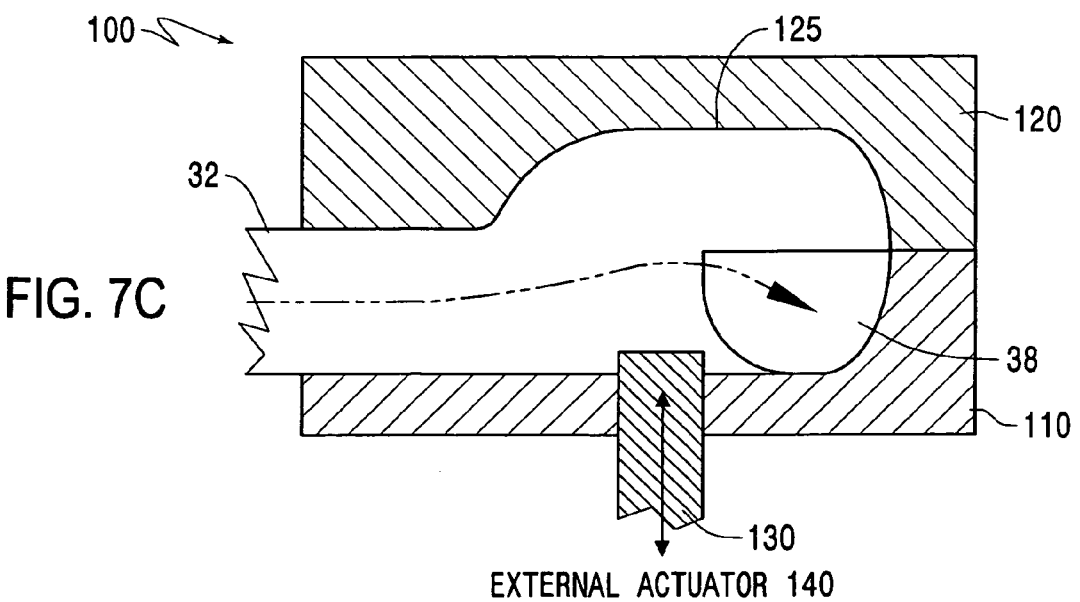

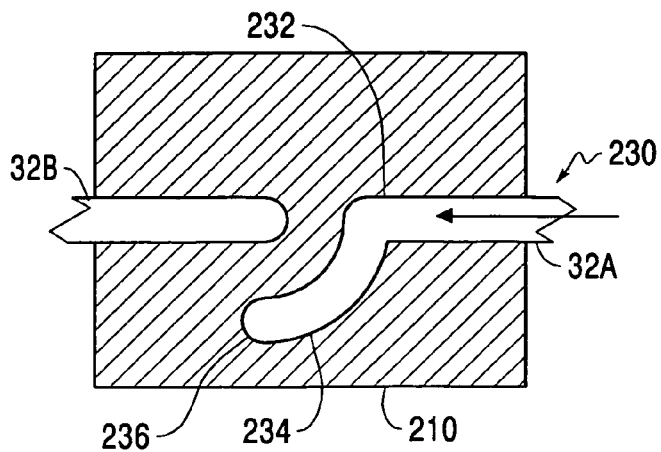
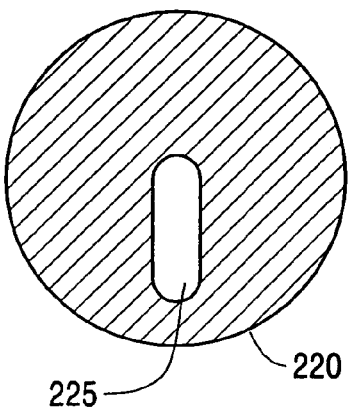
FIG. 21A  FIG. 21B
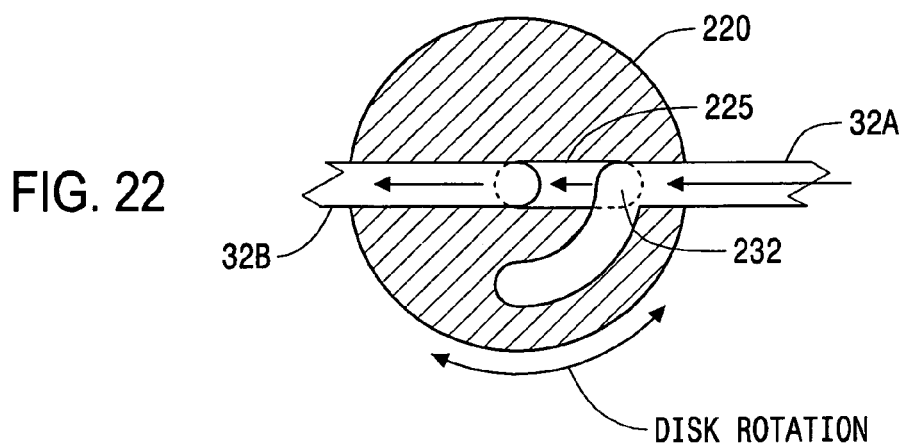
FIG. 22
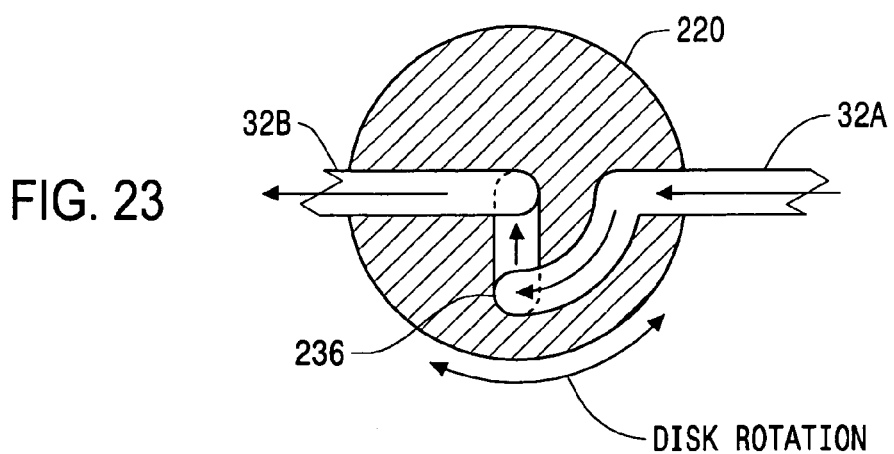
FIG. 23

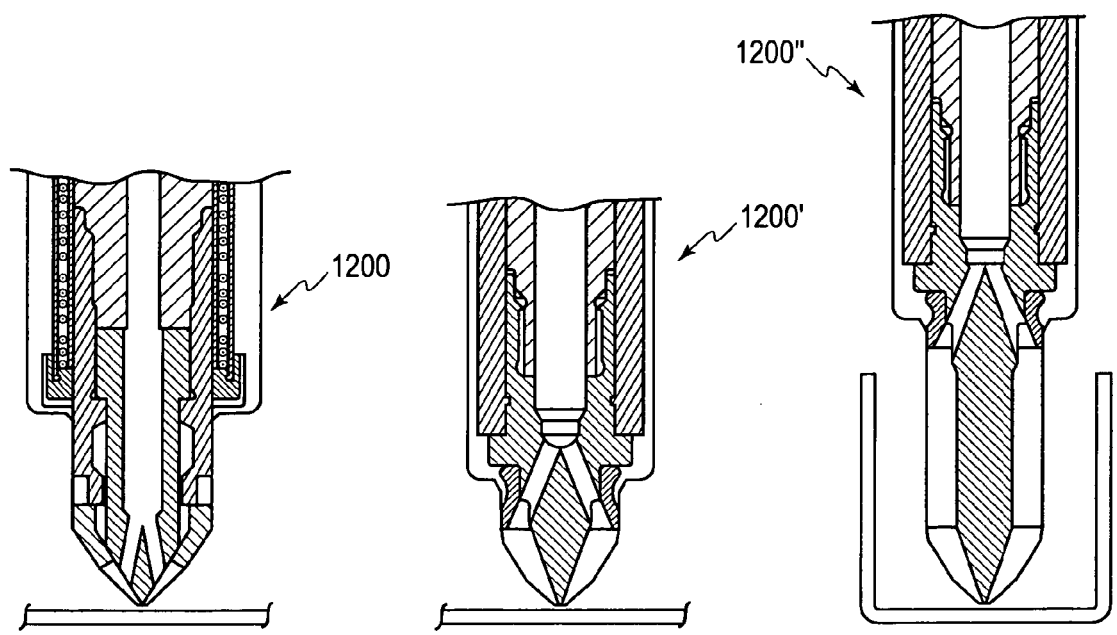
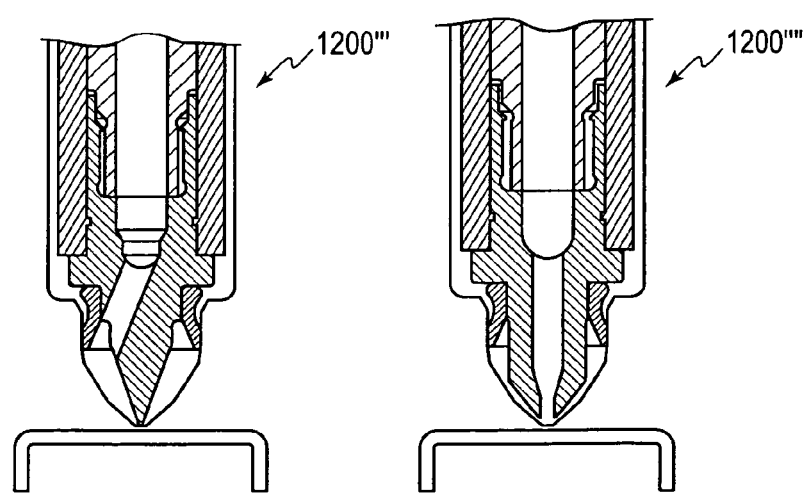
FIG. 58A  FIG. 58B  FIG. 58C
FIG. 58D  FIG. 58E

ADJUSTABLE MELT ROTATION POSITIONING AND METHOD

CROSS-REFERENCE TO RELATED APPLICATIONS

This is a non-provisional application claiming priority under 35 U.S.C. §119(e) to U.S. Provisional Application Ser. No. 60/681,442, filed on May 17, 2005, incorporated herein by reference in its entirety.

BACKGROUND

This invention relates to methods and apparatus for adjustably controlling the repositioning of non-homogeneous melt conditions across the stream of a laminar flowing fluid to a desirable circumferential position. The invention is particularly useful in cold-runner or hot-runner molding systems that flow a stream of laminar flowing material, such as molten plastic, into a single or multiple cavity mold through at least one runner flowing a non-homogeneous melt.

In multi-cavity molds, it is important for the material to be uniformly delivered to each of the cavities. However, significant shear and thermal variations are developed in a polymer melt as it flows through a runner, creating non-homogeneous melt conditions that may be asymmetrical or symmetrical across the flow stream. Such variations may result in cavity to cavity mold filling imbalances of more than 30%. These same melt variations may also cause problems while filling a given cavity within multi or single cavity molds. For example, such melt variations may create unanticipated filling patterns within a part forming cavity and affect the physical attributes of the molded part, such as shrinkage or warpage.

When molding parts using multi-cavity molds, it is standard practice to geometrically balance the runner system in order to help provide the required mold filling consistency. In geometrically balanced runners, each cavity is fed by runner sections having the same lengths, cross-sectional size and shape. The same concept of a geometrically balanced runner system may also be applied to multiple runner branches that may be feeding a single part at multiple locations. However, despite the geometrical balance, it has been observed that mold filling using this balanced runner design still results in imbalance. Specifically, as described in U.S. Pat. No. 6,077,470 to Beaumont and U.S. Pat. No. 6,503,438 to Beaumont et al., parts formed in the cavities on the inside branches are often of a different size or weight than are the parts formed in the other cavities.

In particular, it has been found that even with a geometrically balanced runner system, a flow-induced cavity filling imbalance exists. Several factors act to create this imbalance, including a non-symmetrical shear distribution developed within a laminar flowing material as it travels through the runner system. Flow imbalance can also be created by a non-symmetrical temperature distribution developed across the melt stream. Both of these non-symmetrical conditions can result in variations in the viscosity across the stream of flowing material and, in some cases, in its structure.

Various manufacturing processes and apparatus use laminar flowing material flowing through one or more tools, such as dies or molds, in the formation of products. These tools have various part forming geometries used to shape the laminar flowing materials into desired products. As used hereinafter, the term "tool" includes all of the components within the body of an entire mold or die used to produce one or more products. Normally, tools of these types are constructed of high strength materials, such as tool steels or aluminum alloys having a very high compression yield strength, so as to withstand the pressure which forces the laminar flowing material through flow paths within the tools. These flow paths are commonly referred to by terms such as channels or runners, depending on the actual manufacturing process or tool being used. The terms "runner" and "runner system" will be used hereinafter to mean a flow path through a tool for laminar flowing material.

Typical cross sectional shapes of runners include, but are not limited to, full round, half round, trapezoidal, modified trapezoidal or parabolic, and rectangular. Runners maybe solidifying or non-solidifying. For example, in thermoplastic injection molding processes, laminar flowing material in cold runners solidifies during the manufacture of products and is ejected from the tool during each cycle of the process. Whereas, hot runners are typically machined inside a block of high strength material and heated within the block so that the laminar flowing material within the hot runners remains fluid and is not ejected. Some tools may contain both hot runners and cold runners.

Manufacturing processes using tools and runner systems of the types described above include, but are not limited to, injection molding, transfer molding, blow molding and extrusion molding. The materials typically used in these processes include thermoplastics, thermosets, powdered metal and ceramics employing laminar flowing carriers, such as polymers. While this invention is useful for manufacturing methods and for apparatus which use the materials described above, this invention can be used to correct imbalances occurring in any tool in which imbalances occur in runners carrying a fluid exhibiting laminar flow and having a viscosity which is affected by shear rate (as with a non-Newtonian fluid) and/or by temperature, that is a fluid exhibiting variations in its characteristics as a result of variations in shear or flow velocity across the cross section of a runner.

Molding processes produce products by flowing laminar flowing material from a material source and through a runner system in a tool to an area or areas where the material is used to form the product. Molding processes include injection and transfer molding, in which laminar flowing material is injected under high pressure into a tool and through the runner system to a cavity or cavities in the tool (called a mold). The mold may have a single parting plane which separates two mold halves for forming molded items, or the mold may be a stack mold which has more than one parting plane, each separating a pair of mold halves. The material flows in concentric laminates through runners of whichever shape is used for a tool by following the center of the path of the runners.

Another manufacturing process using laminar flowing materials flowing in a runner system through a tool is extrusion blow molding. In the extrusion blow molding process, laminar flowing material is fed from a material source through a tool which includes a single runner or a branched runner system. After the material is fed through the runner system, it passes around a normally torpedo shaped insert near the end of the runner system which is used to form the solid stream of laminar flowing material into a tube, or profile, of material exiting the die. This tube of material is normally referred to as a parison. As the parison continues to lengthen to its desired length, it is clamped between two halves of a tool closing around it, and the tool then normally pinches off the bottom of the parison. Next, air is injected inside the tube of material, causing the material to expand against part forming walls of the tool. The material inside the tool is then cooled, solidifies, and is ejected after the tool is opened at the end of each production cycle. The tool then returns into position to grab another parison.

Yet another process using laminar flowing material flowing in a runner system through a tool is extrusion. In extrusion processes the laminar flowing material is normally, continuously fed from a material source through a die having a single runner or a branched runner system to be delivered to a part forming geometry which shapes the material as it exits at the end of the die. The extrusion process is normally referred to as a steady-state process and produces continuous shapes, or profiles, such as pipes or the coatings on electrical wires. As the laminar flowing material exits the part forming die, the material is normally drawn through a coolant, such as water, where it takes on its final shape as it solidifies.

Regardless of process and the type of molding system used, as a laminar flowing material flows through a runner, material near the perimeter of the runner experiences high shear conditions, whereas the material near the center experiences low shear conditions. These shear conditions are developed from the velocity of the flowing material relative to the stationary boundary of the flow channel and the relative velocity of the laminates of material flowing through the channel. FIG. 1 illustrates a characteristic shear rate distribution across the diameter "d" of a runner, where the magnitude of the shear rate is shown on the horizontal axis and the diameter is shown on the vertical axis. Shear rate is normally at or near zero at the outermost perimeter of a runner, is at its maximum level near the perimeter of the runner, and is then reduced to a level at or near zero in the center of the runner. As shown in the cross-section of runner 20 in FIG. 2, a predominantly high shear region 22 forms around the inner periphery of the runner while a predominantly low shear region 24 forms around the center.

Material in the high shear region 22 gains heat from friction caused by the relative velocity of the laminates as the laminar flowing material flows through the runner. This heat, and the effects of the shear on the non-Newtonian characteristics of polymers and other laminar flowing materials, normally causes the high sheared material near the perimeter of the runner to have a lower viscosity. Because of this lowered viscosity, fluid in this region flows more readily than the material in the center of the runner.

The effects on the flow of laminar flowing material and products produced by this material are dominated by the contrasts of the characteristics between the high sheared region 22 and the low sheared region 24. Initially, the high and low sheared regions of material are significantly balanced about bisecting planes 26 and 28. Thus, they are "significantly balanced" from side-to-side or across a plane at a particular location in a runner. This results in a variation of a symmetrical non-homogeneous melt condition being developed across the flow channel.

Although flow may be initially balanced as shown in FIG. 2, non-balanced conditions develop in a runner system when a first runner section, such as runner 20, branches in two or more directions. Because flow is laminar, when a branch in the runner occurs, the high sheared, hotter material along the perimeter remains in its relative outer position. However, the inner material is split and is now positioned on the opposite side of the flow channel from the high sheared hotter material. This creates a side-to-side variation between upcoming side-to-side branching runners, or in a mold cavity, where the high sheared hotter material will flow to one side and the low sheared cooler material will flow to the other side. This variation will be described briefly with respect to FIG. 3.

Runner 20 may be a sprue, which is a specially designed runner that conveys material from a material source such as an injection molding machine. Alternatively, runner 20 may be a runner at a selected location in a tool. Cross-section AA in FIG. 3A shows the initial symmetrical conditions about the planes 26 and 28, the same as are depicted in FIG. 2. As runner 20 branches in two directions, each branch 30,32 receives equal portions of high and low sheared material. The high and low sheared material on the left side of runner 20 flows to the left branching runner 30, and the high and low sheared material on the right side of runner 20 flows to the right branching runner 32. The two halves of material from runner 20 will reform to an approximate shape of the branch runners 30 and 32. Assuming the material is flowing from top to bottom of runner 20, the high and low sheared material from runner 20 will distribute itself in runners 30 and 32 in the approximate positions and shapes illustrated in section BB of runner 32, which are shown in FIG. 3B.

As can be seen in FIG. 3B, due to the laminar flowing conditions of the material, the flow of material in runner 20 causes most of the high sheared material near the periphery of runner 20 to remain as high sheared material 31 on the top side of both of the branching runners 30 and 32. The low sheared material at the center of runner 20 flows to the bottom of the branch runners 30 and 32 and is shown as low sheared material 33. The distribution of the high sheared material 31 and the low sheared material 33 in runner 32 in FIG. 3B is symmetrical about plane 34. Thus, the distribution remains significantly balanced side-to-side across plane 34, which bisects the length of runner 32, as well as bisects runner 20. However, the distribution of high sheared material 31 and the low sheared material 33 is now unbalanced from side-to-side across horizontal plane 36, which bisects runner 32 and is perpendicular to plane 34. The results is a non-homogeneous melt condition which is symmetrical across plane 34 and non-symmetrical across plane 36.

Referring once again back to FIG. 3, the branch runner 32 itself branches in two directions through runner 38, which extends toward the top of FIG. 3, and runner 40, which extends toward the bottom of FIG. 3. Due to the laminar nature of the material, most or all of the high sheared material 31 at the top of runner 32, see FIG. 3B, flows into runner 38 and primarily or solely low sheared material 33 flows into runner 40. FIG. 3C shows the high sheared material 31 at Section CC of runner 38 and FIG. 3D shows the low sheared material 33 at Section DD of runner 40. The actual distribution of the high sheared material 31 across the cross section of runner 32 in any tool will determine how much, if any, of the high sheared material flows in runner 40 and, thus, whether most or all of the high sheared material 31 flows in runner 38.

Thus, laminar flow through successive branches of a runner system has the effect of shifting the flow distribution to a symmetrically unbalanced state. This imbalance leads to problems with flow-induced cavity fill. The imbalance further results in product differences and/or differences in material from one cavity to the next in a multi-cavity mold, such as differences in viscosity, temperature, cooling rate, shrinkage, and warpage. Additionally, the imbalance increases clamp tonnage, i.e., the force at which mold portions are pressed together, necessary for the mold to absorb pressure surges caused by the imbalance and non-parallel mold filling.

FIGS. 3A-D only consider the effect of the primary runner on the distribution. Other factors also affect the distribution of the flow, including those caused by the molding machine nozzle or the mold sprue. FIG. 4A shows the positioning of the high sheared laminates in a runner as a result of shear developed solely due to sprue or nozzle effect. Here, the high sheared material is distributed on the sprue side (top) of the primary runner 32 and then onto the top inner side of the branching secondary runner 38, 40 in a region 31A. As a result, the high sheared laminates exiting the secondary branching 38, 40 have symmetry about an axis A as shown, which is at an angle relative to the vertical.

FIG. 4B shows the positioning of the high sheared laminates in the runner solely as a result of shear caused by the flow through the primary runner and the branching runner. Thus, FIG. 4B corresponds to FIG. 3C and has a high shear laminate in a region 31B that is axisymmetric as it travels along the primary runner until it branches off into the secondary runner 38, 40. At that time, the high sheared material becomes positioned on the sprue side of the secondary runner, as shown, to have symmetry with horizontal axis B.

FIG. 4C shows the resultant positioning of the high sheared laminates in the runner as a result of the combination of sprue and runner effects. This can be better visualized by FIG. 4D, which shows the additive effect of the combination. In particular, there is an overlap region 31A'B' formed from overlapping portions of regions 31A and 31B, combined with remaining portions of regions 31A and 31B. The combination has a resultant axis of symmetry that is centered about axis C, located between axes A and B as shown. As a result, the material feeding a downstream side-to-side branching runner will receive asymmetric conditions, which will normally cause the high sheared material to feed the cavities on the sprue side of the secondary runner first.

Recently, there have been developed methods and apparatus to control a repositioning of the asymmetric conditions across the stream of a laminar flowing fluid to a desirable position. This repositioning, referred to in the art of plastics molding as melt rotation technology, has been accomplished through a wide variety of designs and methods as taught in U.S. Pat. No. 6,077,470 to Beaumont and U.S. Pat. No. 6,503,438 to Beaumont et al., both of which are hereby incorporated herein by reference in their entireties and currently marketed and licensed as incorporating Meltflipper® technology. These prior methods use laminar fluid rotation devices with fixed flow geometries to achieve a calculated repositioning or rotation of the laminar fluid stream.

Typical laminar fluid rotation devices are created by machining a desired geometry into a mold or manifold surface or into a steel insert to be fit into the mold or manifold. For example, as shown in FIG. 5, two mold insert halves 110, 120 are machined to form a transitional area between branching runners. This transitional area causes a predetermined flow geometry, achieving an elevation change and a circumferential repositioning of the laminar fluid flow.

Conventionally, a laminar fluid rotation device was designed to achieve a desired circumferential repositioning of the laminar fluid to improve mold cavity filling and melt distribution through management of flow-induced melt variations. Commonly, this means designing the runner system to achieve a desirable rotation at one or more runner intersections or inline within a runner to reposition the orientation of the laminar stream to achieve a desired distribution of material. This technology does not typically achieve a homogeneous distribution of fluid to each cavity, as may be done using a static mixer, and may not eliminate asymmetric flow conditions. Rather, the technology takes advantage of the laminar flow structure to manage the conditions at downstream branches and mold cavities through controlled rotation of the stratified laminar stream.

Various examples of conventional prior art fixed structure fluid rotation devices are shown in the cross-sectional views of FIGS. 5A-C taken along the centerline of first runner section 32. These particular examples are formed from two machined mold insert halves 110 and 120. Section 100 includes channeling formed in the lower mold half 110 that corresponds to an intersection of the first runner section 32 and second runner section 38.

Although primary sections of runners 32 and 38 are commonly round in cross-section, for ease in manufacture of the molding insert halves and to facilitate ejection of the frozen runner in cold runner systems, portions of the runner in section 100 have been formed with a U-shaped cross-section, such as that shown in FIGS. 5A-C. That is, the runners through the flow rotation device 100 have a flat upper surface as shown formed from a flat face of upper mold insert 120.

A flow diverter section 115 is provided in the flow path to force the flow upwards to make an angular elevation change into a runner region 125 of the upper mold half 120. At the end of the region 125, the region transitions into second runner section 38. This flow channel path of FIG. 5A, which achieves a full elevation change, causes the asymmetrical fluid conditions to be rotated by roughly 90° (more realistically 80°) along the circumference of the flow channel, as more fully described in the above Beaumont patents.

FIGS. 5B-C show different mold geometries that have been modified through remachining or other method to have the flow design changed to reflect a different resultant elevation change. This allows for a circumferential repositioning of the asymmetrical fluid conditions in the runner by lesser amounts. That is, by having different heights of the flow diverter sections 115' and 115", and thus reducing the elevation change, repositioning of the laminar fluid flow to lesser degrees can be achieved. To better illustrate how elevation change effects the circumferential repositioning of the laminar fluid, FIG. 6 shows various elevational changes and approximate resultant degree of fluid flow rotation achieved.

Use of one or more correctly designed laminar fluid rotation devices in a runner system nearly always resulted in an improved fluid flow compared to runner flow without the laminar fluid rotation devices. However, due to the complex nature of the laminar flow and the interactive influences of the sprue or previous branches on the asymmetric melt conditions, a design that achieves an optimum positioning of the non-homogeneous conditions cannot always be determined without actual molding trials or use of expensive and time-consuming simulation methods.

Accordingly, current methods of melt rotation do not always result in a complete success in positioning of non-homogeneous melt conditions through melt rotation. In view of this, modification of the fluid rotation geometry was sometimes necessary to achieve a desired flow uniformity or control. For example, it may have been initially determined that a circumferential rotation of the flow stream by about 90° was desired and an initial fluid rotation device made as shown in FIG. 5A. However, after experimentation through molding trials or the like, it is realized that this design does not achieve a desired repositioning of the melt conditions (for example, there may still be an imbalance causing one or more mold cavities to fill unevenly). As a result, it may be sometimes necessary to modify the mold components by removing the mold insert and modifying the fluid rotation geometry, typically by welding or remachining of an original geometry in the mold, mold insert or hot runner manifold to adjust the profile of the flow diverter section 115 to achieve a slight adjustment in repositioning of the fluid flow. For example, the mold insert may need to be machined to have a flow diverter section changed to that shown in either FIG. 5B or 5C to achieve a desired melt rotation with an advantageous positioning of the symmetrical or non-symmetrical melt conditions.

SUMMARY

Although it is possible to attain a suitable fluid rotation device design using current methodologies, this process of trial and error modifying of fixed structure is both costly and time consuming. Redesign of the runner may require repeated machining of original insert geometry to achieve different elevation change and flow repositioning characteristics, which is costly. Redesign may include, for example, remachining of the mold, mold insert or hot runner manifold geometry by shaving down the flow inverter section 115 to a lower profile illustrated by inverters 115' and 115" in FIGS. 5B and 5C. Making incremental machining changes and running numerous trial and error tests to optimize flow between each machining operation is time consuming and expensive. This is because disassembly of the mold and transportation of the mold inserts to a machining facility for repairs are necessary.

Existing fluid rotation technology is beneficial in providing desirable positioning of non-homogeneous melt conditions, but is capable of improvement. Current fixed-geometry fluid rotation devices, such as those marketed and licensed under the Beaumont Meltflipper® technology, are not adjusted while mounted insitu in the mold (i.e., at the site of the mold). Accordingly, unnecessary down time of the molding machine and remachining of the fluid rotation device geometry may be necessary to fine tune or optimize laminar flow for a particular runner system. Additionally, current fixed-geometry fluid rotation devices are not capable of accommodating changes to one or more molding parameters that would affect flow. Thus, each design or process change to the overall mold design may require a customized fluid rotation device design.

Accordingly, there is a need for improved apparatus and methods that can readily accommodate flow geometry redesign or complexity to achieve a more optimized output condition. Preferably, such apparatus and methods should be able to adjust flow geometry while the fluid rotation device remains insitu (at the site of the mold) and without requiring a completely new fluid rotation device mold or remachining of an existing mold or hot runner manifold.

There also is a need for improved methods and apparatus that enable quick and precise adjustment of the flow channel geometry to achieve desired fluid flow repositioning to correct imbalance conditions in a laminar flowing fluid moving in a hot or cold runner system or to otherwise adjust the non-homogeneous melt conditions to a desired state.

In exemplary embodiments, various mechanisms are provided that enable insitu adjustments of a laminar fluid rotation device flow diverter so that the degree of fluid flow repositioning in a runner system can be changed, without the need for extensive mold disassembly or retooling. Adjustments can be made manually or automatically and may include static or dynamic adjustments. Such adjustable fluid rotation devices are particularly useful in cold runner molding systems, but are also applicable to hot runner systems used in injection molding. Additionally, such devices could be useful in other processes, such as extrusion or extrusion blow molding.

In a first exemplary embodiment, an extendible pin is adjustably mounted in the flow channel near an intersection of a runner branch branching in one or more directions. By extending or retracting the height of the pin, the flow diverter geometry and elevation change can be modified to adjust laminar flow repositioning.

Adjustment of the pin position in the flow channel can be achieved through a manually operated actuator mechanism or a machine-driven actuator mechanism, or by simple replacement of the pin with pins of varying height.

In a second exemplary embodiment, a rotatable notched disk is provided as a flow diverter in the flow channel. The rotatable disk is adjusted to control the flow channel geometry and elevation change, allowing a change in the degree of fluid flow repositioning.

Adjustment of the rotatable disk can be achieved through a manually operated actuator mechanism or a machine-driven actuator mechanism.

In a third exemplary embodiment, an adjustable fluid rotation device is provided having a flow path that can be adjusted through rotation of one mold insert half relative to a mating mold insert half. In exemplary embodiments, the fluid rotation device can achieve circumferential repositioning of anywhere from 0 to up to +/−180° circumferential fluid flow rotation. Additionally, in the third embodiment, the adjustable fluid rotation device can be located anywhere along the runner, including at straight sections of the runner, by having an inline configuration. Thus, it is not necessary that the flow diverter be provided at a branching intersection.

In accordance with various exemplary embodiments, numerous methods of insitu flow diverter adjustment are provided that enable fine tuning of fluid flow circumferential repositioning. In certain embodiments, methods of adjustment are performed manually while the mold is inoperative. In other embodiments, methods of adjustment can be automated and controlled through open or closed loop control. In further embodiments, dynamic methods of adjustment are provided that change the fluid flow repositioning dynamically during a molding operation to create a flow path that can change over time to precisely control the flow front of the material flowing through a mold.

In accordance with various exemplary embodiments, methods and apparatus for insitu flow diverter adjustment are provided to reposition non-homogeneous melt conditions for a given purpose, such as control or influence of shrinkage, warpage and mechanical properties. The methods and apparatus may be used to fill a single or multiple cavity mold and may be provided anywhere in the runner.

In accordance with various embodiments, a method of adjusting the rotational positioning in the circumferential direction of multiple streams of laminar flowing fluid includes positioning the non-homogeneous melt conditions within the individual streams of laminar flowing material to a desirable position by the movement or replacement of a portion of the geometry defining the flow path and recombining the melt streams into a single melt stream to achieve a desirable distribution within the combined streams of laminar flowing fluid.

Those skilled in the art will realize that this invention is capable of embodiments that are different from those shown and that the details of the method and mold structure can be changed in various manners without departing from the scope of this invention. Accordingly, the drawings and description are to be regarded as illustrative in nature and are not to restrict the scope of the invention.

BRIEF DESCRIPTION OF THE DRAWINGS

Exemplary embodiments will be described with reference to the drawings, wherein:

FIGS. 7A-C are partial cross-sectional views of a first exemplary fluid rotation device having a linearly adjustable flow diverter section shown in three distinct adjustment configurations;

FIG. 21A is a top view of a first mold half useful to form an adjustable inline fluid rotation device according to a third embodiment;

FIG. 21B is a bottom view of a second half mold insert for use with the mold half of FIG. 21A to form an adjustable inline fluid rotation device;

FIG. 22 is a bottom view of the first and second mold insert halves of FIGS. 21A-B combined and provided in a first exemplary extreme position to provide 0° fluid flow repositioning (with the lower first mold half being omitted for clarity);

FIG. 23 is a bottom view of the first and second mold insert halves of FIGS. 21A-B combined and provided in a second exemplary extreme position to provide an approximate 180° fluid flow repositioning (with the lower first mold half being omitted for clarity);

FIG. 58 is a cross-sectional view of various conventional hot runner nozzle tip designs;

DETAILED DESCRIPTION OF EMBODIMENTS

Figure 1:
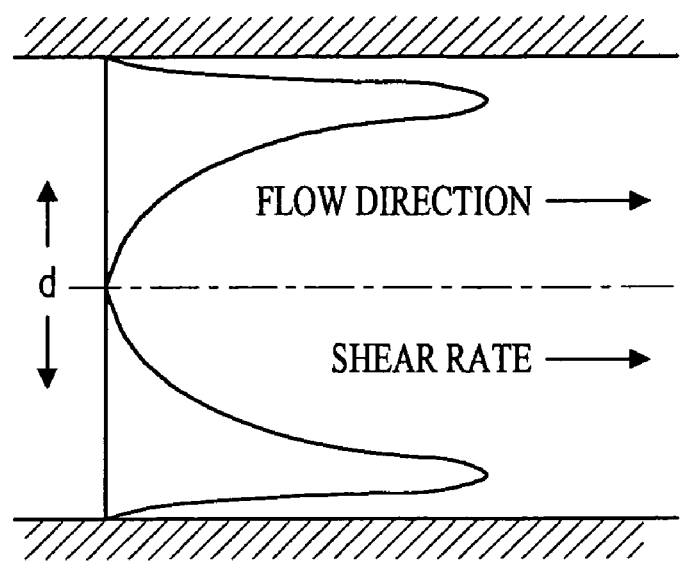
FIG. 1 is a conceptual, cross-sectional view of a runner depicting the development of shear along the flow path of the runner.
Figure 2:
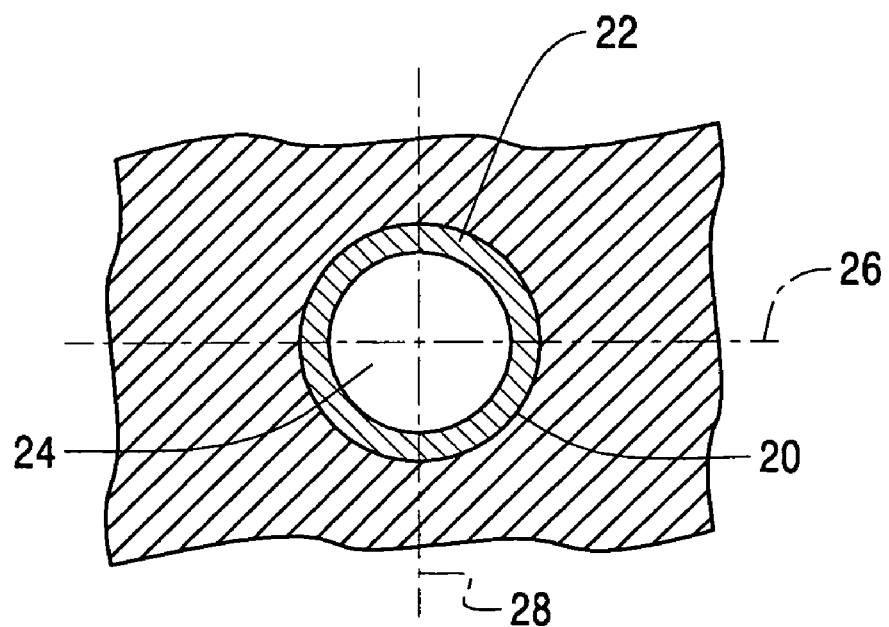
FIG. 2 is a conceptual, cross-sectional view of a runner depicting non-homogeneous symmetrical zones of high and low sheared flow distribution prior to branching.
Figure 3:
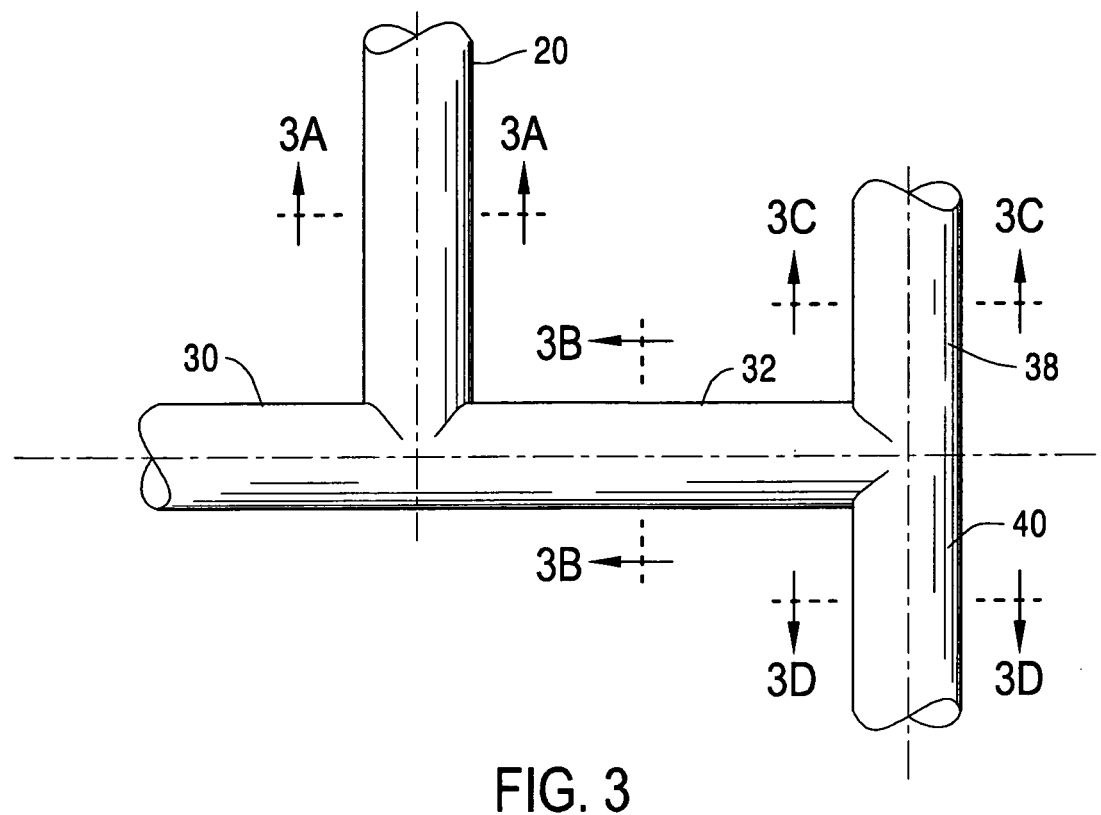
FIG. 3 is an outside view of a branching runner that branches into a pair of branch runners.
Figure 3A:
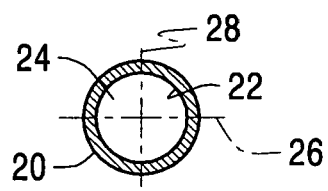
FIG. 3A is a conceptual, cross-sectional view depicting relative zones of high and low sheared laminar flow distribution in the runner prior to branching taken along line A-A.
Figure 3B:
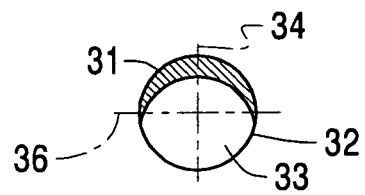
FIG. 3B is a conceptual, cross-sectional view depicting relative zones of high and low sheared laminar flow distribution in the runner taken along line B-B after branching from a first runner.
Figure 3C:
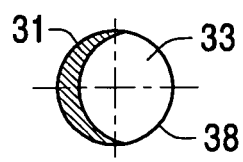
FIG. 3C is a conceptual, cross-sectional view depicting relative zones of high and low sheared laminar flow distribution in the runner taken along line C-C taken after branching from a branching runner.
Figure 3D:
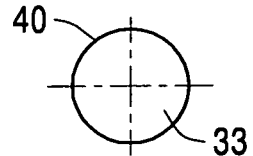
FIG. 3D is a conceptual, cross-sectional view depicting relative zones of high and low sheared laminar flow distribution in the runner taken along line D-D after branching from a branching runner.
Figure 4A:
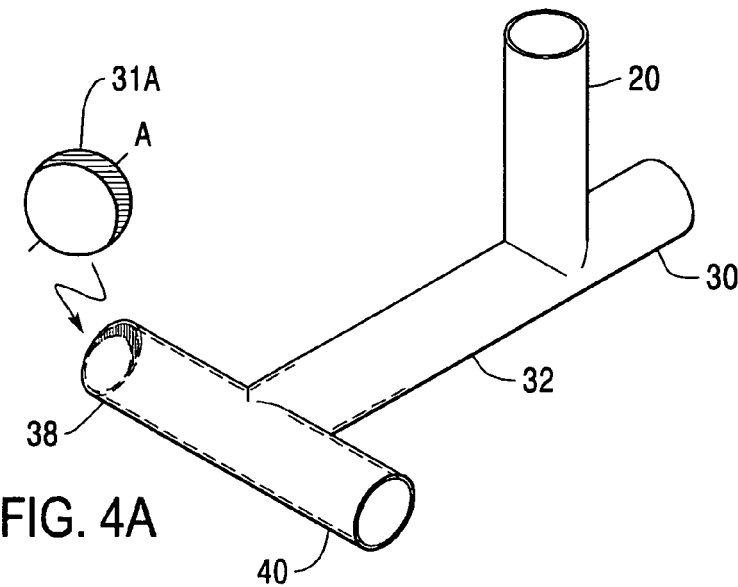
FIG. 4A is an outside partial view of a branching runner showing high and low sheared laminar flow distribution due to shear developed in the sprue.
Figure 4B:
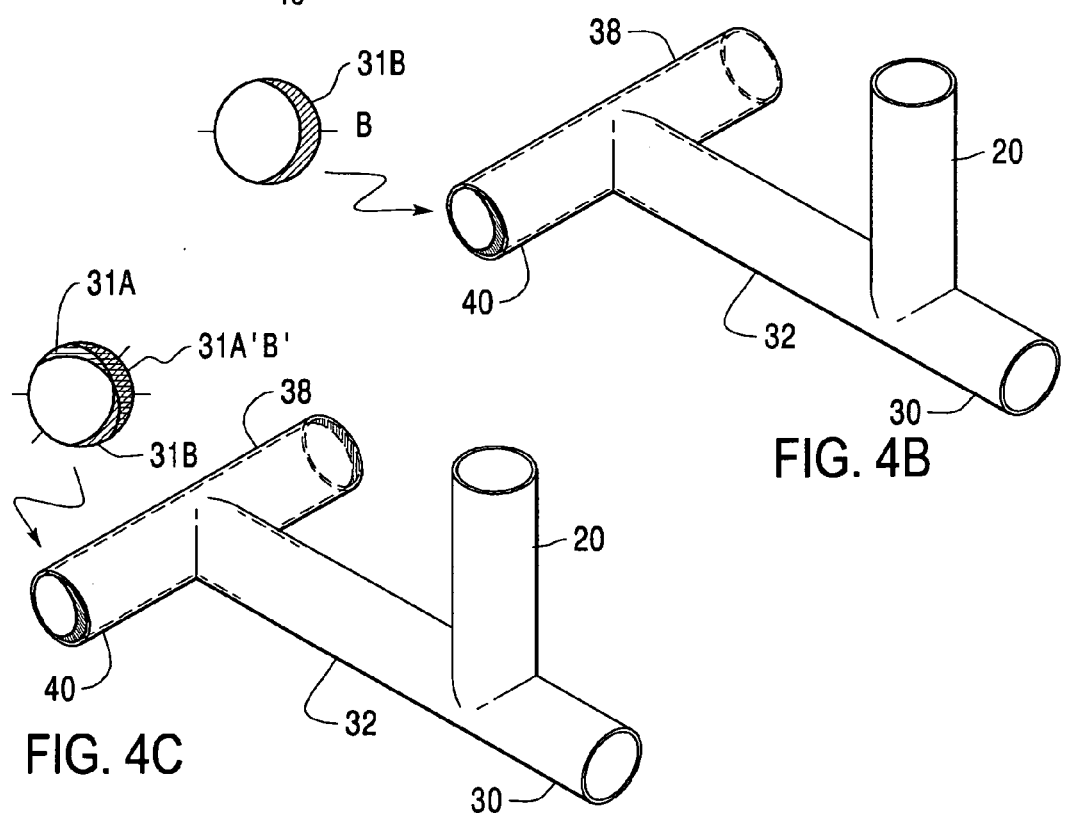
FIG. 4B is an outside partial view of a branching runner showing high and low sheared laminar flow distribution due to shear developed in the primary runner during flow.
Figure 4C:
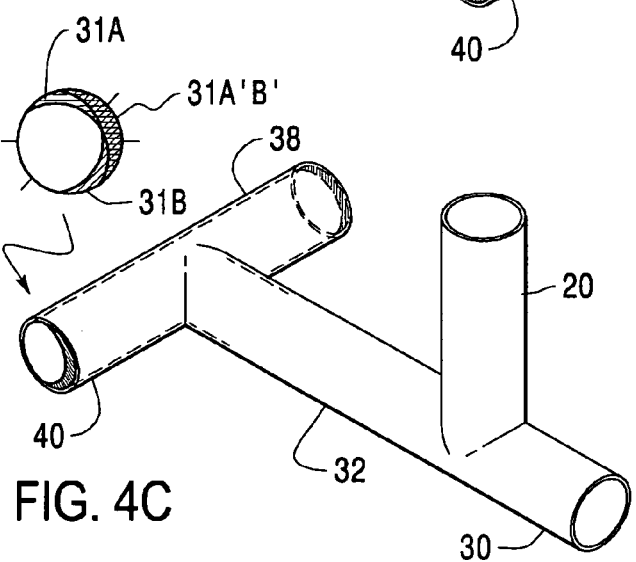
FIG. 4C is an outside partial view of a branching runner showing the combined high and low sheared laminar flow distribution as a result of sprue and primary runner shear effects.
Figure 4D:
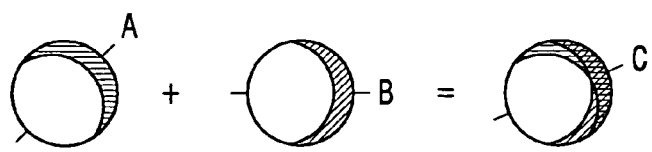
FIG. 4D illustrates the additive nature of the two effects to form a resultant flow distribution.
Figure 5:
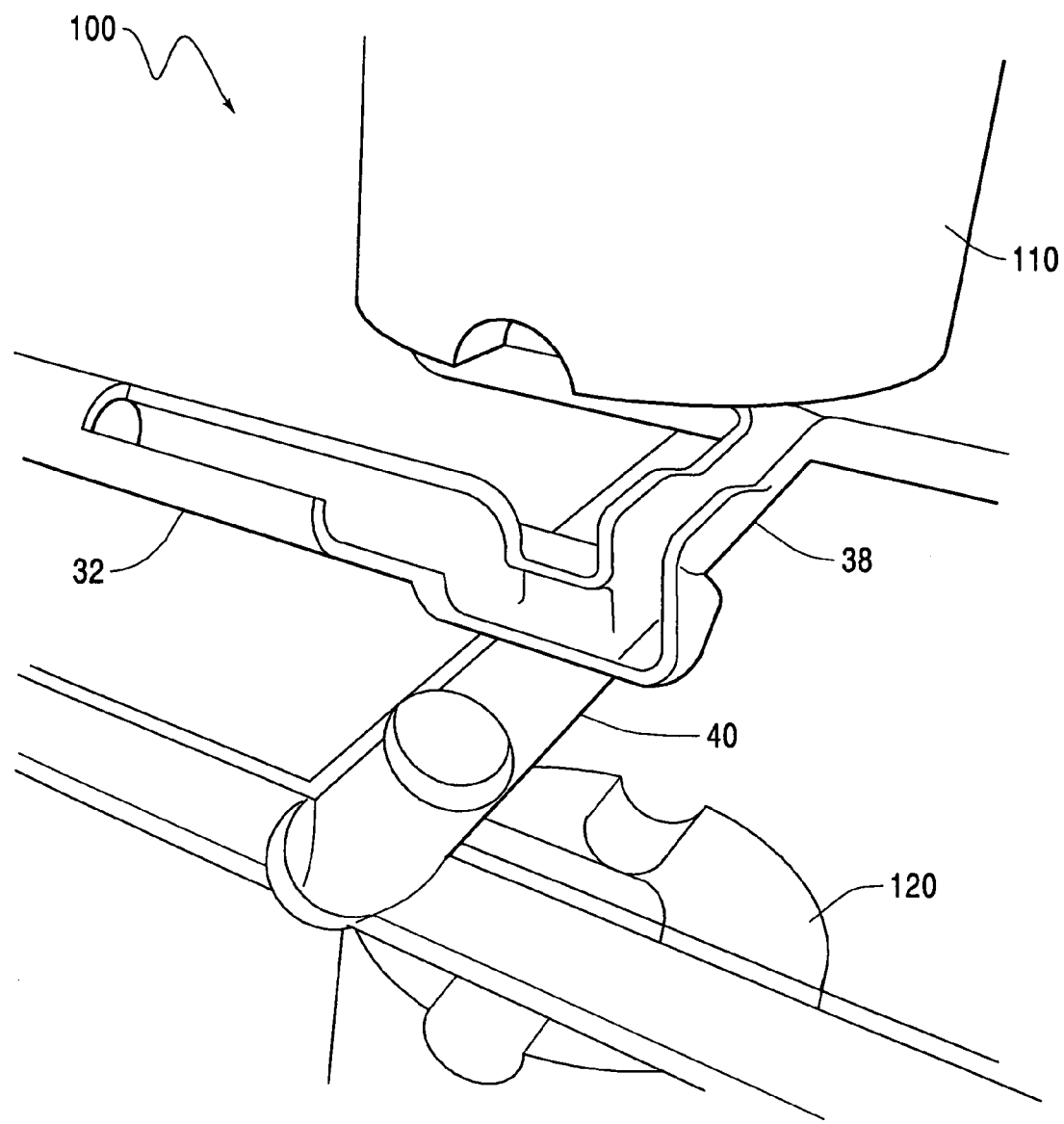
FIG. 5 is a partial perspective view of a branching runner of a mold showing a typical fluid rotation device flow diverter.
Figure 5A:
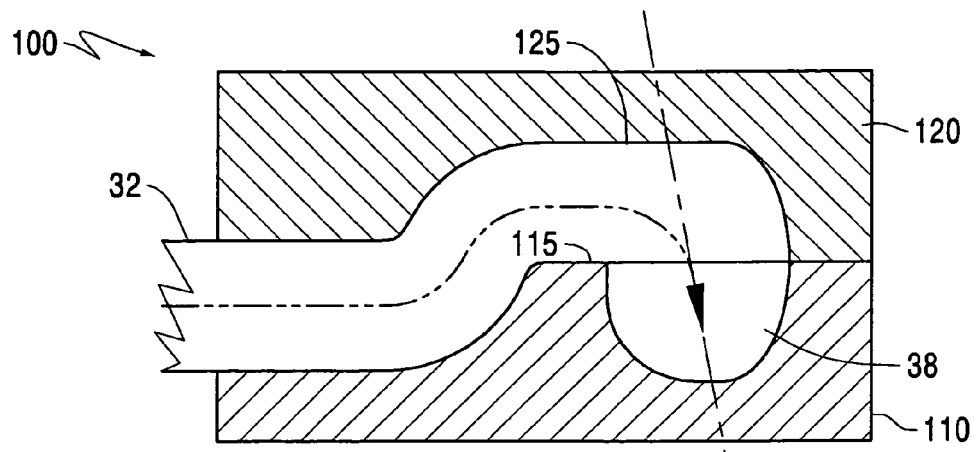
FIGS. 5A-C are partial cross-sectional views of three different fixed-configuration flow diverter mold inserts useful in a branching runner similar to that shown in FIG. 5.
Figure 5B:
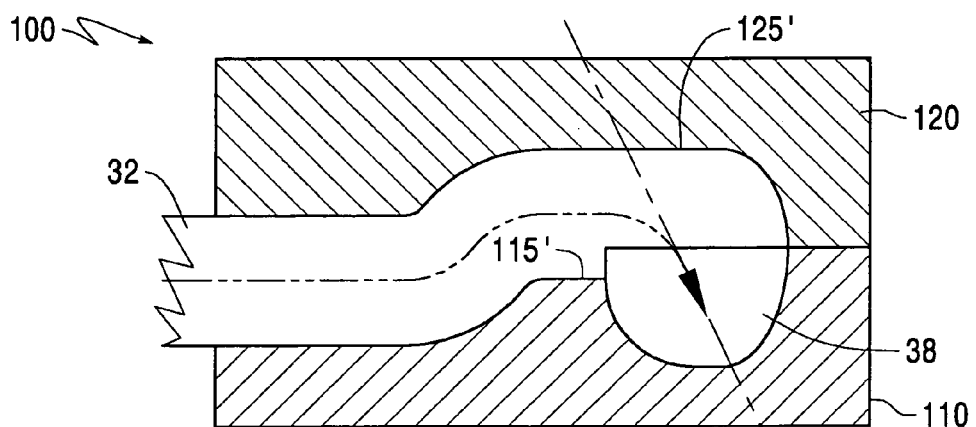
Figure 5C:
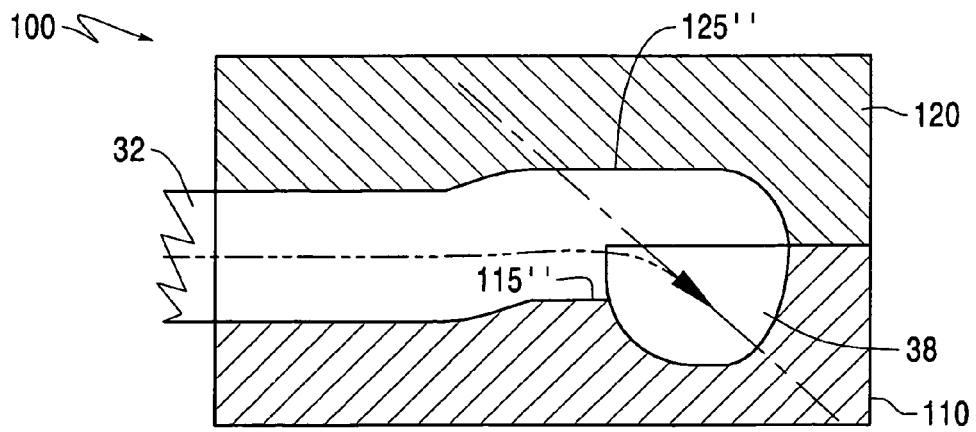
Figure 6:
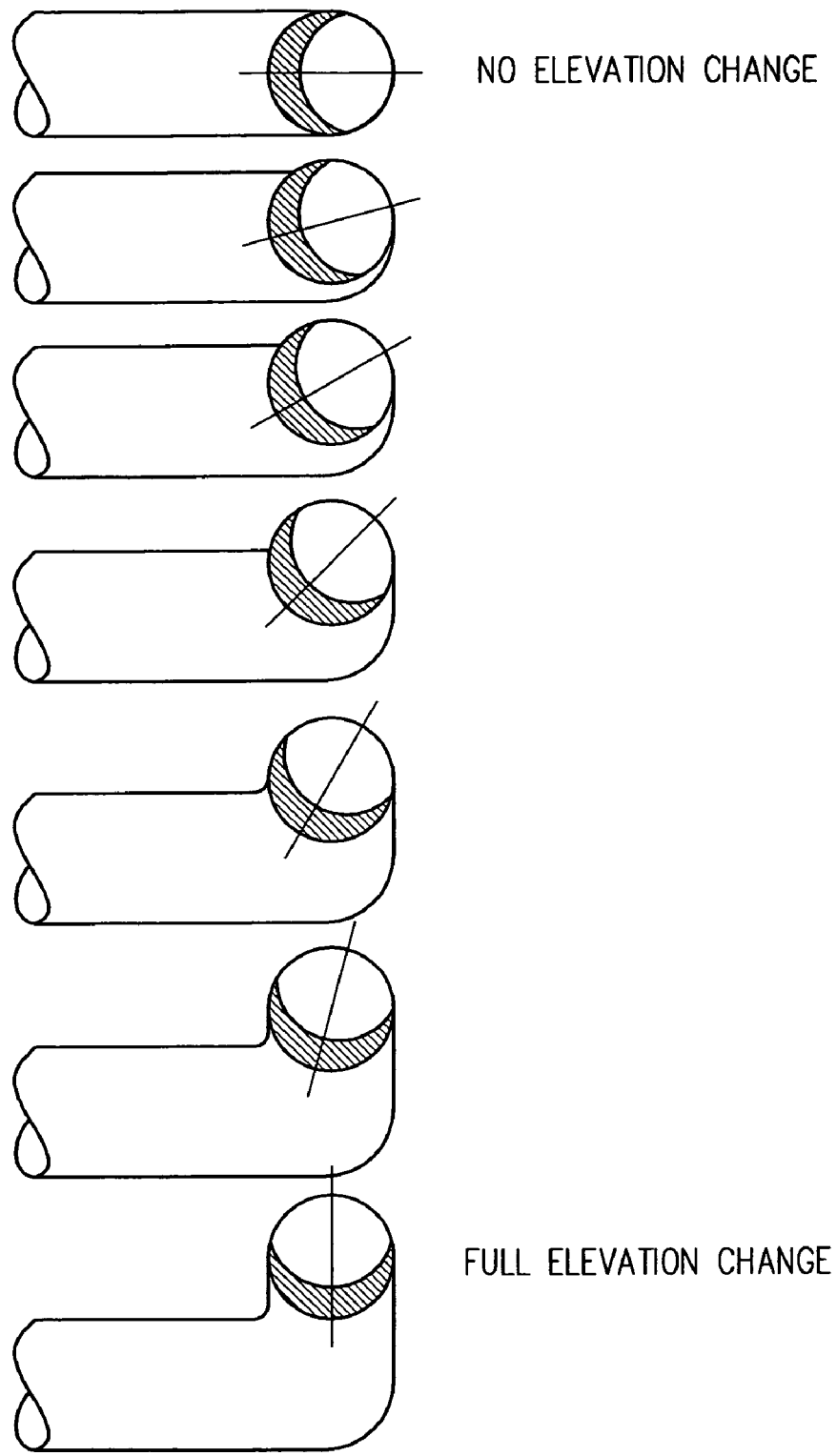
FIG. 6 illustrates the effect that progressive elevation changes have on the repositioning of the high and low sheared laminar flow distribution.

Novel adjustable flow diverters are provided to achieve a desired positioning of non-homogeneous melt conditions of a laminar stream to manage downstream flow. Disclosed exemplary embodiments are particularly suited for use in molding processes in which the melt flow of thermoplastic materials are controlled in a runner system of a mold to remedy or create specific imbalance conditions that occur in any single or multi-cavity mold with a runner, which may branch in one or more directions, in which a variety or types of fluid can flow. Such imbalances occur for any fluid exhibiting (a) laminar flow and (b) viscosity that is affected by shear rate (as with a non-Newtonian fluid) and/or by temperature, or (c) characteristics where variations in shear or flow velocity across a flow channel will create variations in the materials characteristics. These characteristics are typical of thermoplastics, thermosetting materials and many of today's powdered metal and powdered ceramic molding materials. A polymer carrier is often employed with powdered metals and powdered ceramics. It is the polymer that gives such powdered metal or powdered ceramic materials the same characteristics as plastic materials exhibit in regards to viscosity effects and laminar flow. Accordingly, various aspects of the invention may be useful in controlling flow of various laminar fluids. However, control is not limited to improving flow balance. Rather, the main objective is to manage the melt for achieving a desired repositioning of the melt for a given purpose, such as control or influence on shrinkage, warpage and mechanical properties.

This repositioning may be, for example, so that fluid exiting a final branch enters a mold cavity in a desired state across the width of the cavity or has a desirable distribution of varied melt conditions across the cavity. Alternatively, in the case of a family mold with different sized mold cavities, it may be beneficial to purposely provide a certain non-homogeneous flow condition, such as an asymmetrical flow condition, to accommodate feeding of different sized cavities. Also, when multiple branches exist, there may be purposeful repositioning of the non-homogeneous melt condition at upstream branches so that a proper distribution is received at a particular downstream branch or runner to achieve an objective.

In accordance with aspects of the disclosure, adjustments to the flow geometry of a fluid rotation device can be readily made to reposition the non-homogeneous conditions of a laminar fluid flow to a desired position. In various exemplary embodiments, such adjustments occur without requiring remachining of mold components or extensive disassembly of the mold to replace mold inserts. Rather, such adjustments may take place insitu, while located in the mold, or through replacement of relatively minor or simple sub-insert features, such as a pin or gate insert.

In various exemplary embodiments, adjustment methods alter runner geometry to control the repositioning of the non-homogeneous fluid conditions through the runner. Such adjustments can be, for example, by a one-way or reversible adjustment. In certain embodiments, the adjustments can be made manually. In other exemplary embodiments, the adjustments can be controlled automatically through open or closed loop control to drive a powered adjustment mechanism through, for example, suitable pneumatic, hydraulic, mechanical or electrical drive mechanisms.

Figure 8:
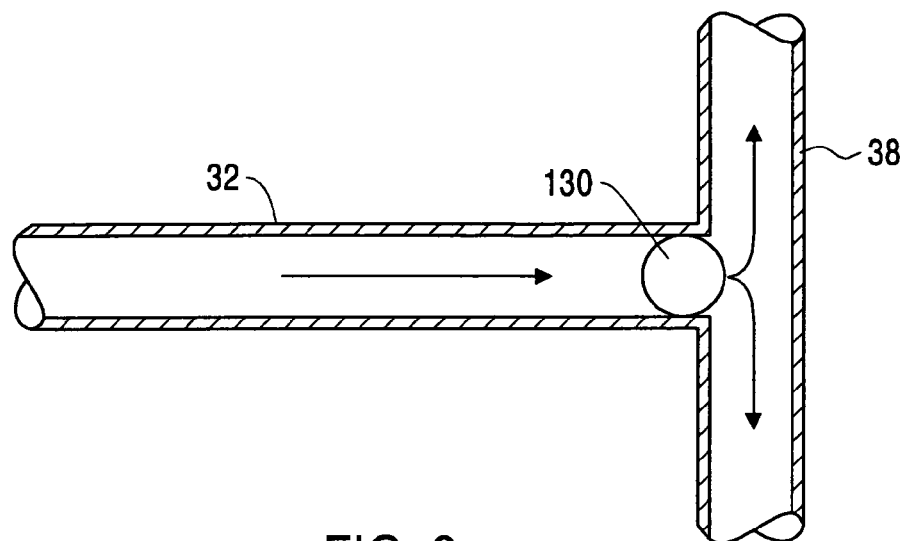
FIG. 8 is a top view of FIGS. 7A-C showing mold details of a lower mold half.

FIGS. 7A-C illustrate a first exemplary embodiment that achieves adjustable rotation control of the non-homogeneous flow conditions in a stream of laminar fluid, such as in a hot or cold runner system, using an retractable flow diverter 130. In this embodiment, mold insert halves 110 and 120 are provided to define portions of branching runners 32 and 38. However, flow diverter 130 could be provided within a unitary mold insert or may be provided directly on a mold or hot runner manifold surface. FIG. 8 shows a top view of branching runners 32, 38 formed by mold insert half 110 showing the flow diverter 130 being provided near the intersection of the runners. Mold insert 120 includes a region 125 that allows for an elevation change in the flow path of the laminar fluid. However, rather than having a fixed-position flow diverter, this embodiment uses a pin 130 as a flow diverter that can have its height adjusted in a direction perpendicular to the incoming flow path. In this example, the direction of adjustability extends substantially perpendicular to the direction of the molding machine platens. The pin 130 may be round or any cross-sectional shape, such as square, and may have rounded or beveled corners or edges.

The pin 130 can be adjusted by an external actuator 140 between various heights to change the angle of the flow path between two intersecting runners. When pin 130 is fully extended, as shown in FIG. 7A, the flow path achieves a full elevational change into region 125. This results in a flow path as shown and a circumferential repositioning of the high shear material by about 80-90°. However, as pin 130 is retracted from the mold insert so as to have a lesser area acting to divert flow, the angle that the flow path makes upon entry into the branching runner decreases as shown in FIGS. 7B-C. This results in the ability to incrementally adjust the repositioning of the laminar flow rotation to predetermined values between about 0° and 90° by way of simple adjustment of pin 130.

Figure 53:
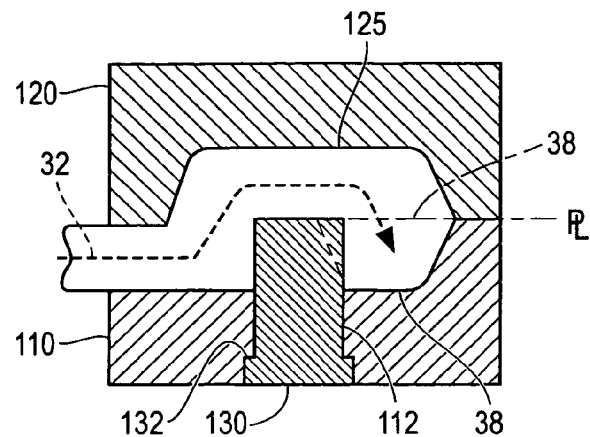
FIGS. 53-55 are partial cross-sectional views of an alternative exemplary fluid rotation device having a linearly adjustable flow diverter section comprised of a series of replaceable pins, each having a different effective height.
Figure 54:
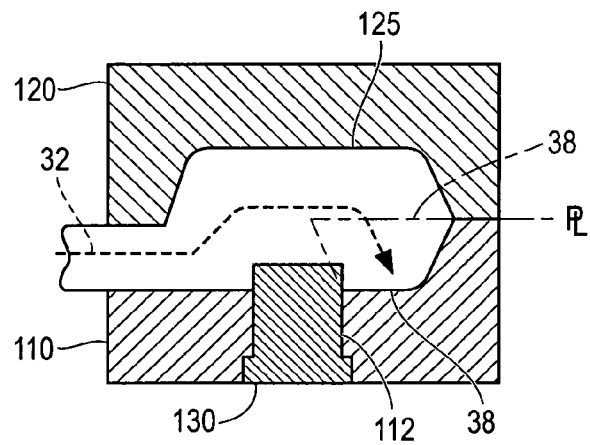
Figure 55:
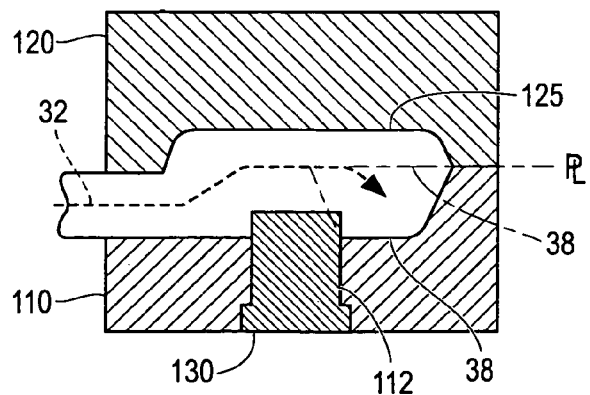

The external actuator can take several forms. In its simplest form, the pin may be press fit into an opening formed in the insert half 110 and adjusted through external force from a press, hammer, by hand, or by other source of urging force. Alternatively, a series of pins of differing heights could be provided and an appropriate pin inserted or press fit into the pin opening as shown in FIGS. 53-55. Such a pin 130 could be seated against a shoulder 132 on the bottom of opening 112 of the mold to precisely locate the pin. Thus, altering of geometry could be achieved through simple change of pins. This has cost advantages over remachining or even replacing of inserts because there is a need for only one mold insert having precision machined flow paths and a series of inexpensive pins of various heights to achieve a desired melt rotation.

Another possibility is to have the pin 130 be threaded and have a head manipulatable by a tool, such as a screwdriver or Allen wrench acting as an actuator to make adjustment. The head may include a knob serving as a handle allowing adjustment. Various powered actuators may also be used to extend pin 130. The powered actuators may be manually controlled or controlled automatically through open loop or closed loop control. Suitable actuators can include various pneumatic, hydraulic, mechanical or electrical drive mechanisms.

Figure 9:
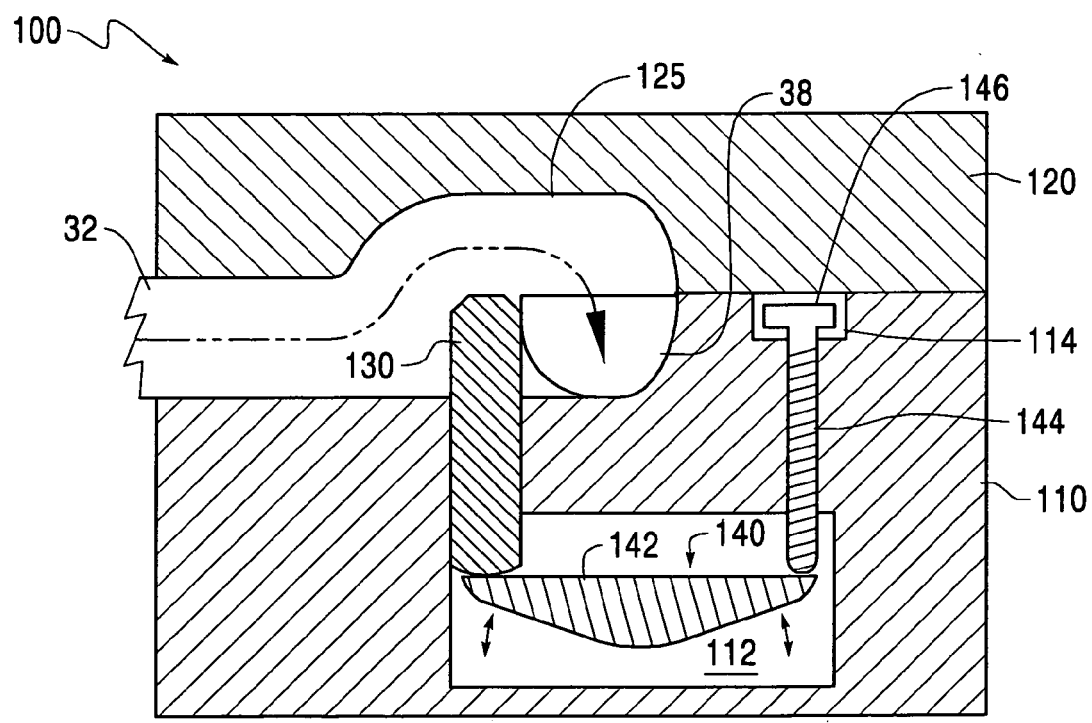
FIG. 9 is a cross-sectional view of an exemplary adjustable fluid rotation device having an adjustment actuator mechanism that provides linear travel adjustment to a flow diverter using a fulcrum lever.

Actuation need not be direct, but may act through various linkages or the like. An example of this is shown in FIG. 9. In this embodiment, adjustment is achieved through a manual actuator 140 that includes a fulcrum 142 provided within a region 112 of mold insert half 110. One end of the fulcrum 142 rests against the bottom of the pin 130. The other end of fulcrum 142 rests against a threaded rod 144 that is threaded into a recess 114 opening to a front face of mold insert half 110 that opposes the second mold insert half 120. Threaded rod 144 includes a head 146 having a conventional configuration allowing it to be manipulated by an external tool, such as an Allen wrench or socket or screwdriver. Separating the two mold halves 110, 120 enables access to the head 146 without requiring removal of the insert from the mold assembly. Rotation of the head 146 acts on fulcrum 142 to allow incremental adjustment of pin 130 into the flow channel until a desired length of the pin 130 extends into the flow path. This enables a precise control of the flow diverter height to precisely adjust the elevation change of the flow path to cause a controlled circumferential rotation of the fluid flow as it transitions from the first runner 32 to the second branching runner 38. Retraction of the pin 130 can be achieved by retracting the threaded rod 144. When the friction fit of pin 130 in mold insert half 110 is sufficiently tight, it may be necessary to press down on pin 130 with a mallet, hammer, or other tool to retract the pin, or could be retracted by the melt pressure itself. Then, the threaded rod 144 can again be turned to precisely tighten or maintain tension against pin 130 by acting through fulcrum 142.

It will be appreciated that, when the pin 130 has a beveled end as shown in FIG. 9, it should be prevented from retracting below a point where the maximum area cross-section of the bevel becomes level with the bottom of the runner 32, to prevent flowing material from entering the resultant opening of mold insert half 110 in which the pin 130 travels.

Because of the laminar nature of the flow, a small dead space may be created at the intersection of the pin 130 and the runner 32. This dead space, particularly when used in a cold runner, can provide the following advantage. Prior to injection from a nozzle, molten material at the tip of the nozzle can slightly cool, thereby forming a so-called "cold slug" of the material. It is desirable to prevent this cold slug from traveling through the runners to a mold cavity. The dead space at the intersection of the pin 130 and the runner 32 forms a cold slug well, which the cold slug enters. The liquid material behind the cold slug then goes around the cold slug and over the flow diverter, trapping the cold slug in place in the dead space.

Figure 10A:
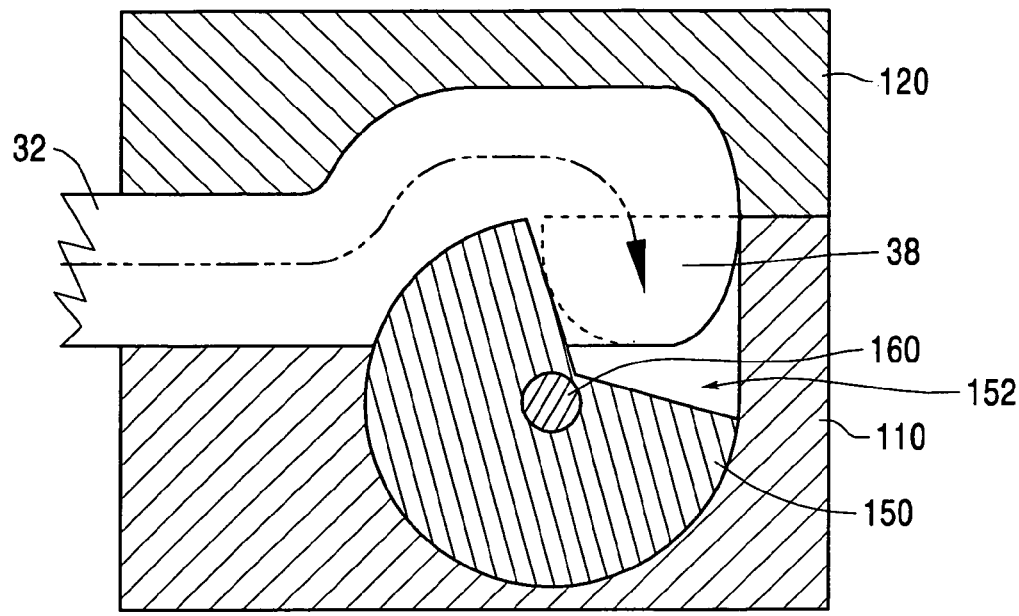
FIGS. 10A-B are cross-sectional views of a second exemplary fluid rotation device having a rotatably adjustable flow diverter section shown in two distinct adjustment configurations.
Figure 10B:
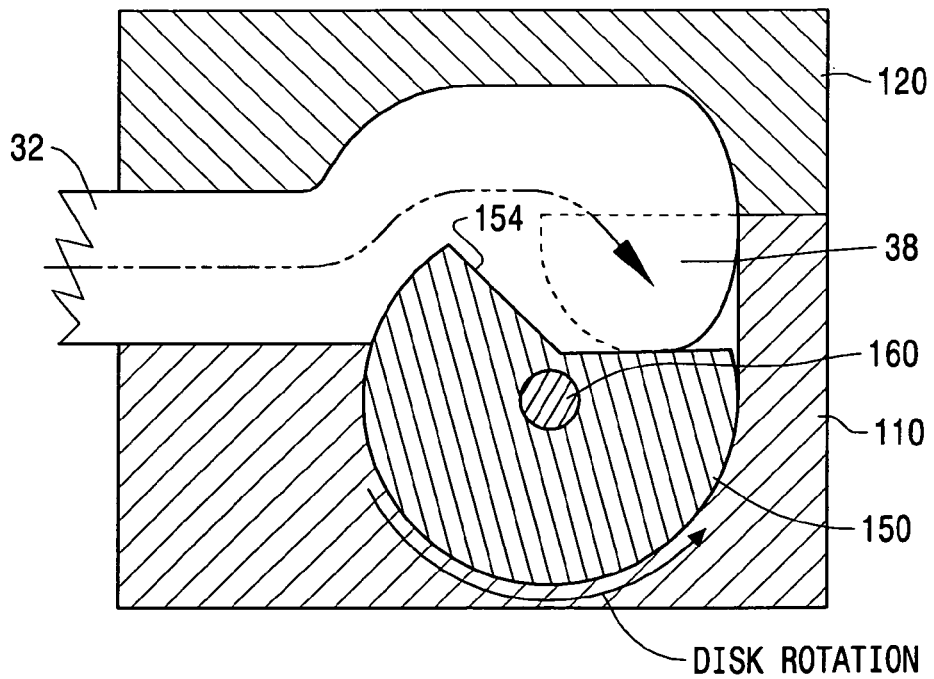

FIGS. 10A-B illustrate a second exemplary embodiment that achieves adjustable rotation control of the asymmetric fluid conditions in a laminar flowing stream. In this embodiment, adjustable control is achieved through a rotatable flow diverter 150 in the form of a disk mounted on a shaft 160. Flow diverter 150 is notched to have an opening 152 having a predefined angle. The extent of the opening is dependent upon the amount of adjustability in flow desired. Flow diverter 150 also includes a leading end 154 that defines a flow diverter element. A maximum flow diverter cross-sectional area and height is shown in FIG. 10A. Rotation of disk 150 counterclockwise reduces the profile at the leading edge 154 as shown in FIG. 10B. With the shown profile having the leading edge 154 extending about 120°, there is limited adjustability. Additional adjustability could be achieved by modifying the leading edge 154 to create an angle up to 180°. This may enable a broader range of circumferential fluid rotation to values approaching as little as 0°.

As with the previous embodiment, adjustment of the flow diverter can be achieved through various manually operated or powered actuators (not shown). Simple examples would be to place a crank or handle on the end of shaft 160 or to have shaft 160 operably connected to a powered drive motor.

Various specific embodiments showing actuation of the rotatable disk will be described with reference to FIGS. 11-15. In the FIG. 11 embodiment, flow diverter 150 includes a portion of the disk periphery that is provided with teeth 155. Within a region of the mold insert half 110 is a drive motor 170 having a drive shaft 172 on which is mounted a drive gear 174. Drive gear 174 mates with the teeth 155. Motor 170 may be a stepper motor or other suitable motor as known in the art. Incremental or indexable rotation of drive motor 170 counterclockwise results in clockwise rotation of flow diverter 150 as shown. In order to form automated closed loop or open loop control of the adjustable flow diverter, drive motor 170 may be operably coupled to a controller 190. Through suitable conventional sensors or command input controls, controller 190 can provide drive signals to drive motor 170 to precisely control the orientation of disk 150 so as to precisely control the fluid flow conditions by control of the flow path through the adjustable fluid rotation device.

Figure 12:
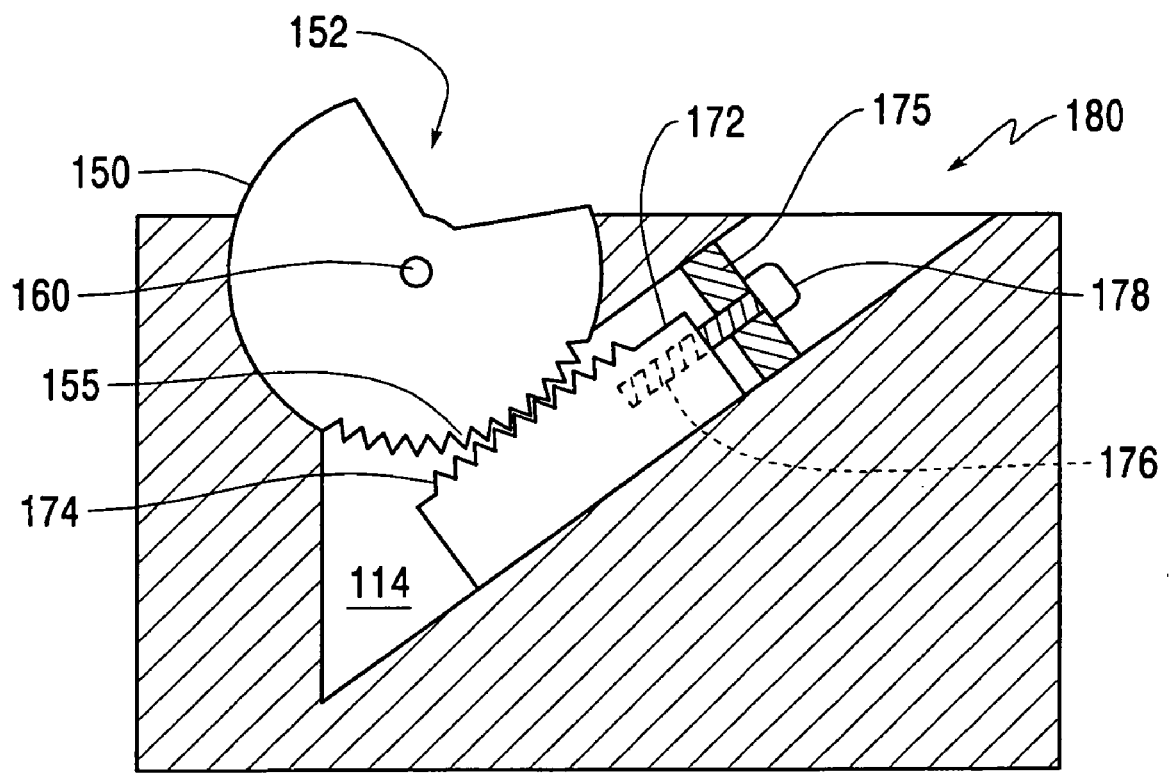
FIG. 12 is a cross-sectional view of a second exemplary actuator mechanism for a fluid rotation device having a rotatably adjustable fluid diverter section that uses a linearly traveling rack and pinion system as an adjustable actuator mechanism.

Another exemplary embodiment showing manual actuation is shown in FIG. 12. In this embodiment, a rack and pinion system is used to index the rotation of flow diverter 150 inside the flow channel. In particular, as in the previous embodiment, flow diverter 150 includes an opening 152 and a peripheral surface with teeth 155. An actuator 180 forming a rack and pinion assembly is provided within a region 114 of mold insert half 110. The rack and pinion assembly includes a slidable rack having teeth 174 that mate with teeth 155 of the rotatable flow diverter 150. A threaded rod 176 having a head 178 is screwed through a fixed block 175 and threaded onto the rack. Manipulation of threaded rod 176, by applying an external tool to head 178, will advance or retract the slidable rack, causing a precise control of rotatable flow diverter 150. Access to the actuator 180 is achieved by opening of the mold, which separates the two mold insert halves enabling a user to access the top face of the mold insert and head 178 without requiring mold insert removal.

Figure 13:
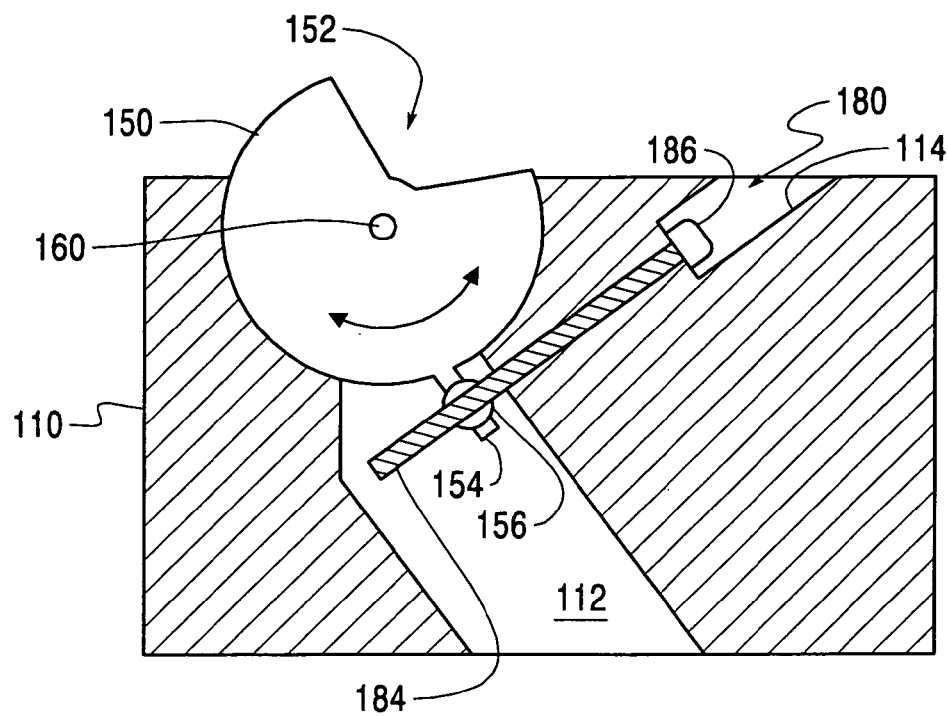
FIGS. 13-14 are cross-sectional views of third and fourth exemplary actuator mechanisms for a fluid rotation device having a rotatably adjustable flow diverter section that uses a threaded positioning screw and a cam element as an adjuster mechanism.

Another exemplary embodiment showing manual actuation is shown in FIG. 13. In this embodiment, the rotatable flow diverter 150 in the form of a disk is provided with a cam element 154 that protrudes from the outer periphery and can be engaged by an actuator 180 to cause precise rotation of the disk. In particular, a region 112 of the mold insert half 110 enables rotation of cam element 154. Actuator 180 includes a threaded rod 184 having a head 186 mounted through a recess 114 opening to the front face of mold insert half 110. Rotation of the threaded rod 184 using an external tool, such as an Allen wrench or screwdriver that mates with the head 186, causes the threaded rod 184 to thread into ball joint 156, urging cam element 154 toward or away from the threaded rod 184. This results in rotation of rotating flow diverter 150 to a desired location.

Figure 14:
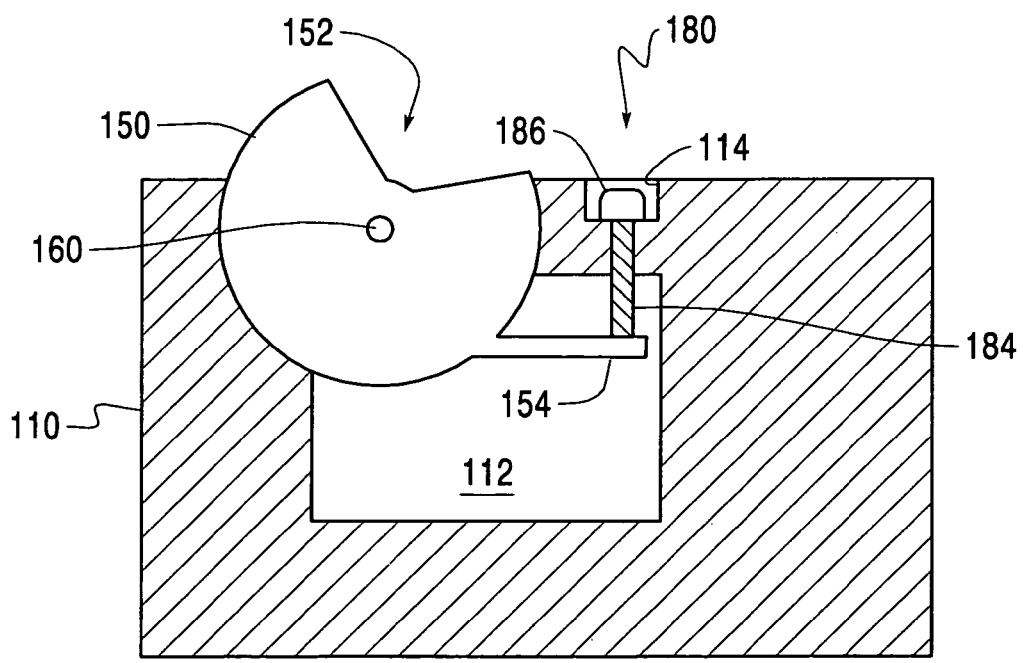

FIG. 14 shows a modified version of the embodiment of FIG. 13 in which the actuator 180 is provided perpendicular to the mold face of mold insert 110. Rotation of threaded rod 184 causes cam element 154 to move similar to the previous embodiment.

Figure 15:
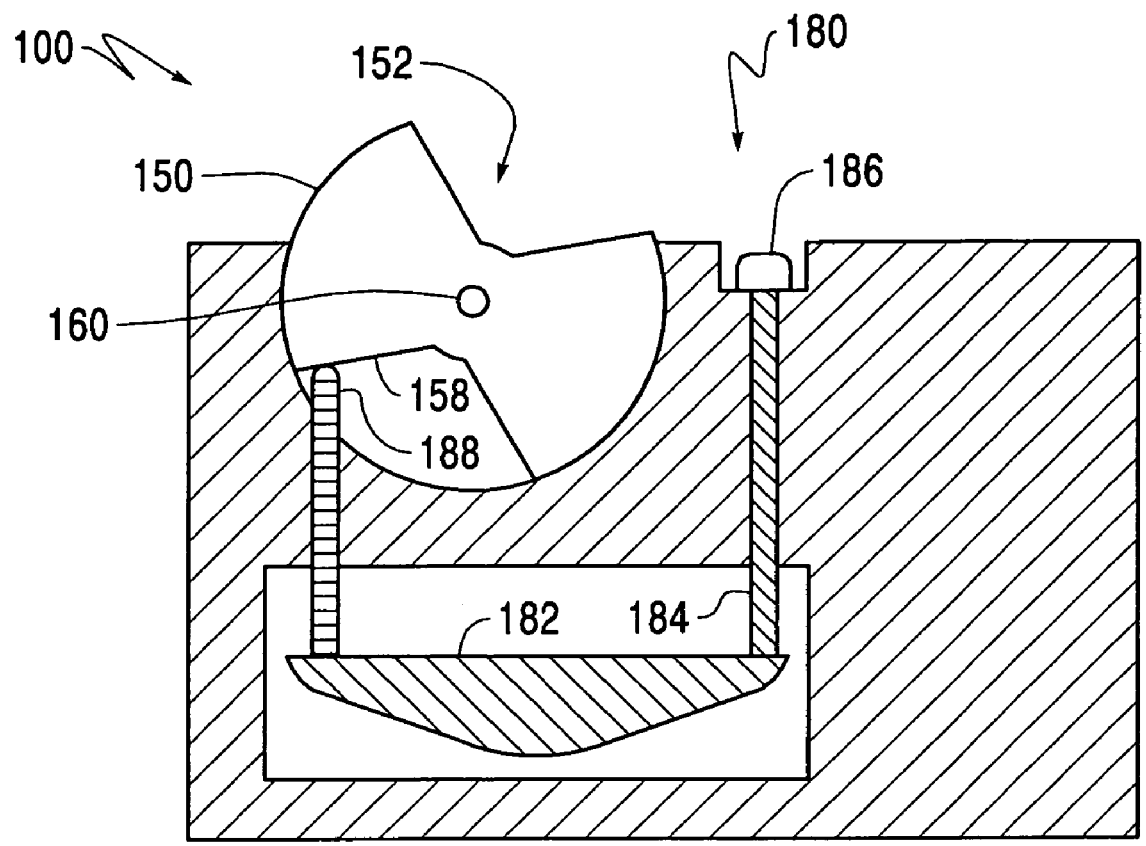
FIG. 15 is a cross-sectional view of a fifth exemplary actuator mechanism for a fluid rotation device having a rotatably adjustable flow diverter section that uses a threaded positioning screw and a fulcrum lever.

FIG. 15 illustrates yet another exemplary embodiment showing manual actuation. This embodiment, similar to the embodiment of FIG. 9, achieves adjustment through a manual actuator that includes a fulcrum. In particular, manual actuator 180 provides a fulcrum 182 within a region of mold insert half 110. One end of the fulcrum rests against the bottom of a pin 188. The other end of fulcrum 182 rests against a threaded rod 184 that is threaded into an opening to a front face of mold insert half 110. Threaded rod 184 includes a head 186 having a conventional configuration allowing it to be manipulated by an external tool. As in the FIGS. 12-14 embodiments, opening of the mold may separate the two mold halves and enable access to the head 186 without requiring removal of the insert from the mold assembly. Rotation of the head 186 acts on fulcrum 182 to allow incremental adjustment of the pin 188, which urges against surface 158 of rotatable flow diverter 150, incrementally advancing the flow diverter to a desired rotation.

Figure 16:
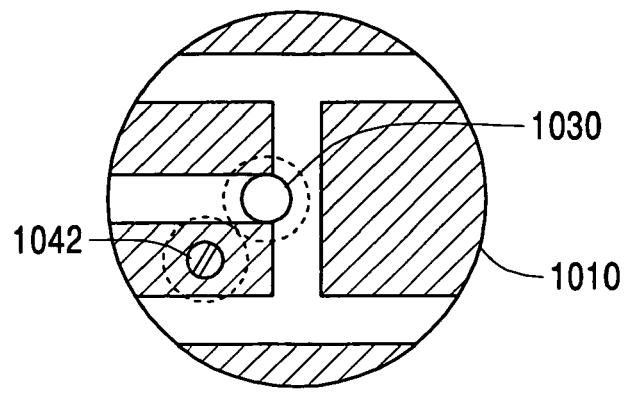
FIG. 16 is a top view of another embodiment of an adjustable melt flow diverter device.
Figure 17:
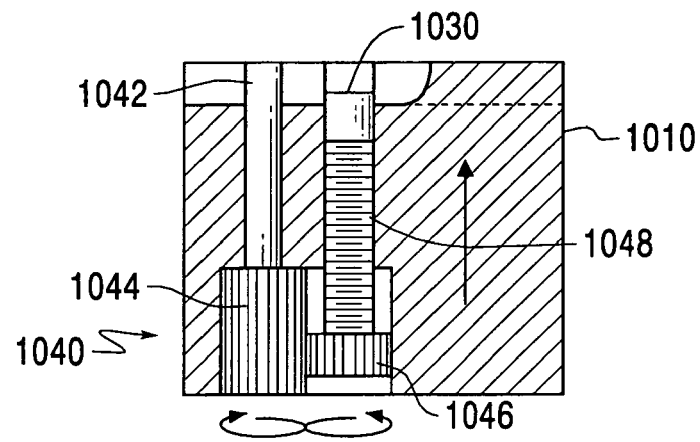
FIGS. 17-18 are cross-sectional views of the flow diverter device of FIG. 16 in first and second positions.
Figure 18:
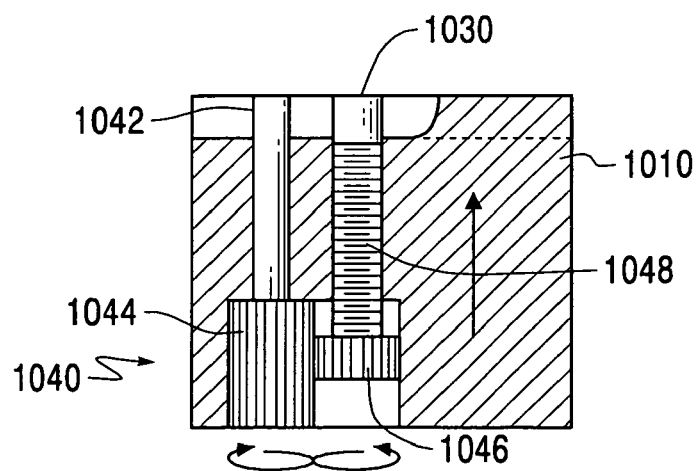

FIGS. 16-20 show additional embodiments of adjustable rotation control of the non-homogeneous flow conditions in a stream of laminar fluid, such as in a hot or cold runner system, similar to that disclosed in FIGS. 7A-C. Both embodiments use a retractable flow diverter. In the embodiment of FIGS. 16-18, a mold half 1010 includes a flow diverter 1030 that is adjusted through actuator 1040 to change the angle of the flow path between two intersecting runners and thereby to adjust the rotation of the melt stream in the branching runner. Actuator 1040 includes an actuator pin 1042 that can be manipulated by a tool, such as by including a screwdriver or Allen wrench type head that mates with the tool. Gear teeth 1044 are provided on actuator pin 1042. Corresponding gear teeth 1046 located on a threaded flow diverter shaft 1048 are mated to teeth 1044 so that rotation of actuator pin 1042 results in rotation of gear 1046 and an associated change of height in flow diverter 1030. For example, FIG. 17 shows the flow diverter 1030 in a low position while FIG. 18 shows the flow diverter 1030 in a raised position. Separating the two mold halves enables access to the head of actuator pin 1042 without requiring removal of the insert from the mold assembly. This enables a precise control of the flow diverter height to precisely adjust the elevation change of the flow path to cause a controlled circumferential rotation of the fluid flow as it transitions from the first runner to the second branching runner.

Figure 19:
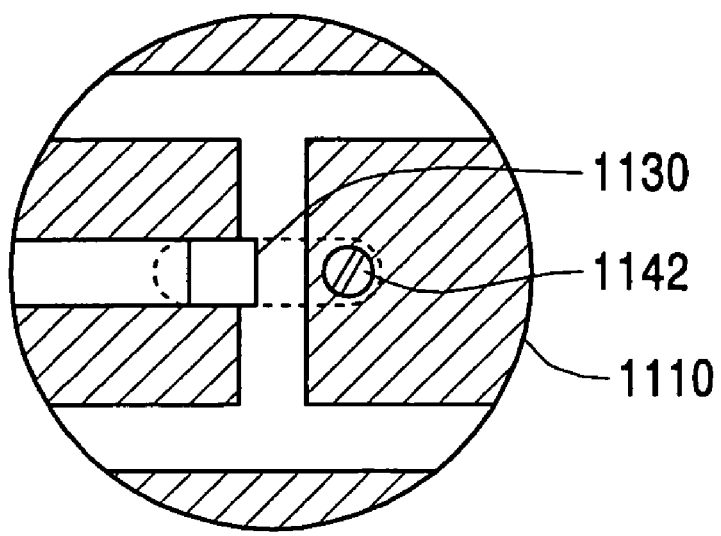
FIG. 19 is a top view of a further embodiment of a flow diverter device.
Figure 20:
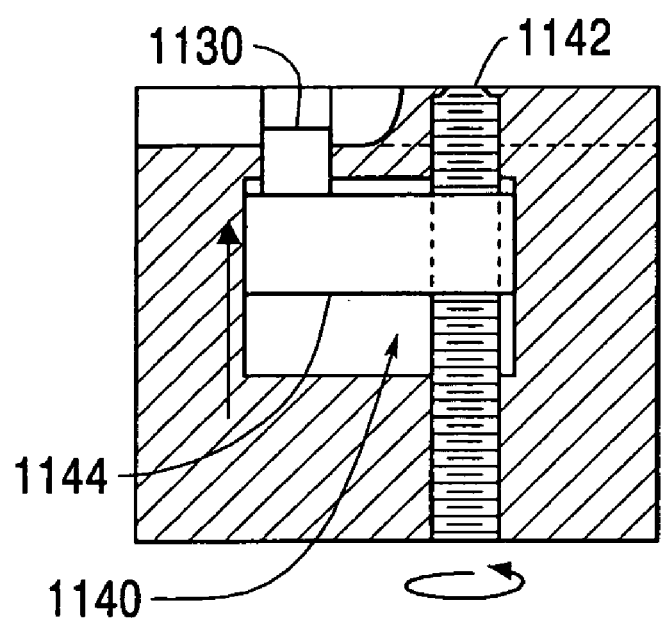
FIG. 20 is a cross-sectional view of the flow diverter device of FIG. 19 in a first position.

Another embodiment is shown in FIGS. 19-20. In this embodiment, a mold half 1110 includes a flow diverter 1130 that is adjusted through actuator 1140 to change the angle of the flow path between two intersecting runners. Actuator 1140 includes a threaded actuator pin 1142 that can be manipulated by a tool, such as by including a screwdriver or Allen wrench type head that mates with the tool. An actuator block 1144 is threaded onto pin 1142 so that rotation of actuator pin 1142 results in raising or lowering of actuator block 1144, which causes an associated change of height in flow diverter 1130. As in the prior embodiment, separating the two mold halves enables access to the head of actuator pin 1142 without requiring removal of the insert from the mold assembly. This enables a precise control of the flow diverter height to precisely adjust the elevation change of the flow path to cause a controlled circumferential rotation of the fluid flow as it transitions from the runner to a downstream section, such as a branching runner, mold cavity, or other section of a runner system. Flow diverter 1130 is not limited to the square cross section shown. Flow diverter 1130 could also be rectangular, round or any other shape that causes the melt to be diverted.

A third exemplary embodiment provides an adjustable rotation control of the non-homogeneous laminar fluid conditions using an inline fluid rotation device structure that can be located along the length of a runner rather than at a branch in the runner. FIG. 21A illustrates a first mold half 210 that defines portions 32A and 32B of an inline runner section along with a flow diversion section 230 including a divergent flow path, shown in the exemplary form of an arcuate section, having ends 232, 236 and/or intermediate section 234. FIG. 21B illustrates a second mold half 220 that defines a flow channel 225.

FIGS. 22-23 illustrate the first and second mold halves being assembled together so that the flow region 225 connects runner portions 32A at an interconnecting area 234 and runner portion 32B at an interconnecting area shown at the end of runner portion 32B, thereby forming a complete runner flow path. For ease of illustration, mold 210 is omitted so that the runner path can be better shown, and the runner portions 32A and 32B are shown superimposed over the mold half 220. FIG. 22 shows a condition in which the mold halves are in a first relative position. FIG. 23 shows a condition in which the second mold half 220 is rotated about 90° relative to the orientation in FIG. 22.

In the position shown in FIG. 22, laminar material flow travels from section 32A through end 232 into flow region 225 and out runner section 32B. The result of this is about 0° rotation of the melt flow. However, when the second mold half 220 is rotated to the position shown in FIG. 23, laminar material flow travels from runner section 32A through all of the flow diverter 230, through end 236 into flow region 225 and out runner section 32B. The result of this is almost 180° circumferential laminar fluid flow rotation. Thus, for example, if the high shear region is initially on the top, the high shear region may be rotated (i.e., repositioned) to near the bottom after flow diversion.

Use of the flow diverter 230 is not limited to the two extreme 90° offset positions as shown. Rather, it is possible to incrementally rotate mold insert half 220 so that the outer end of the flow region 225 meets with the divergent flow diverter section 230 anywhere along the intermediate section 234 that is the interconnecting area of runner portion 32A. By this adjustability, flow repositioning within a range of about 0-180° circumferential rotation can be achieved inline of an individual runner, anywhere along its length. This allows for an additional adjustable control mechanism to fine tune the fluid flow as it travels along the runner to adjust for flow imbalance or to obtain other desirable positioning of the asymmetric meld conditions.

Numerous variants of this are possible. For example, region 225 can be extended in straight line form, as shown, or in an L or V shape extending from the center axis of the mold insert. Additionally, the flow diversion section 230 can be mirrored on the opposite side. This will allow a pair of flow diversion paths similar to that taught in U.S. Pat. No. 6,503,438 to Beaumont et al. Further, the divergent flow path could have variations in its path to provide various gradations in its rotation with the radial positioning of the mating 220 mold insert.

In various exemplary embodiments, the adjustments to the flow geometry are made while the mold is in an inoperative state. However, in certain circumstances, it may be beneficial to perform adjustment during operation of the mold while a laminar fluid is being flowed through the adjustable fluid rotation device. Because of this, the fluid rotation device is not only statically adjustable, but may be dynamically adjustable during the molding operation to fine tune the flow front of the laminar fluid during the actual filling of the mold. In such a situation, adjustment can be controlled by open loop or closed loop control using an automatic adjustment actuator and may include feedback from one or more mold process parameters.

Figure 11:
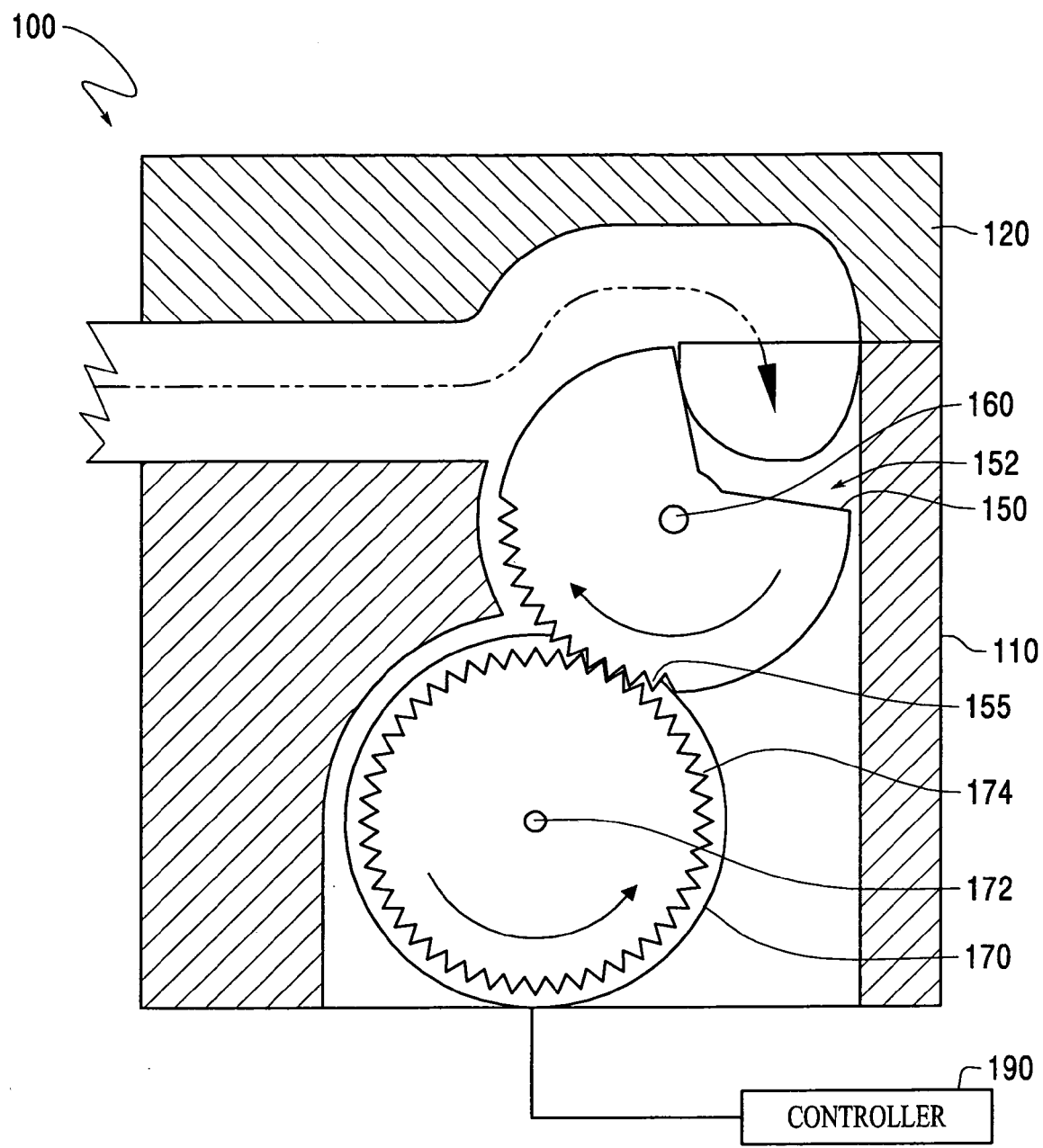
FIG. 11 is a cross-sectional view of a first exemplary actuator mechanism for a fluid rotation device having a rotatably adjustable fluid diverter section that uses a drive motor and automatic feedback control.

For example, in the FIG. 11 embodiment, pressure transducers or thermocouples may be located at various locations in the runner system or mold cavities to sense fluid pressure, timing or temperature variations across mold areas. This information may be used as control feedback by controller 190 to indicate the degree of remaining flow or cavity fill imbalance and allow fine tuning of the adjustment of the flow diverter 150 to reduce the imbalance in a next molding operation. Alternatively, this information could be used to derive a new control routine for a modified open loop control system.

Additionally, various pressure, timing, temperature or other signals can be used by controller 190 to dynamically control adjustment of the flow diverter 150 during the molding operation to adjust the flow front of the laminar fluid traveling through the branching runner system in real-time. Such dynamic adjustments can dramatically refine or customize the molding process by more precisely controlling or altering the flow front at various stages of the molding process. For example, such dynamic control can: alter cavity fill to accommodate a non-standard geometry; control or alter the molded part's warpage; control the distribution of stratified layers of material, such as high shear or low shear melt, to various cavities; and control many other special molding requirements to achieve stricter product tolerances or the like.

Depending on the mold processing time, such dynamic adjustment may be a discrete one move adjustment (from one value to another), or may be a continuously variable movement so as to precisely control dynamically the flow front of the laminar material. That is, successive sections of the material passing through the runner may be repositioned with different circumferential rotation.

Referring back to FIGS. 21-23, one of the two mold halves can be made with a small gap, on the order of 0.0005-0.001" deep, to allow the mold halves to move relative to each other, even when the remainder of the mold is subjected to high mold clamp tonnage forces and melt pressure of over 20,000 psi. Similarly, referring back to FIGS. 11-15, a gap may exist around the rotatable flow diverter 150 in one or both mold insert halves to allow a clearance for rotation.

In embodiments where only static adjustments are made, it may be desirable to have a clearance in the lower mold insert containing the rotating disk to enable easier rotation. However, by eliminating a gap or clearance on the mating mold insert, upon closing of the mold and mating of the mold insert halves together, sufficient clamping pressure may be exerted on the rotating disk to prevent rotation during the molding operation. With this, adjustments can be achieved without requiring a large actuator force otherwise necessary to overcome the clamping force. Also, this gap is sufficiently small to retain fluid, particularly molten plastics, within the mold without excessive leakage.

Additionally, although exemplary embodiments are shown in the context of adjustment of the non-homogeneous fluid conditions after the branch in a runner with a two-piece mold insert, similar adjustable fluid rotation devices can be provided on a unitary insert or directly provided on mold or hot runner manifold surfaces used in cold or hot runner systems. Thus, aspects of the adjustable fluid rotation device and methods of adjustment can be used in cold runners or hot runners.

Figure 24:
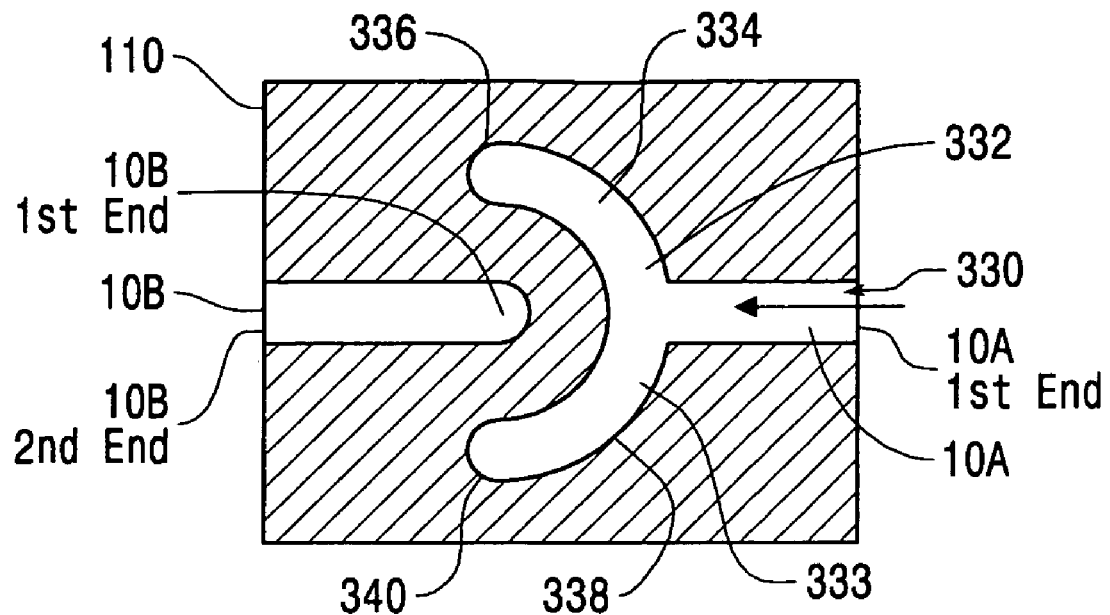
FIG. 24 is a top view of a first mold insert half to form an adjustable inline fluid rotation device according to another embodiment.
Figure 25:
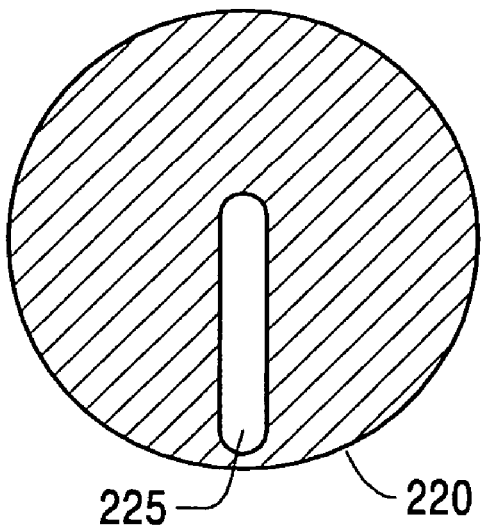
FIG. 25 is a bottom view of a second mold insert half for use with the mold half of FIG. 24.

Another exemplary embodiment similar to that described in FIGS. 21A-B provides an adjustable rotation control of the non-homogeneous laminar fluid conditions using an inline fluid rotation device structure that can be located along the length of a runner, rather than at a branch in the runner. FIG. 24 illustrates a first mold insert half 110 that defines runner portions 10A and 10B of an inline runner section. Runner portion 10A is comprised of a binary arcuate flow path having a first end 330 and two arcuate flow paths. One arcuate flow path includes ends 332, 336, and an intermediate section 334 of the interconnecting area of runner portion 10A, and a second arcuate flow path includes ends 333, 340, and an intermediate section 338 of the interconnecting area of runner portion 10A. FIG. 25 illustrates a second mold insert half 220 that defines a connecting runner portion 225.

The flow geometry within mold half 110 can be fabricated directly into a mold body or may be included within an insert. The flow geometry within mold half 220 would typically be positioned within a mold insert to allow for rotation relative to mold half 110.

FIGS. 26-30 illustrate the first and second mold halves being assembled together so that the connecting runner portion 225 unites runner portions 10A at its interconnecting area 336, 334, 332, 333, 338, 340 and runner portion 10B at its interconnecting area at the first end of runner portion 10B, thereby forming a continual runner flow path. For ease of illustration, mold insert half 220 is omitted so that the runner path can be better shown, and the connecting runner portion 225 is shown superimposed over mold half 110.

Figure 26:
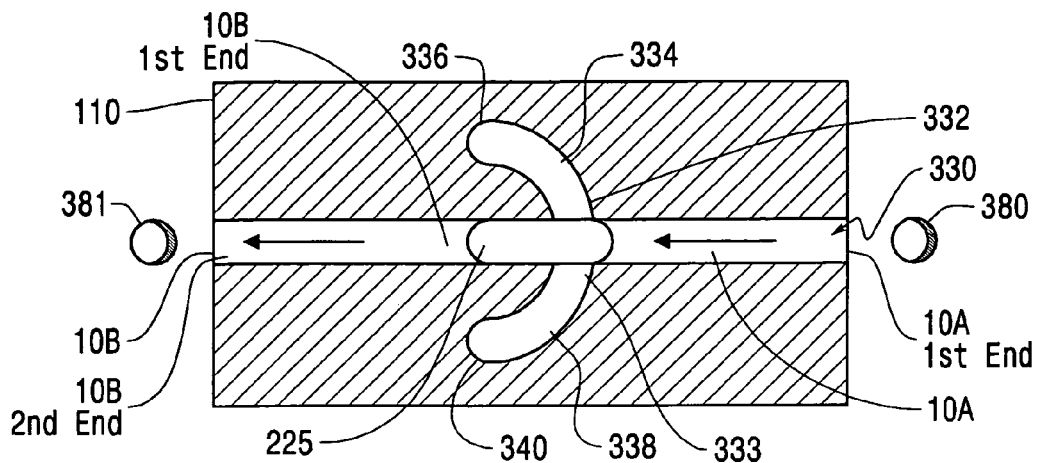
FIG. 26 is a view of the first and second mold insert halves of FIGS. 24-25 combined (with the lower first mold half being omitted for clarity) in a first zero degree rotation position.

FIG. 26 shows a condition in which the mold halves are in a first relative position, with insert 220 at a zero degree rotation. In the position shown in FIG. 26, laminar flowing material travels from the first end of runner portion 10A, beginning at end 330, into and through connecting runner portion 225, into the first end of 10B, and finally, out of the second end of runner portion 10B. The result of this flow path is approximately 0° circumferential laminar fluid flow rotation.

For reference, a cross section of non-homogeneous laminar fluid flow conditions entering the first end of runner portion 10A is illustrated as 380. Cross section 380 shows non-homogeneous laminar fluid flow conditions developed from top to bottom of the runner with the shaded region for reference existing on the bottom. Upon exiting the second end of runner portion 10B, another cross section, cross section 381, displays the asymmetric laminar fluid flow conditions and reveals that the relative portion of the asymmetric laminar fluid flow conditions entering and exiting the assembled mold halves have not changed.

Figure 27:
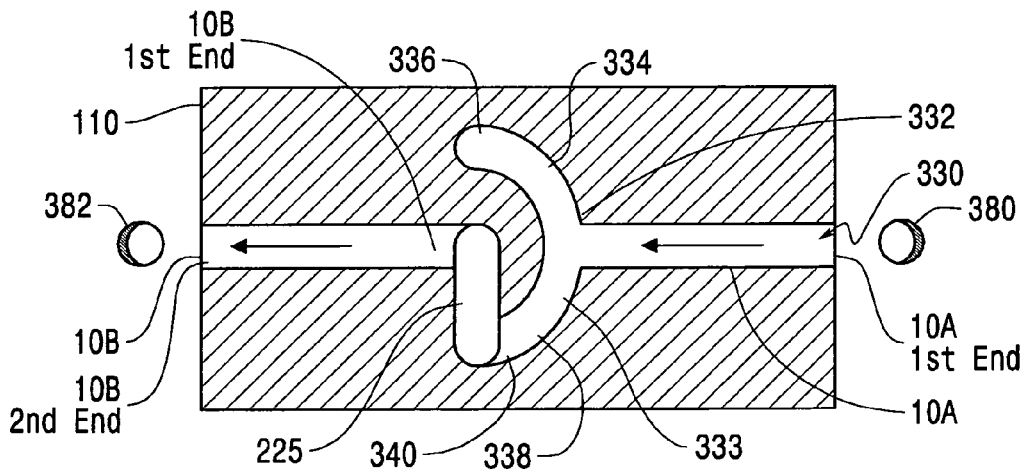
FIGS. 27-28 are views of the first and second mold insert halves of FIGS. 24-25 combined in second and third positions, respectively, that result in rotations of approximately +/−180° relative to FIG. 26.
Figure 28:
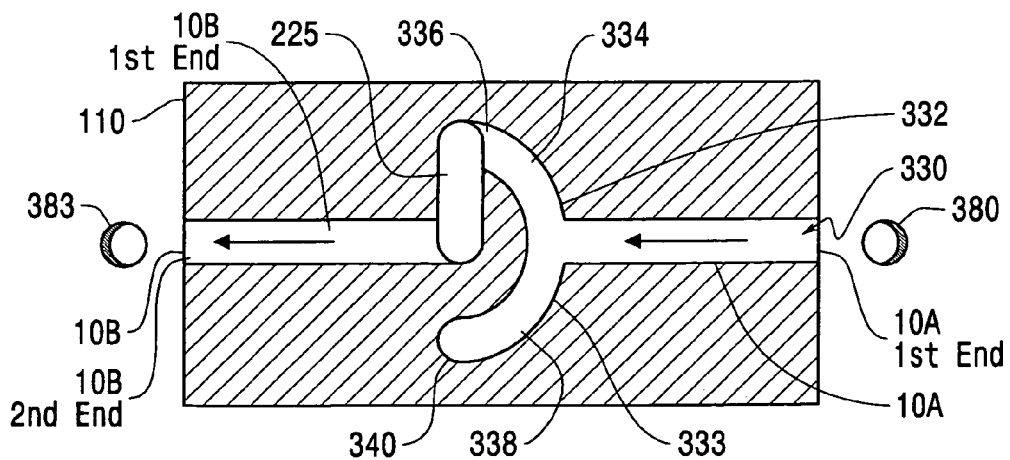

FIGS. 27-28 show conditions in which the second mold insert half 220 is rotated approximately 90° relative to the 0° position shown in FIG. 26. When the second mold half 220 is rotated to the position shown in either FIG. 27 or FIG. 28, laminar flowing material travels from the first end of runner portion 10A, beginning at end 330, through end 340 or 336, respectively, of the interconnecting area of runner portion 10A into connecting runner portion 225 and into the interconnecting area at the first end of runner portion 10B and out of the second end of runner portion 10B. The result of this flow path is almost 180° circumferential laminar fluid flow rotation, as represented by cross sections 382 and 383. For example, if the high shear region is initially on the bottom, the high shear region may be rotated (i.e., repositioned) to near the top after flow diversion. The sole difference between cross sections 382 and 383 is the means in which the melt was rotated to this position as controlled by the rotation of the insert half 220 and laminar fluid flow. Cross section 382 is generated by a clockwise rotation of both insert and laminar fluid flow, while cross section 383 is generated by a counterclockwise rotation of both insert and laminar fluid flow.

The embodiment shown in FIG. 24, with a binary arcuate flow path, offers the option of flowing through either of the two arcuate flow paths in runner portion 10A in order to more easily achieve the desired laminar fluid flow rotation. Each arcuate flow path is capable of generating laminar fluid flow rotation within a range of 0° to 180°. One arcuate flow path generates a means to rotate the laminar fluid flow in a range of 0° to 180° in the counterclockwise direction. The second arcuate flow path generates a means to rotate the laminar fluid flow in a range of 0° to 180° in the clockwise direction. Thus, this binary arcuate flow path design widens the laminar fluid flow rotation range to encompass all angles from a negative (counterclockwise) 180° rotation to a positive (clockwise) 180° laminar fluid flow rotation. Between the two arcuate flow paths, a full 360° rotational positioning of the melt stream can be achieved.

Use of the connecting runner portion 225 is not limited to the three extreme 90° positions as shown. Rather, it is possible to incrementally rotate mold insert half 220 so that the outer, first end, of the connecting runner portion 225 meets with runner portion 10A anywhere along the intermediate sections 334 or 338 of the interconnecting area of runner portion 10A. By this adjustability, flow repositioning within a range of approximately negative 180° to positive 180° circumferential rotation can be achieved inline of an individual runner, anywhere along its length. This allows for an additional adjustable control mechanism to fine tune the laminar fluid flow as it travels along the runner to correct for melt imbalance which may result at a downstream branching runner or to obtain other desirable positioning of the asymmetric laminar fluid flow conditions for purposes such as to control the distribution of melt conditions within a downstream cavity or cavities.

Figure 29:
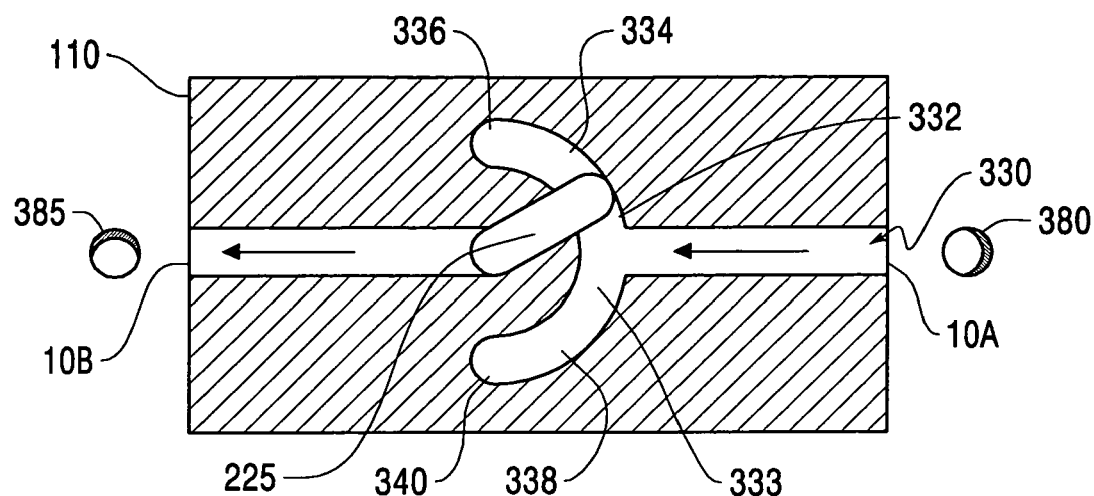
FIGS. 29-30 are views of the first and second mold insert halves of FIGS. 24-25 combined in fourth and fifth positions, respectively, that are each at an angle relative to FIG. 26 that results in a melt rotation of about 90°.
Figure 30:
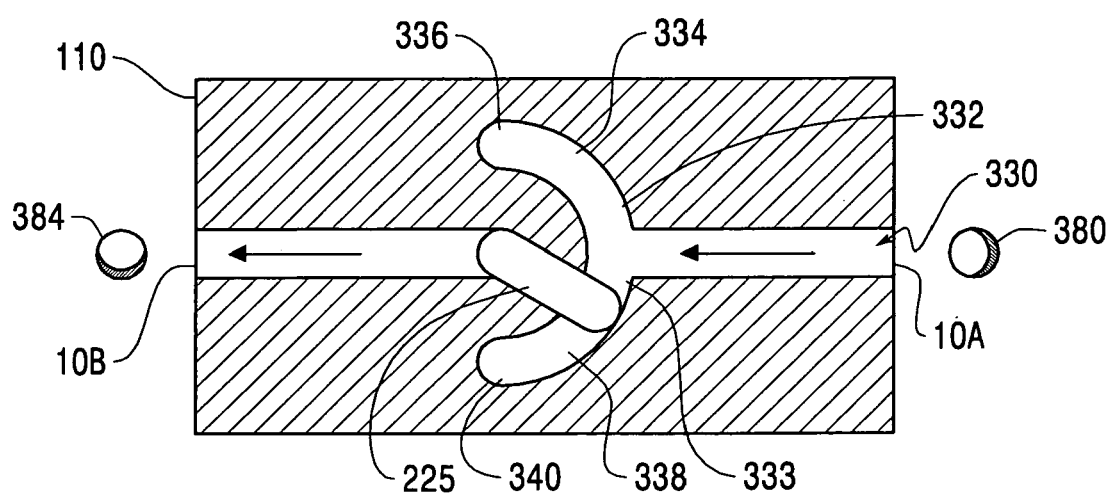

FIGS. 29-30 show two variations of repositioning connecting runner portion 225 in order to meet with runner portion 10A along the intermediate section 338 and 334, respectively, of the interconnecting area of runner portion 10A. When the mold insert half 220 is rotated to the position shown in either FIG. 29 or FIG. 30, laminar flowing material travels from the first end of runner portion 10A, beginning at end 330, through intermediate section 338 or 334, respectively, into connecting runner portion 225 and out of the second end of runner portion 10B. The result of this flow path is approximately 90° circumferential laminar fluid flow rotation, as represented by cross sections 384 and 385. For example, if the high shear region is initially on the bottom, the high shear region may be rotated (i.e., repositioned) to the left or right side after flow diversion.

Figure 31:
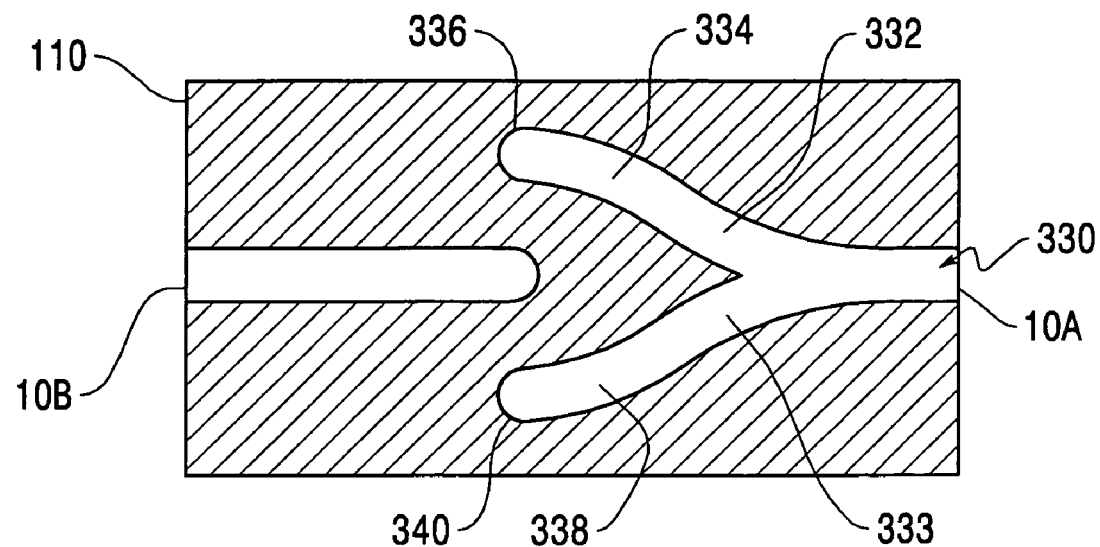
FIGS. 31-32 are top views of alternative designs for the first mold insert half in which a compound radiused Y branch and a simple Y branch are used.
Figure 32:
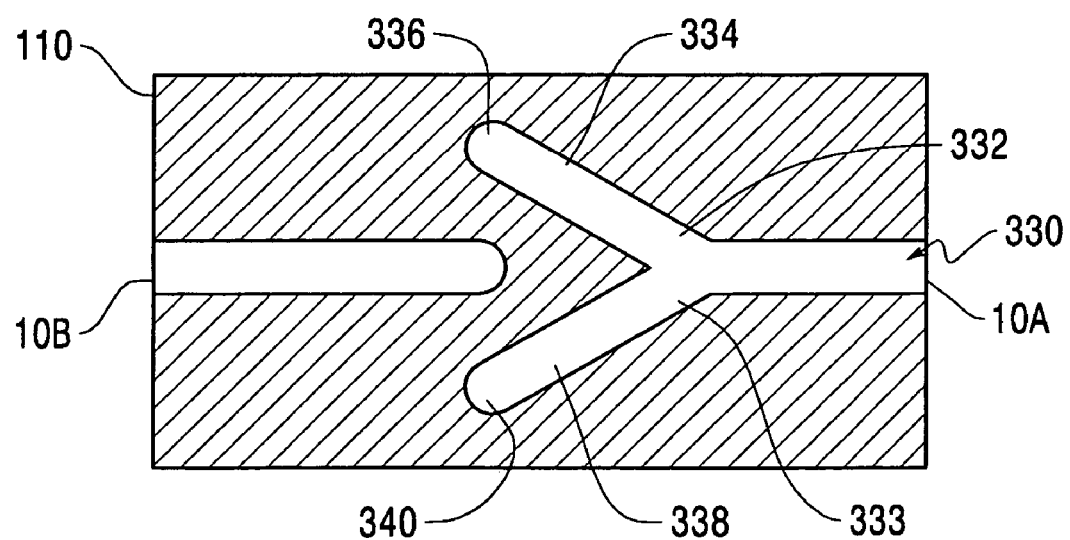

As shown in FIGS. 29-30, rotation of mold insert half 220 to some position greater than 0°, but less than approximately 30° relative to the orientation shown in FIG. 26 may generate a laminar fluid flow rotation of approximately 90°, as shown by cross sections 384 and 385. However, as shown in FIGS. 27-28, an additional 60° or more rotation (total of about 90° or more) insert rotation is required in order to generate an additional 90° laminar fluid flow rotation. Similar to cross sections 382 and 383, the rotations generated in cross sections 384 and 385 are also produced using opposite directional insert rotation and laminar fluid flow rotation. The result is a non-linear relationship of insert rotation to laminar fluid flow rotation with these designs having binary arcuate flow paths, which may lend itself to design alterations as shown in FIGS. 31-32.

Numerous variants of runner portion 10A are possible. For example, as shown in FIG. 31, runner portion 10A includes a binary compound radiused Y branching. FIG. 32 shows an optional design where runner portion 10A includes a simpler binary Y branching with no radiused portions. These variants of runner portion 10A can be used to adjust the relationship between mold insert rotation and laminar fluid flow rotation. These designs generate a more evenly proportioned ratio of insert rotation to laminar fluid flow rotation. These designs, or variations of them, can be employed so that an insert rotation of 45°, relative to the orientation shown in FIG. 25, generates a 90° laminar fluid flow rotation, while doubling the insert rotation to 90° generates double the laminar fluid flow rotation, totaling 180°.

Figure 33:
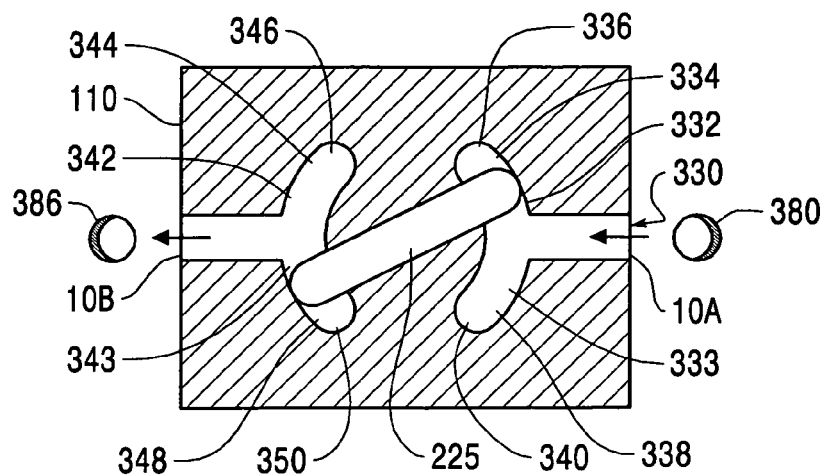
FIG. 33 shows a top view of yet another embodiment of first and second mold halves combined in an exemplary position (with the lower first mold half being omitted for clarity)

Numerous variations of runner portions 10A, 10B, and connecting runner portion 225 are possible. For example, connecting runner portion 225 can be extended in straight line, as shown in FIGS. 24-30, or in an L or V shape and the divergent interconnecting area of the runner portion 10A can be mirrored on the opposite side as shown in FIG. 33. Further, the divergent interconnecting area of a runner portion could have variations in its path to provide for multiple gradations in its rotation with the radial positioning of the mating 220 mold insert.

Designs such as the one shown in FIG. 33 provide for a smaller insert rotation to generate a larger laminar fluid flow rotation when compared to the designs in FIGS. 24-32. The reduction in required rotation of insert 220 could reduce the size of the insert. For example, an approximately 30° clockwise insert rotation may generate the approximately positive 180° laminar fluid flow rotation shown by cross section 386, while an approximately 30° counterclockwise insert rotation may generate an approximately negative 180° laminar fluid flow rotation. The ability to provide a positive and negative 180° rotation of the laminar flowing material provides up to a full 360° control of the rotational positioning of the laminar flowing fluid.

In the descriptions of FIGS. 26-33, the amount of rotation of insert half 220 needed to achieve a given rotation of the laminar fluid is only approximated. The actual rotation would be dependent on the size, shape, and relative positioning of the interconnecting area of runner sections 10A and 10B, and of connecting runner section 225.

Figure 34:
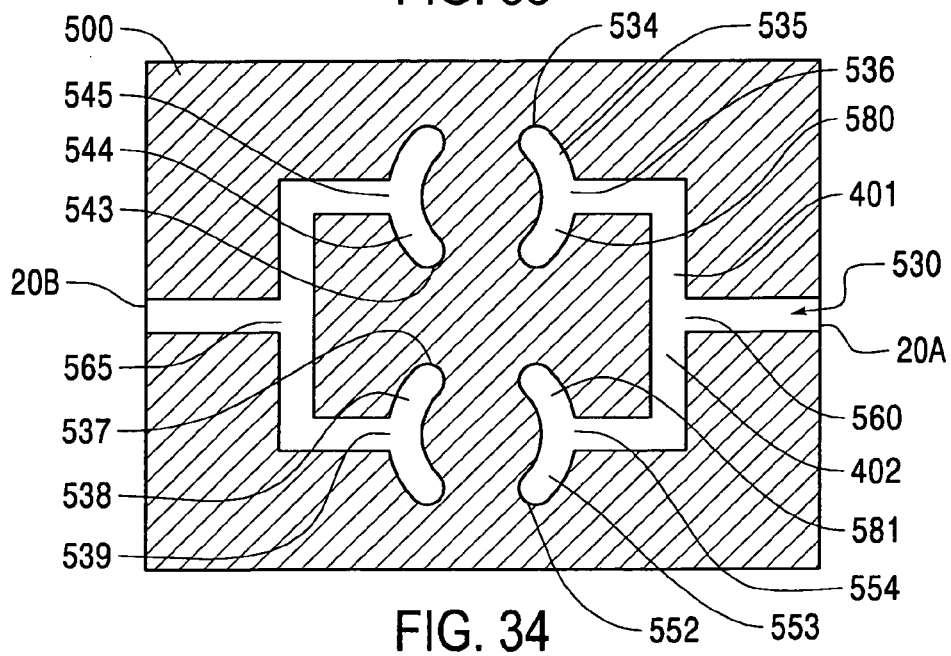
FIG. 34 is a top view of a first mold insert half according to a further embodiment in which there are two branched runner portions.
Figure 35:
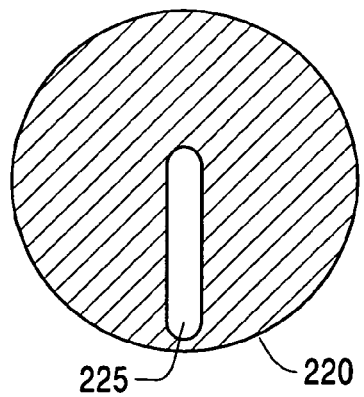
FIG. 35 is a bottom view of a second mold insert half for use with the mold half of FIG. 34 (two would be used)

Exemplary embodiments provide an adjustable rotation control of non-homogeneous distributed laminar fluid conditions using an inline fluid rotation device structure that can be located along the length of a runner, such as intermediate the length of the runner or at a part forming cavity entrance. The following describes its application in the strategic positioning and asymmetrically distribution of laminar fluid condition. FIG. 34 illustrates a first mold insert half 500 that defines runner portions 20A and 20B of an inline runner section. Runner portion 20A is comprised of melt feed portion beginning at 530 which branches at intersection 560 into two branching runner portions 401 and 402, each of which then exit into binary arcuate flow paths. Runner portion 401 feeds into a first binary arcuate flow path having a first arcuate flow path which includes ends 536, 534, and intermediate section 535 that forms a portion of a first interconnecting area of runner portion 20A, and a second arcuate flow path which includes the intermediate section 580 that completes the first interconnecting area. Runner portion 402 feeds into a second binary arcuate flow path having a first arcuate flow path which includes the intermediate section 581 and a second arcuate flow path includes ends 554, 552, and intermediate section 553 that together form a second interconnecting area of runner portion 20A. FIG. 35 illustrates one of a pair of a second mold insert half 220 that defines a connecting runner portion 225.

FIGS. 36-39 illustrate mold halves 500 and a pair of mold insert halves 220 assembled together so that the connecting runner portions 225 unite runner portions 20A and 20B, thereby forming a continual runner flow path. For ease of illustration, mold insert half 220 is omitted so that the runner path can be better shown, and the connecting runner portion 225 is shown superimposed over mold half 500.

Figure 36:
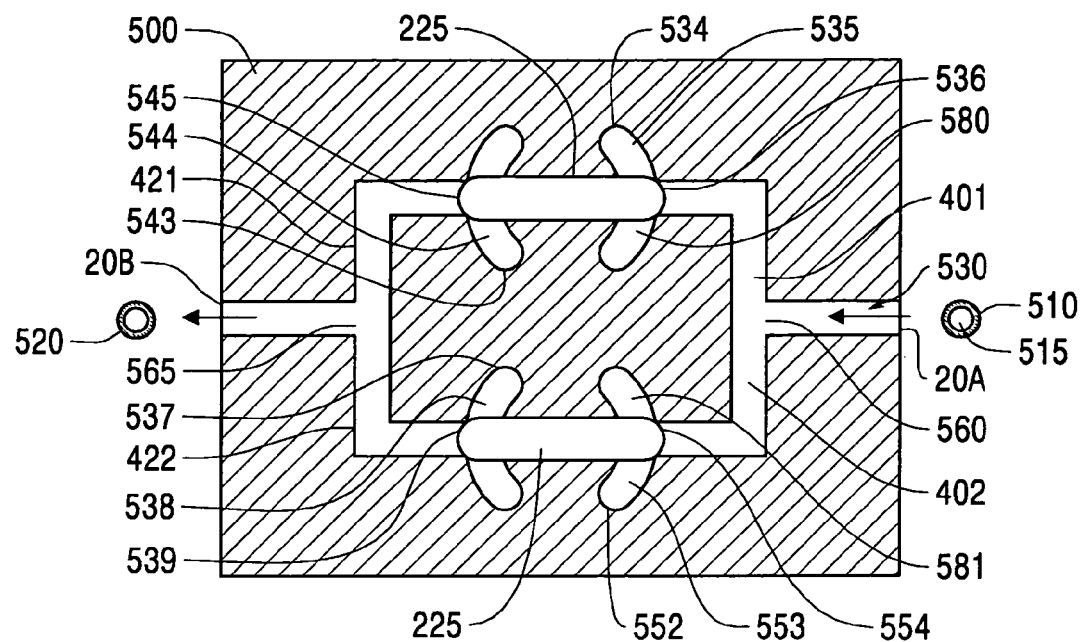
FIG. 36 is a bottom view of the first and second mold insert halves of FIGS. 34-35 combined (with the lower insert mold half being omitted for clarity) in a first position and with the melt entering the runner 20A with non-homogenous symmetrical conditions.

FIG. 36 shows a condition in which the mold halves are in a first relative position, with insert 220 at a zero degree rotation. In the position shown in FIG. 36, laminar flowing material travels from the first end of runner portion 20A, beginning at end 530, splitting at intersection 560, into branching runner portions 401 and 402. The flow exiting branching runner portion 401 intersects with the first binary arcuate flow path and connecting runner portion 225. The first and second portions of the first binary arcuate, including intermediate sections 535 and 580 that form an interconnecting area for runner portion 20A, are quickly filled with laminar flowing material and flow ceases within these portions. Flow through connecting runner portion 225 provides a continuous flow path for the laminar flowing material. Material exiting the first branching runner portion will change elevation, relative to the view shown, as it enters connecting runner portion 225 located on the second mold half 220. The laminar flowing material will exit connecting runner portion 225, changing elevation as it returns to mold half 500, and continue to flow to intersection 565 where it will recombine with the laminar flowing material, that had split into branching runner portion 402, and exit. The combined laminar flowing material will then flow into an interconnecting area at the first end of runner portion 20B, and finally, out of the second end of runner portion 20B. The result of flowing through the geometries as described will be an approximate 0° circumferential laminar fluid flow rotation. The material will have approximately the same distribution of material properties exiting runner portion 20B as it did when it entered runner portion 20A.

For reference, a cross section of symmetrical laminar fluid flow conditions entering the first end of runner portion 20A is illustrated having a high sheared material around the perimeter 510 and low sheared material 515 in the center of the melt stream. Upon exiting the second end of runner portion 20B, a cross section 520, displays the same symmetrical laminar fluid flow conditions revealing that the relative position of the laminar fluid flow conditions entering and exiting the assembled mold halves have not changed.

Figure 37:
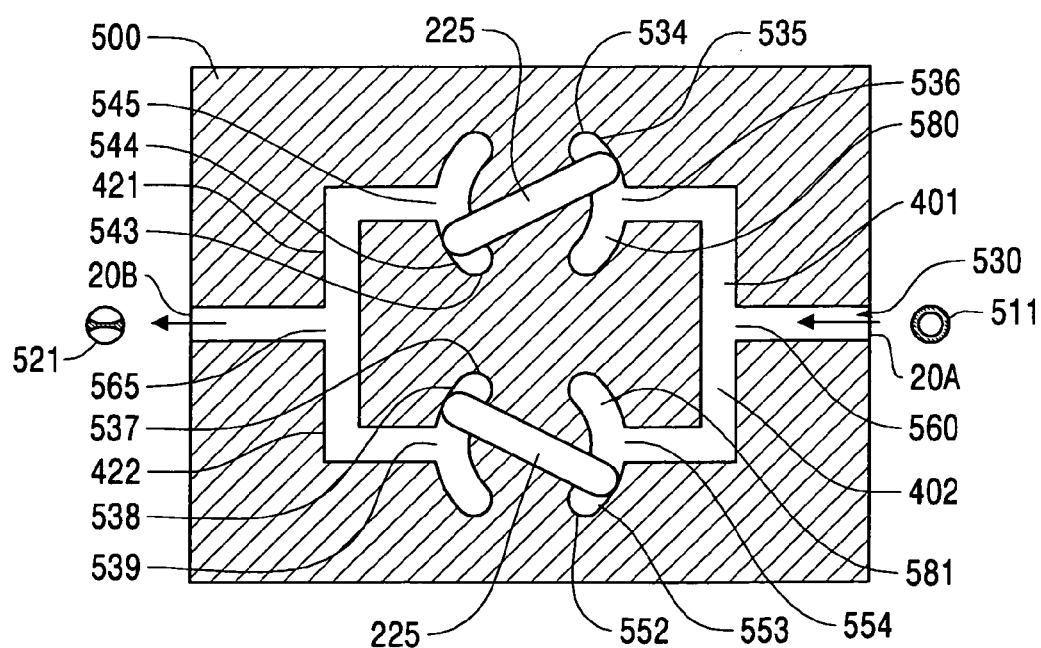
FIG. 37 is a bottom view of the first and second mold insert halves of FIGS. 34-35 combined (with the lower insert mold half being omitted for clarity) in a second position and with the melt entering the runner 20A with non-homogenous symmetrical conditions.

FIG. 37 shows conditions in which the second mold insert half 220 is rotated approximately 30° relative to the 0° position shown in FIG. 36. The 30° rotation of mold insert half 220 is counterclockwise for the top binary arcuate flow path and clockwise for the bottom binary arcuate flow path. When the second mold halves 220 are rotated to the positions shown in FIG. 37, laminar flowing material travels from the first end of runner portion 20A, beginning at end 530, and splits symmetrically in half at intersection 560 into branching runner portions 401 and 402. The melt traveling through branching runner portion 401 enters the first binary arcuate flow path and flows with a continuing flow into the first arcuate flow path beginning at end 536, through a portion of the intermediate section 535 of one interconnecting area of runner portion 20A. The melt will then change elevation, relative to the view shown, and then change flow directions as it enters connecting runner portion 225 located on the second mold half 220. The compound change in flow direction created by the change in elevation and the relative 90degree flow direction of the first portion of the arcuate flow path, beginning at 536 and ending at 534, to the connecting runner portion 225, will cause the melt to be repositioned by approximately 90 degrees in the circumferential direction, relative to its position in the first branching runner portion. The laminar flowing material will exit connecting runner portion 225, changing elevation as it returns to mold half 500, and flow direction as it flows through a portion of intermediate arcuate section 544 of an interconnecting area of runner portion 20B. The compound change in flow direction created by the change in elevation and the relative 90 degree flow direction of the connecting runner portion 225 the portion of the arcuate flow path, beginning at 543 and ending at 545, will cause the melt to be repositioned by approximately an additional 90 degrees in the circumferential direction, relative to its position in the first branching runner portion 401. The approximate 90 degree rotation of the melt stream resulting in the connecting runner portion 225 and the additional approximate 90 degree rotation of the melt stream resulting in the intermediate portion 544 of the arcuate runner section, will cause the melt exiting the arcuate flow path at 545 to have been rotated approximately 180 degree in the circumferential direction relative to its original position in the branching runner portion 401. The melt then exiting from the arcuate flow path at 545 will combine with the melt which had branched into runner portion 402 at intersection 565. If the connecting runner portion 225 were rotated approximately 30 degrees in a clockwise direction, as shown in FIG. 37, the melt approaching intersection 565 from runner portions 421 and 422 will have been rotated in a counterclockwise direction approximately 180 degrees. Upon merging the two melt streams at intersection 565, the high sheared materials, originally around the perimeter of the flow channel 20A, will have been repositioned as shown in cross section 521.

Each of the four arcuate flow paths is capable of generating laminar fluid flow rotation within a range of 0° to 180°. Each of the two binary arcuate flow paths generate a means to rotate the laminar fluid flow in a range of 0° to 180° in either the clockwise or counterclockwise directions, dependant on the positioning of the connecting runner portions 225. Given the counter clockwise positioning of the top connecting runner portion 225, shown in FIG. 37, the melt will be rotated approximately 180 degrees in the counterclockwise direction as referenced from the direction of flow. The clockwise positioning of the lower connecting runner portion 225 will cause the melt to be rotated approximately 180 degrees in the clockwise direction as referenced from the direction of flow.

Figure 38:
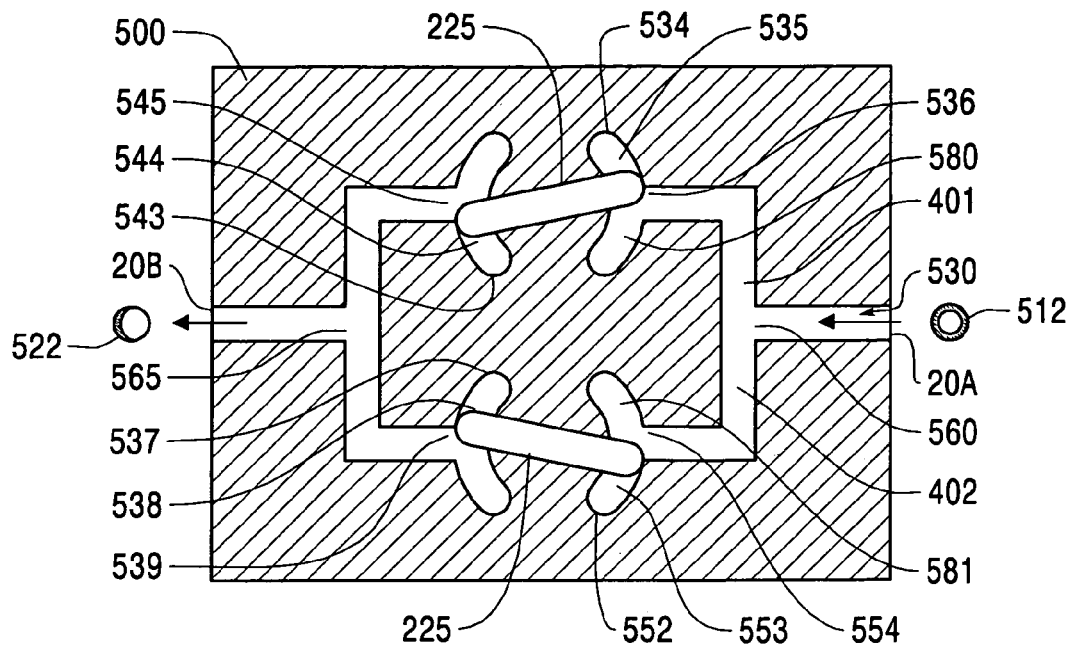
FIG. 38 is a bottom view of the first and second mold insert halves of FIGS. 34-35 combined (with the lower insert mold half being omitted for clarity) in a third position and with the melt entering the runner 20A with symmetrical non-homogeneous conditions.

As seen in FIGS. 36-38, the use of the connecting runner portions 225 is not limited to any particular position. Rather, it is possible to incrementally rotate each mold insert half 220 so that the outer, first end, end of the connecting runner portions 225 meets with runner portion 20A anywhere along the intermediate arcuate sections 535, 580, 553 and 581 of the interconnecting areas of runner portion 20A. By this infinite adjustability, flow repositioning within a range of approximately counterclockwise 180° to clockwise 180° circumferential rotation can be achieved inline of an individual runner, anywhere along its length. This allows for an additional adjustable control mechanism to fine tune the positioning of melt property variations in a laminar fluid flow as it travels along the runner to correct for melt imbalance which may result at a downstream branching runner or to obtain other desirable positioning for purposes such as to control the distribution of melt conditions within a downstream part forming cavity or cavities.

FIGS. 36-38 show three variations of repositioning connecting runner portion 225 in order to meet with runner portion 20A along the intermediate sections 535 or 580, and 553 or 581. Mold insert half 220 can be rotated to infinitely many positions along these intermediate runner sections in order to manipulate the rotation of the laminar fluid flow to the desired positioning.

FIG. 38 shows the connecting runner portions being rotated to a position which would cause the melt variations represented by symmetrical position of the dark regions in cross section 512 to be repositioned to an asymmetrical top position as shown in cross section 522. This would require an approximate 90 degree clockwise rotation of the melt from its original position on the right side of runner section 401 and an approximate 90 degree counterclockwise rotation of the melt from its original position on the left side of runner section 402.

Figure 39:
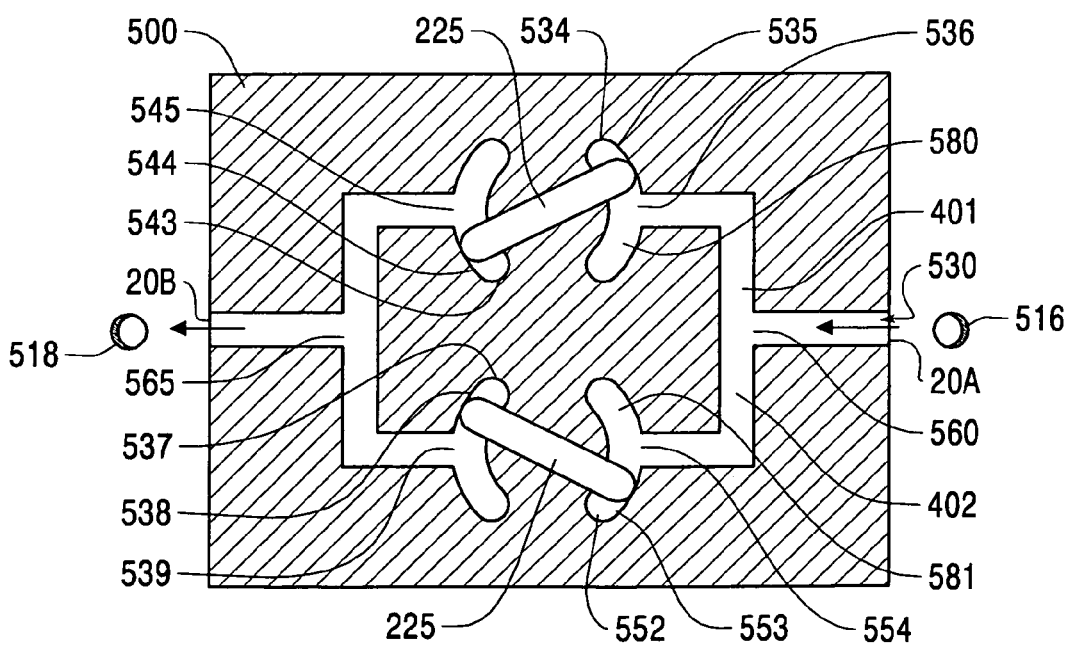
FIG. 39 is a bottom view of the first and second mold insert halves of FIGS. 34-35 combined (with the lower insert mold half being omitted for clarity) in the second position (the same as in FIG. 37), but with the melt entering the runner 20A with non-homogenous asymmetrical conditions.

FIG. 39 shows a variation of the application of this invention where the melt entering runner section 20A has the asymmetrical conditions shown in cross section 516. By controlling the rotational position of the melt stream, as previously described in FIG. 37, the two halves of the melt stream will be rotated 180 degrees such that when the are recombined, the asymmetric top to bottom conditions shown in cross section 516 will be repositioned 180 degrees as shown in cross section 518.

In the descriptions of FIGS. 34-39, the amount of rotation of insert half 220 needed to achieve a given rotation of the laminar fluid is only approximated. The actual rotation would be dependent on the size, shape, and relative positioning of the various runner sections, 10A, 10B, 20A, and 20B, and of connecting runner section 225. The rotation of inserts 220 in FIGS. 21-39 can be actuated manually from the face of the mold through direct manipulation of the insert 220 or indirectly through a gear mechanism or by some other means. Additionally the rotational motion can be controlled through a manual, motor or linear drive means using gears or rack and pinion methods which could be mounted internal to the mold or external to the mold.

The additional control gained with two binary arcuate flow paths opposed to one, as presented in FIGS. 24-33, is the ability to split the laminar fluid flow stream into two separate streams. The laminar fluid flow rotations of these two streams can then be independently, or dependently, controlled. The two laminar fluid flow streams can then be rotated to mirror one another, or both rotated in the same clockwise or counter clockwise direction, or rotated to various positions which are totally independent of one another. The flow streams may then be recombined and exit at 20B.

The flow geometry within mold insert half 500 can be, but does not necessarily have to be, fabricated directly into a mold body or may be included within an insert. As with mold insert half 500, the flow geometry within mold insert half 220 would typically be, but is not required to be, positioned within a mold insert to allow for rotation relative to mold half 500.

The flow geometry used in all of the above mold insert halves can be utilized in either hot or cold runner molds and in molds having solidifying or non-solidifying runners. Designs such as the ones shown above provide for a greater control of melt positioning. In these designs, the melt can be split into two, rotated equally or variably and rejoined to form a melt with the desired fluid flow rotation and melt condition positioning.

Figure 40:
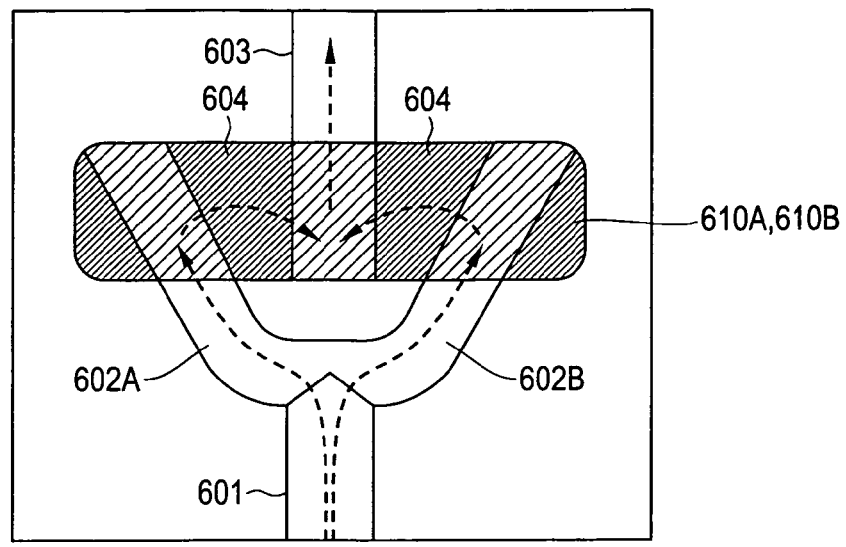
FIGS. 40-44 are further variations of a melt positioner using a branching "Y" runner and a pair of movable inserts that split.
Figure 41:
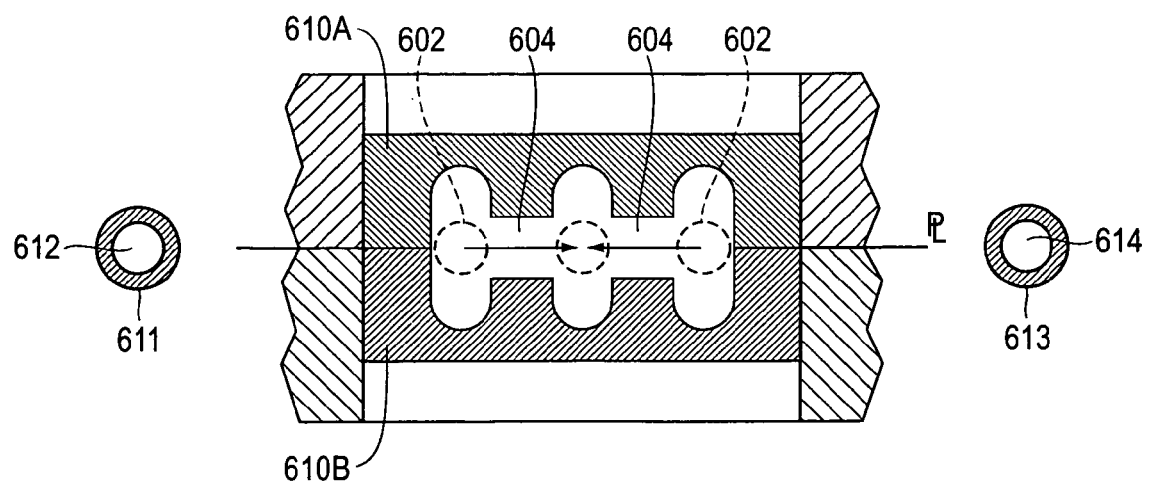
Figure 42:
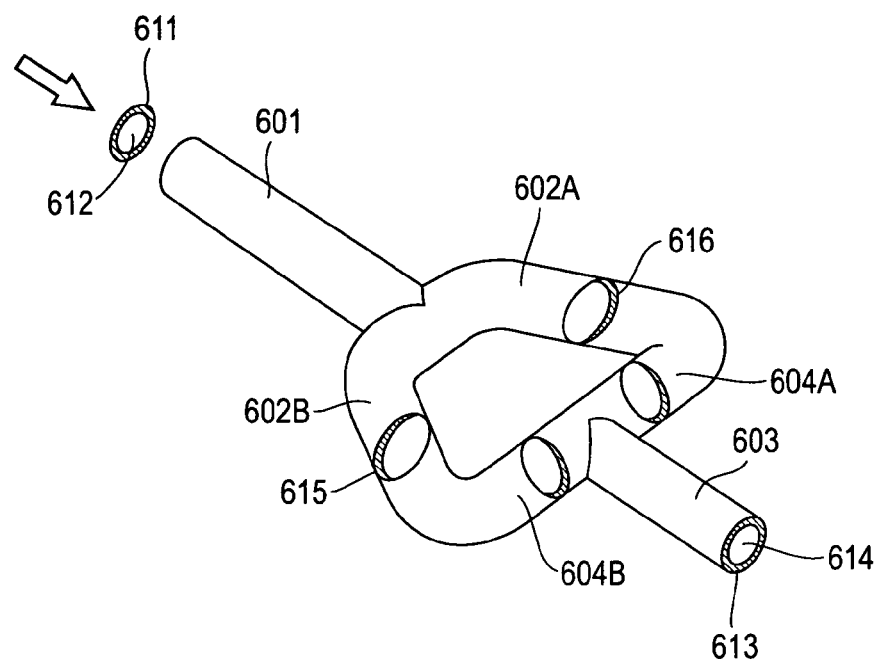

The above embodiment is only one example of a means to provide adjustable control of the position and distribution of the variations in melt conditions existing in a stream of laminar flowing fluid. FIGS. 40-42 are further variations of the above melt positioner. This design uses a pair of movable inserts, 610A and 610B, which move approximately perpendicular to a plane defined by the centerline of the path of two flowing streams of laminar flowing material which intersect the pair of movable inserts. In a cold runner system, the inserts could be moved in a direction approximately perpendicular to the parting line of the mold where the molds runner system travels. Melt approaches the pair of movable inserts along runner portion 601. The melt is then split into the two "Y" branching runner portions 602A and 602B. If the melt approaching the branching "Y" runner portions has a distribution of high sheared melt around the perimeter of the flow channel 611 and low sheared melt in the center 612, as shown in FIGS. 41-42, the high and low sheared material will be split and redistributed such that the high sheared material is positioned to the left side 616 of the left branch of the "Y" branching runner 602A and to the right side 615 of the right branch of the "Y" branching runner 602B. At the exit of the two branching runner portions 602A and 602B, the melt enters the flow geometry created between the pair of movable inserts 610A and 610B. The position of the pair of movable inserts will control the initial direction that the material flows as it exits the two "Y" branching runner portions. When the paired movable inserts are positioned such that they create a flow channel along a same plane as the two "Y" branching runner portions and the first portion of an exiting runner portion 603, the position referred to here as the "neutral position," the melt will exit each of the two "Y" branching runner portions and turn directly toward the entrance of runner portion 603 along a converging flow channel 604 and exit through runner portion 604 without making any elevation changes. The result is that the melt exiting through runner portion 604 will have nearly the same distribution of high 613 and low 614 sheared material conditions as the melt entering through runner portion 601.

Figure 43:
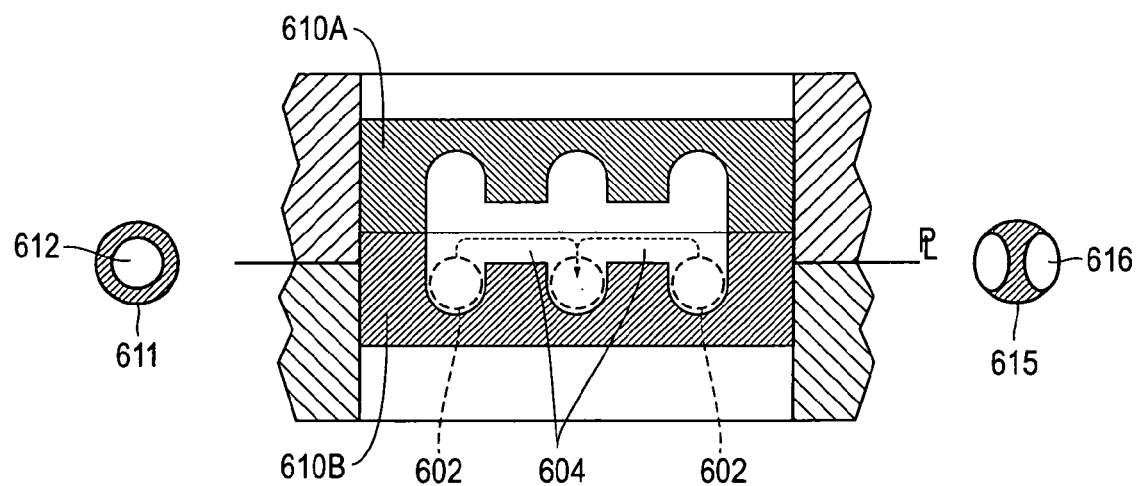
Figure 44:
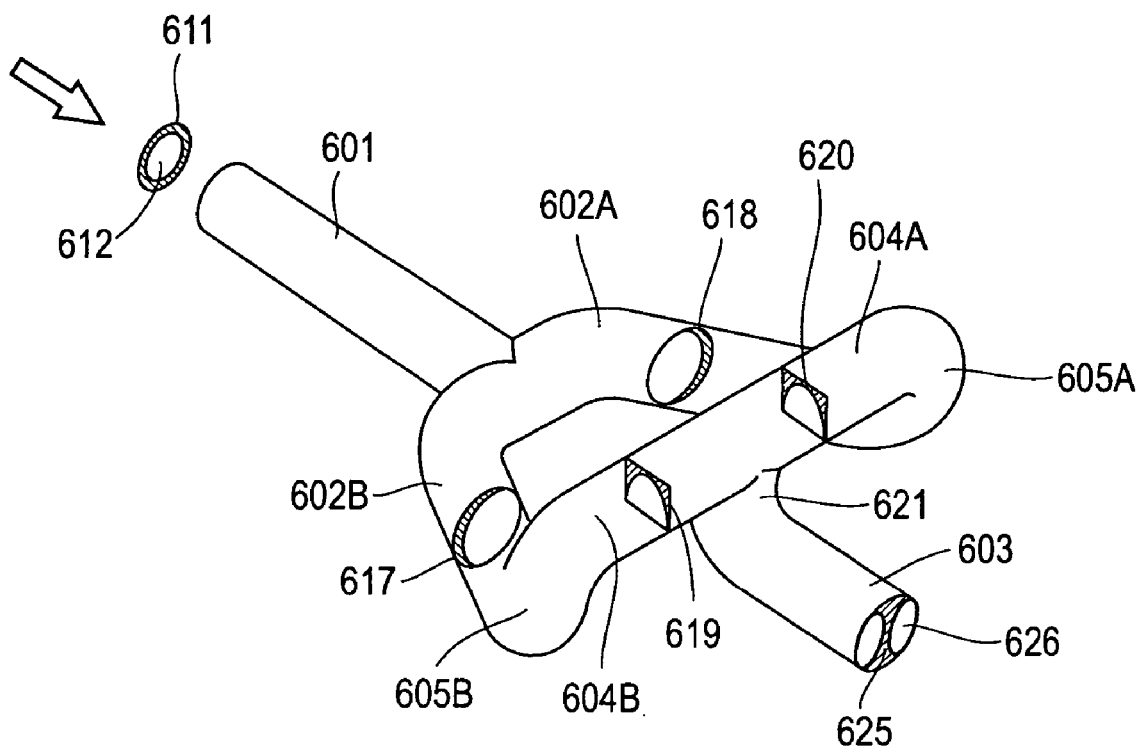

With the pair of movable inserts in its upper most position (FIGS. 43 and 44), the flow channel will be modified such that the melt exiting the two "Y" branching runner portions will travel in the upward direction along a first 605A and second 605B height adjustment flow path, approximately 90 degrees relative to a reference plane defined by the centerline of the "Y" branching runners 602A and 602B. The melt will then exit the height adjustment flow paths 605 and make a second directional change, approximately 90 degrees relative to both runner portion 602 and flow path 605, into the melt converging flow channel 604. The compound angle changes in the melt flow direction between the entrance and exit of the height adjustment flow path 605A will cause the melt in the left portion of the converging flow channel 604A fed from the left branch of the "Y" branching runner to be rotated in a circumferential direction approximately −90 degrees relative its position in the left branch of the "Y" branching runner such that if high sheared laminates were traveling along the left side 618 of the left branch of the "Y" branching runner they would now be on the top side 620 of the left portion 604A of the converging flow channel.

The compound angle changes in the melt flow direction between the entrance and exit of the height adjustment flow path 605B will cause the melt in the right portion of the converging flow channel 604B fed from the right branch of the "Y" branching runner to be rotated in a circumferential direction approximately 90 degrees relative its position in the right branch of the "Y" branching runner such that if high sheared laminates were traveling along the right side 617 of the right branch 602B of the "Y" branching runner they would now be on the top side 619 of the right portion 604B of the converging flow channel.

The melt in the left and right portions of the converging flow channel, will converge into a single flow path traveling downward along a third height adjustment flow path 621, in a direction which is approximately 90 degrees relative to a reference plane defined by the centerline of the "Y" branching runners. Laminar flow conditions will result in the melt from the left portion of the converging flow channel 604A to flow along the left side of the height adjustment flow path 621 and the melt from the right portion of the converging flow channel 604B to travel along the right side of the height adjustment flow path. The high sheared material traveling along the top of the converging flow channel portions will become positioned along the center of the third height adjustment flow path 621 as shown as 625 exiting runner portion 603. At the exit of the third height adjustment flow path 621 the melt will make an approximate 90 degree turn relative to the direction of the third height adjustment flow path and the converging flow channel into a runner portion 603. These compound angle change between the entrance and exit of the height adjustment flow path will cause the melt in the left and right side of runner portion 603 to be rotated in a circumferential direction approximately plus and minus 90 degrees relative to its earlier position in the converging flow channels 604 and 180 degrees relative to its original position in runner portion 601. The high sheared material originally around the perimeter 611 of the melt stream is now positioned 625 along a center reference plane defined by the center line of the height adjusting flow path 621 and the runner portion 603 and the low sheared material originally in the center 612 of the melt stream of runner portion 601 is now positioned on the opposite outward sides 626 of the flow channel 603 along the same reference plane.

By positioning the pair of movable inserts 610A and 610B such that they are positioned between the uppermost position (described above) and the neutral position, the direction of flow between the entrance and exit of the height adjustment flow paths 605 and 621 will be modified relative to the neutral position and the uppermost position causing the amount of rotation of the melt stream to be altered. By this means of modifying the direction of flow through adjusting the height of the pair of movable inserts, the amount of rotation, and the final distribution of the high and low sheared material within the melt flowing through runner channel 603 can be controlled.

By positioning the pair of movable inserts 610A and 610B such that they are positioned below the neutral position, the directions of flow in connecting runner portions 605 and 621 will be opposite to that achieved by positioning the pair of adjustable inserts in the upper position. This will cause the repositioning of the melt to be in the opposite circumferential direction as described when the inserts were in the upper position.

The angle between runner portions 602 and 605; 605 and 604; 604 and 621 can be modified to effect the melt rotation that is created in this invention.

Figure 45:
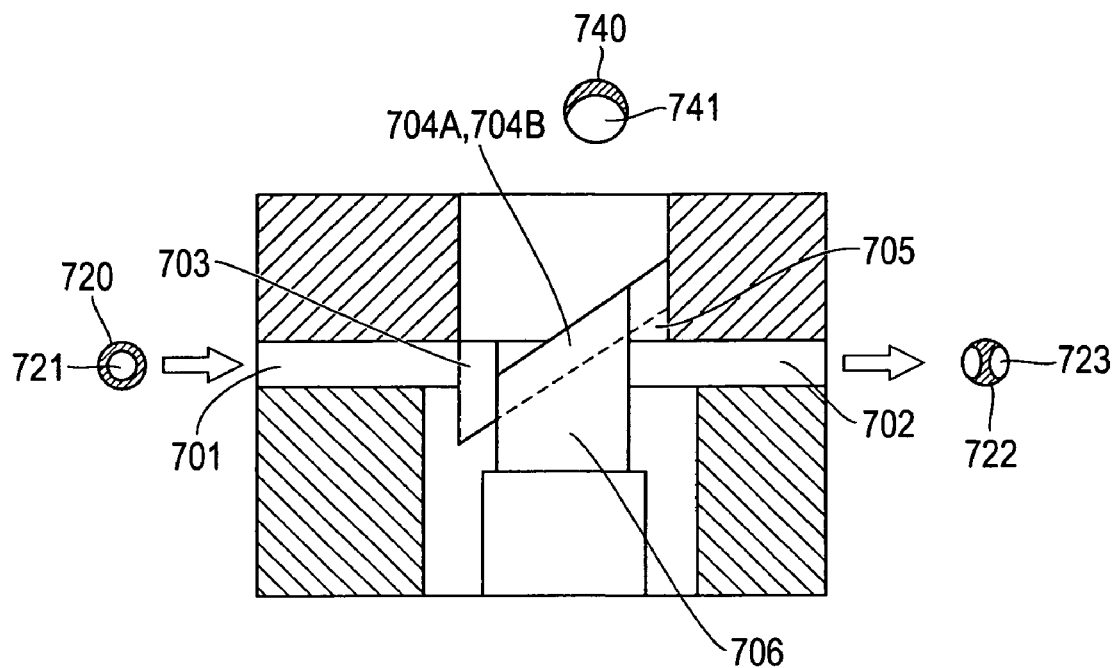
FIG. 45 is a cross-sectional view of an another embodiment of an adjustable melt flow diverter device in a first position.
Figure 46:
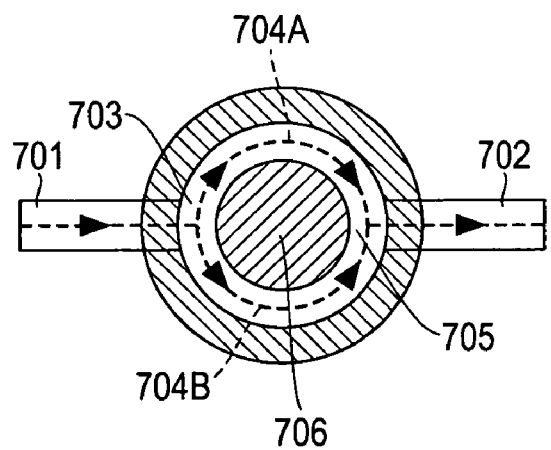
FIG. 46 is a top view of the adjustable melt flow diverter device of FIG. 45.

A further embodiment of this invention is shown in FIGS. 45-46. FIG. 46 is a top view of portions of FIG. 45. FIGS. 45-46 show a representation of a method for managing the distribution of melt variations that may exist across the channel of a laminar flowing material. In the case of a flowing material with high sheared melt conditions distributed circumferentially around the perimeter 720 and the low shear material positioned in the center 721 of the flow channel, material entering flow channel 701 exits into channel 703 where in FIG. 45 it flows downward vertically, and then relative to FIG. 46, the flowing material exits channel 703 and branches left and right into two arcular runner portions 704A and 704B, the inner radius of these arcular runner portions created by a retractable circular pin 706. The branching of the laminar flowing material at the exit of 703 will divide the flowing material into the two arcular runner portions 704A and B. This will cause the high sheared materials 720 originally around the perimeter of the melt entering through 701 to be rotated approximately 90 degrees such that the high sheared material around the left half, relative to the left branching arcular runner, of the perimeter of flow channel 701 is now positioned on the top 740 of the laminar flowing melt stream flowing through the left branching arcular runner portion 704A. The high sheared material around the right half, relative to the right branching arcular runner, of the perimeter of flow channel 701 is now positioned on the top 740 of the laminar flowing melt stream flowing through the right branching arcular runner portion 704B. The low sheared material originally in the center of melt entering through 701 will be rotated approximately 90 degrees such that it is now positioned on the bottom 741 of the two laminar flowing melt streams flowing through the arcular runner portions 704A and B. At the end of the arcular runner portions the melt will recombine at the entrance of a vertical flow channel 705. The approximately 90 degree change in flow direction as the laminar flowing material flows from the two arcular runner portions 704A and B into the vertical runner portion 705 causes the high sheared material positioned on the top of the arcular runner portions to be positioned along the center of the runner portion 705. Upon exiting the vertical runner portion 705 and entering 702, the high sheared material originally positioned around the perimeter of the melt stream entering through runner portion 701 will have been rotated approximately 180 degrees such that it is positioned along a vertical plane that divides the flow path 702 with the high sheared material 722 along the center of the flow path and the low sheared material 723 along the outer left and right sides of the flow path. The effect is that the high sheared material along the left and right side of the perimeter of the flow channel 701 has been rotated counterclockwise by approximately 180 degrees within each of the two flow branches such that when recombined they are now positioned along the center of the flow channel.

The amount of rotation can be affected by the length of runner portions 703 and 705 and the shape of the center adjustable pin. Shortening runner portion 703 to a zero length will significantly eliminate the flow angle change at the intersection of runner portion 701 and 703 such that there is virtually no rotation of the melt stream. Melt conditions on the left half of the runner portion 701 will remain on the left half of the left branching arcular runner portions 704A and melt conditions on the right half of the runner portion 701 will remain on the right half of the right branching arcular runner portions 704A. Similarly, shortening runner portion 705 to a zero length will significantly eliminate the flow angle change at the intersection of runner portion 705 and 702 such that virtually no rotation of the melt stream results. Melt conditions on the left and right side exiting arcular runner portions 704A and B will remain significantly on the left and right side portions of the combined melt stream flowing through runner portion 702.

Alternate geometries, which decrease any of the flow angle changes, will decrease the amount of circumferential rotation of the melt. In some cases it may not be necessary, or desirable, to rotate the melt by as much as 180 degrees in each of the split flow streams.

Figure 47:
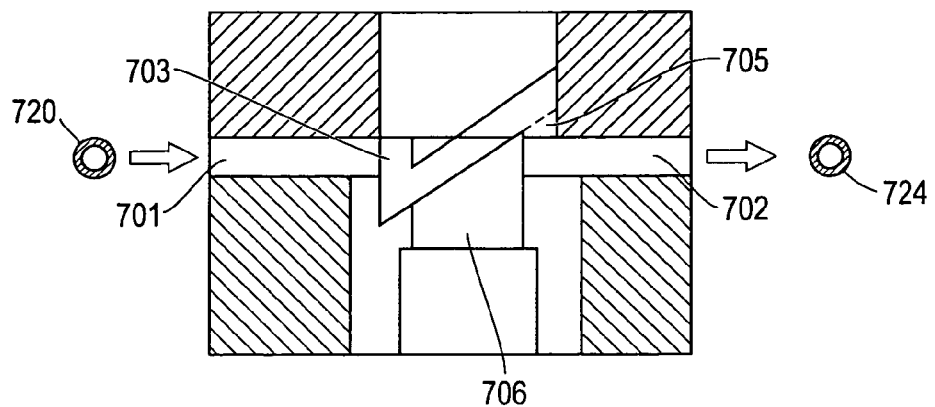
FIG. 47 is a cross-sectional view of the flow diverter device of FIG. 45 in a second position.
Figure 48:
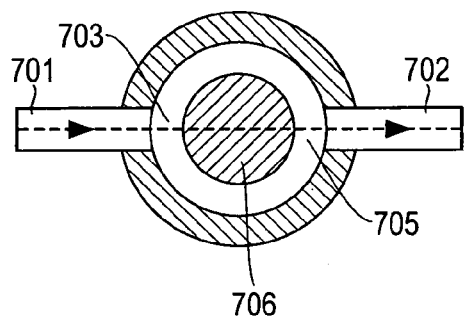
FIG. 48 is a top view of the adjustable melt flow diverter device of FIG. 47.
Figure 49:
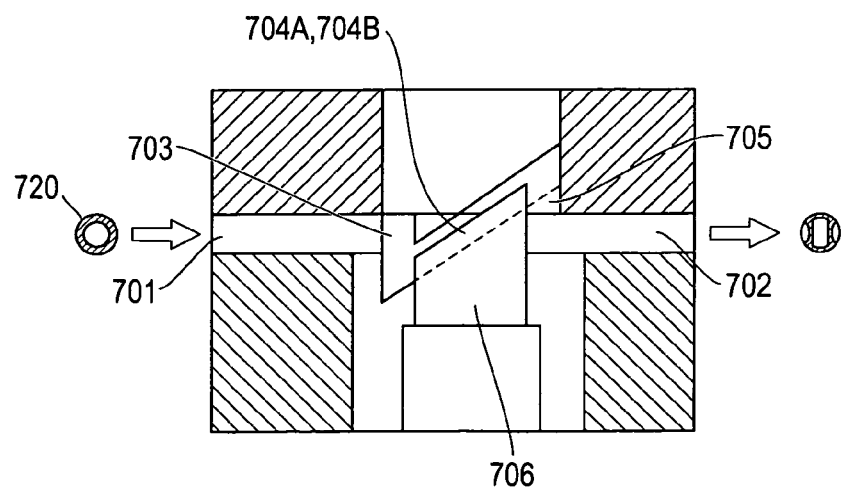
FIG. 49 is a cross-sectional view of the flow diverter device of FIG. 45 in a third position.
Figure 50:
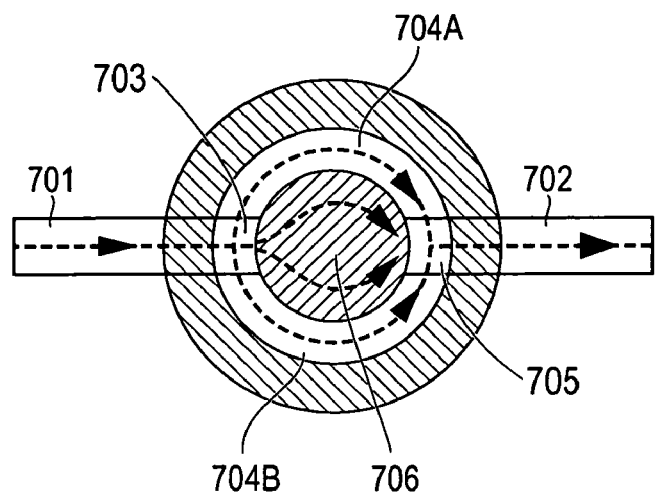
FIG. 50 is a top view of the adjustable melt flow diverter device of FIG. 49.
Figure 51:
FIG. 51 is a view showing the approximate relative distribution of the high and low sheared materials as they flow through the adjustable flow diverter device of FIG. 49.
Figure 52:
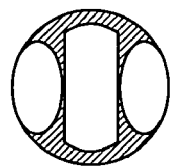
FIG. 52 is a view showing the recombined distribution.

This invention provides a means of adjusting the distribution of the high and low sheared materials by the vertical positioning of pin 706. By fully retracting the pin as shown in FIG. 47, the arcular runner portions 704A and B shown in FIG. 45, are eliminated, as their inner radius defined by the protruding pin has been eliminated. Therefore the laminar flowing material entering from runner portion 701 will fill the chamber, left by the retracted pin 706 and the remaining geometry of the former arcular flow paths, and then streamline across to runner portion 702. In contrast to the approximate 180 degree rotations achieved with the pin in the uppermost position as described above, with the pin in the lower most position there will be no circumferential rotation or repositioning of the laminar flowing fluid in runner portion 702 relative to its original position in runner portion 701. As the pin is progressively raised into the melt stream, as shown in FIG. 49, it increasingly interrupts the laminar flowing material causing portions of the melt to be diverted into the runner portions 703, arcular channels 704A and B, and runner portion 705 while portions of the laminar flowing material bypass these channels and flow across the top of the partially raised pin 706. The laminar flowing material diverted into the channels 703, arcular runner portions 704A and B, and 705 will be rotated similarly as described above in conjunction with FIG. 45. The high and low sheared laminar flowing material flowing across the top of the vertically adjustable pin will maintain their approximate relative positions. The approximate relative distribution of the high and low sheared materials as they flow through the left and right sides of the pin and across the top of the pin, is shown in FIG. 51. Once recombined, they will be distributed approximately as shown in FIG. 52. The higher the position of the pin, the more the amount of material is diverted to the outer two arcular runner portions and the more dominate their effect relative to the laminar flowing materials traveling across the top of the pin.

This invention may be applied to any laminar flowing fluid in order to achieve a desirable effect and is not limited to a melt. The invention can be applied to solidifying or non-solidifying laminar flowing fluid as might be experienced in a cold or hot runner mold used for molding plastic parts. The invention can be within a mold, die, manifold, machine nozzle, hot runner system or any other geometry that contains a laminar flowing fluid, each of which is referred to generally as a tool. The terms flow path and runner portions are interchangeable.

Referring to FIGS. 53, 110 and 120 are inserts in a cold runner mold, which when combined with a replaceable sub-insert 130 provide for melt rotation for the melt entering a branching runner 38. Sub-insert 130 may be in the form of a pin as shown having a round, square or rectangular cross-sectional shape. In this embodiment, there are a plurality of differently configured pins 130. The degree of rotation is determined by the angle of flow path shown by the arrow as it transitions between chamber 125 in the upper insert 120 and the top of the sub-insert 130 and into the branching runner 38. In this particular example, sub-insert 130 in the form of a pin is sized to fit within an opening 112 in lower insert 110. The opening may include a step, flange or other mating structure to achieve a controlled positioning and retention of the pin once fully inserted. This enables the pin to extend a precise height into chamber 125.

Aspects of the invention can also improve upon previous fixed melt rotation devices by providing adjustable melt rotation control through replacement of one or more small, easily replaced adjustment features within a melt rotation device. This replacement is significantly simpler and cheaper than remachining of the melt rotation geometry in the mold, mold insert, or hot manifold, hot nozzle or insert within the hot manifold or hot nozzle. It also requires fewer components than a single, repositionable adjustable flow diverter device with an external actuator. Examples of replaceable features might come from a stock of pre-made inserts, or sub-inserts as illustrated in FIGS. 53-55. FIGS. 53-55 are similar to FIGS. 7A-C in function. However, rather than having a single, adjustable flow diverter 130 in the form of a pin, this embodiment relies on a series of replaceable pins that can be substituted to adjust the melt rotation. It is envisioned that such a melt rotation device would consist of a mold, mold insert or manifold and a plurality of replaceable sub-inserts, each having a different profile or height to provide a differing melt rotation. hot manifold, hot nozzle or insert within the hot manifold or hot nozzle. It also requires fewer components than a single, repositionable adjustable flow diverter device with an external actuator. Examples of replaceable features might come from a stock of pre-made inserts, or sub-inserts as illustrated in FIGS. 53-55. FIGS. 53-55 are similar to FIGS. 7A-C in function. However, rather than having a single, adjustable flow diverter 130 in the form of a pin, this embodiment relies on a series of replaceable pins that can be substituted to adjust the melt rotation. It is envisioned that such a melt rotation device would consist of a mold, mold insert or manifold and a plurality of replaceable sub-inserts, each having a different profile or height to provide a differing melt rotation.

Melt rotation can be simply adjusted by opening of the mold, removal of the sub-insert 130 in the form of a pin, and insertion of another of a series of differently configured pins. For example, in FIG. 54, sub-insert 130' has been substituted, which has a lesser height than the sub-insert 130 from FIG. 53. As a result, there is a reduced flow angle, which reduces the rotation of the melt stream entering branching runner 38. A further example is shown in FIG. 55 where sub-insert 130' is the same as in FIG. 54. However, the height of chamber 125 in upper insert 120 has been reduced a similar amount as the height of sub-insert 130'. This also reduces the flow angle of the melt flow path as it transitions between the runner portion defined between chamber 125 in insert 120 and the top of the sub-insert 130' and into the branching runner 38.

This embodiment results in large cost advantages and simplicity over complete remachining of mold inserts or replacement of entire mold inserts. This is because there is the need for only a single machined mold, mold insert or insert pair or manifold having precision machined or formed flow paths and a series of readily exchangeable and inexpensive sub-inserts (e.g., pins) of various heights or profiles to achieve adjustment. Moreover, by provision of a simple flange or the like, the sub-inserts can be reliably positioned and secured, eliminating the need for a more complex adjustment mechanism.

Figure 56:
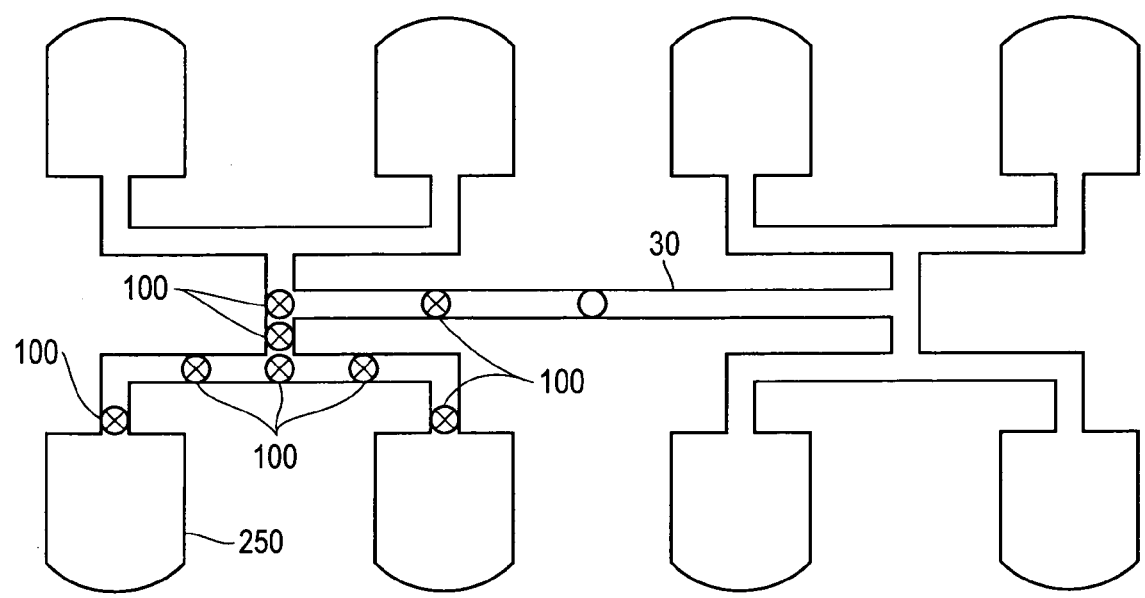
FIG. 56 is a cross-sectional view of a representative cold runner multi-cavity mold illustrating some of the potential locations of adjustable flow diverter devices.
Figure 57:
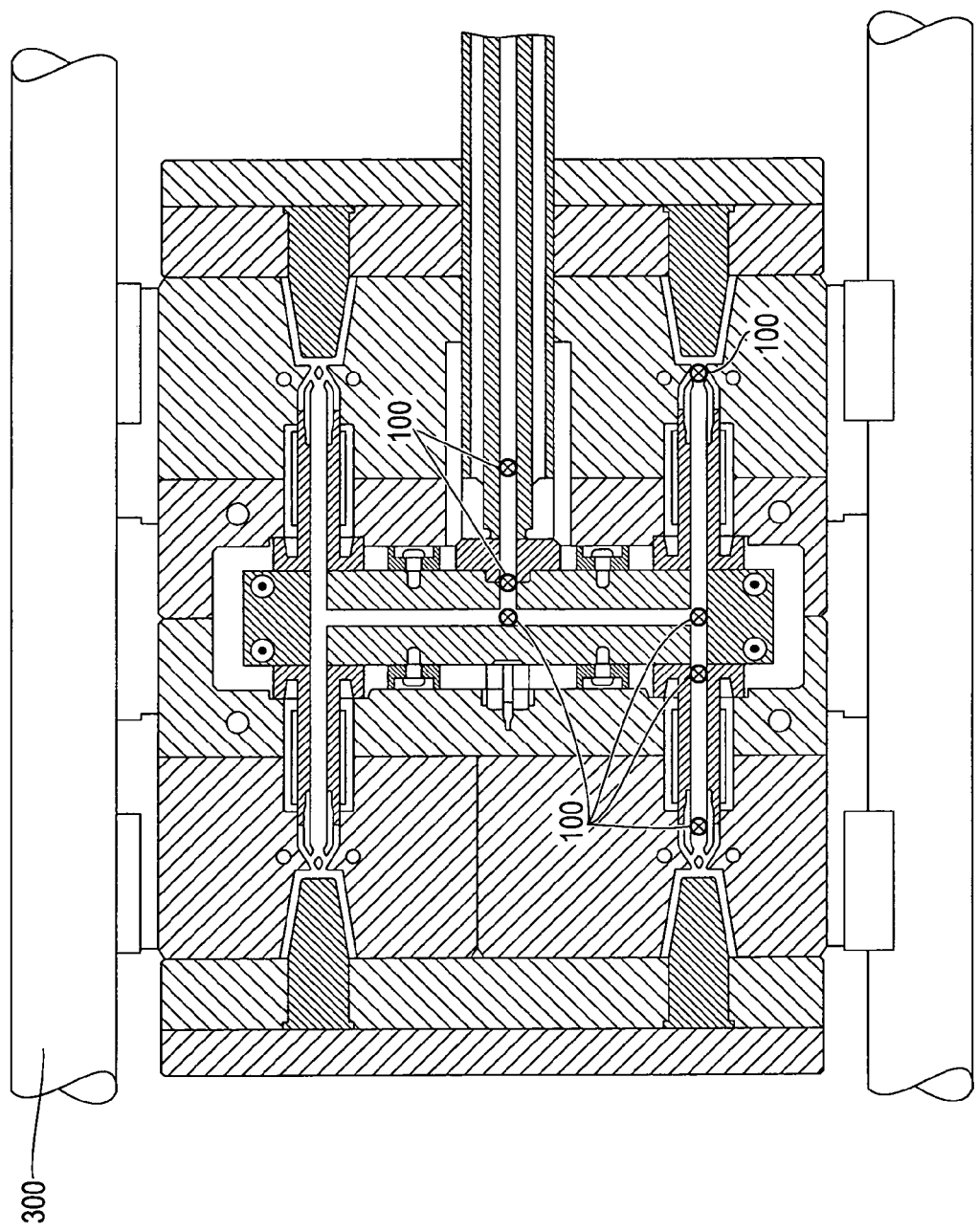
FIG. 57 is a cross-sectional view of a representative hot runner mold illustrating some of the potential locations of adjustable flow diverter devices.

As shown in FIGS. 56-57, provision of a flow diverter 100 according to any of the above embodiments is not limited to provision at a branch location. Rather, one or more flow diverters 100 can be provided anywhere in the runner system as shown. FIG. 56 shows flow diverters 100 provided at inline and branch locations of runners 30, as well as at the entrance to a mold cavity 250. FIG. 57 shows flow diverters provided at various locations within a hot runner system 300, including within a hot runner manifold (of the single mold type or stack mold type) at inline or branch locations. Also, such flow diverters 100 can be provided at an entrance to a nozzle, hot drop, nozzle tip or valve gate.

Adjustments in hot runners could be provided by a similar means or structure, but with designs that result in more streamlined flow paths that minimize low, or stagnant, flow regions that could result in degradation of the melt or provide for flushing of stagnant regions.

Additionally, adjustment in hot runner systems could result from replacing removable tip inserts containing melt rotation geometry designed to provide desirable rotation of the melt stream. Though easily replaceable tip inserts are commonly used in hot nozzles, as shown by tip inserts 1200, 1200', 1200'', 1200''', and 1200'''' in FIG. 58, they have not been designed or specifically positioned to provide desirable rotation of the melt. Instead, such nozzle tips are commonly randomly oriented in the hot runner system.

Figure 59:
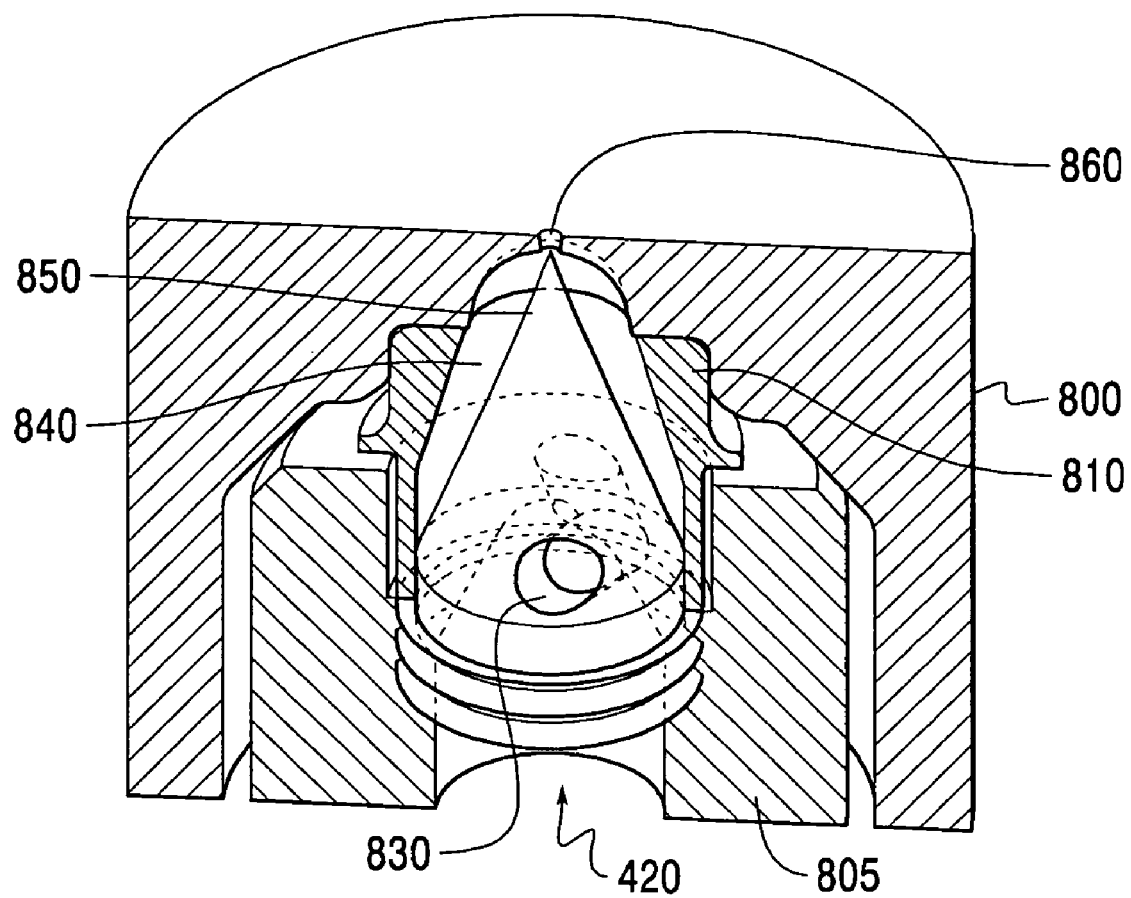
FIG. 59 is a cross-sectional view of a first exemplary nozzle tip for a hot runner system capable of desired repositioning of asymmetric melt conditions.
Figure 60:
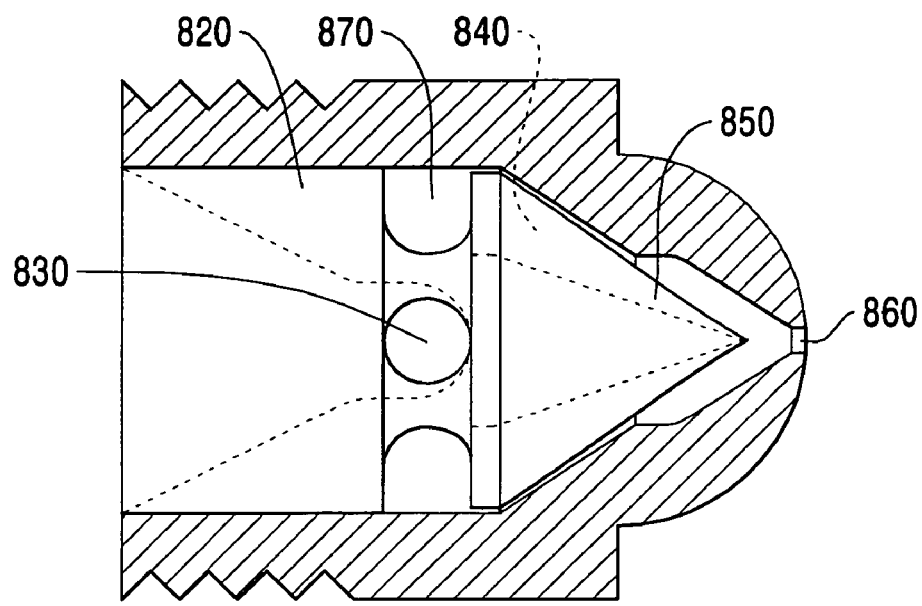
FIG. 60 is a cross-sectional view of a second exemplary nozzle tip for a hot runner system capable of desired repositioning of non-homogeneous melt conditions.
Figure 61:
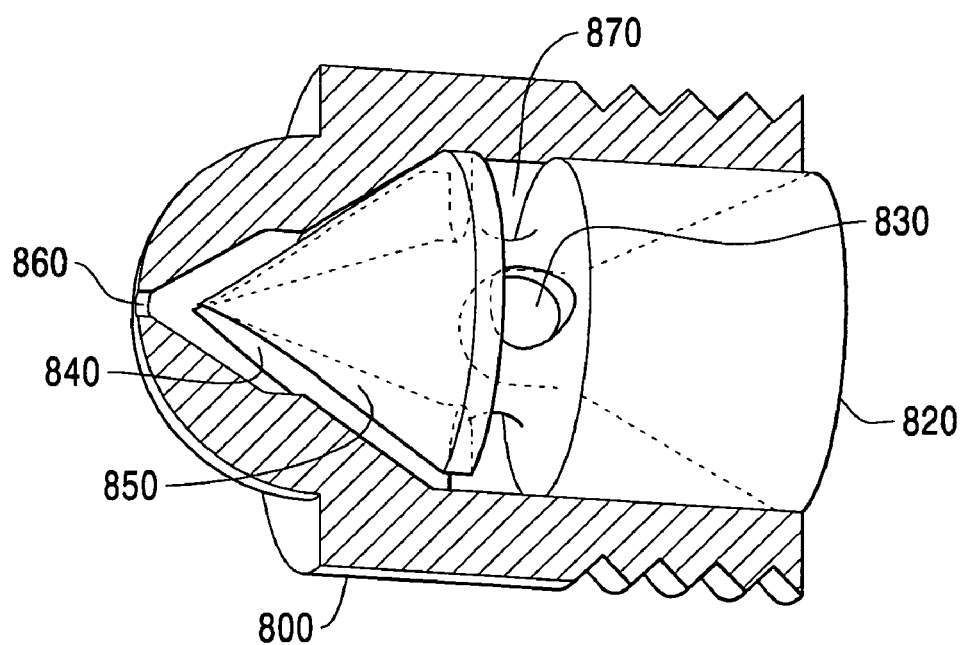
FIG. 61 is a side cross-sectional view of the nozzle tip of FIG. 59.

FIGS. 59-61 show several varieties of nozzle tip designs which, when strategically positioned relative to incoming non-homogeneous melt conditions, can be used to control the repositioning of the melt to a desired position. Additionally, the specific geometry or offset can be modified to achieve a desirable melt rotation. FIG. 59 shows a first exemplary hot nozzle tip insert 850 that may include a sub-insert 810. Nozzle tip assembly 810 and 850 are attached to the downstream end of the nozzle body 805, which extends through mold plate 800. Incoming non-homogeneous melt conditions enter lower chamber 820 and feed through an internal branching chamber 830 that exits on opposite sides (out of the paper and into the paper in the view shown) into a chamber 840 defined between insert walls 800 and a conical nozzle tip 850. The branching of the flow results in a certain elevational change and an associated melt rotation. By control of this branching, or offset in geometry from a centroid of the nozzle tip, a predetermined fluid repositioning can occur so fluid exiting a tip 860 can have a managed melt condition as it exits the nozzle tip for a desired effect. Control may also be achieved by the relative rotation of the nozzle tip relative to the incoming fluid stream.

FIGS. 60-61 show a second exemplary hot nozzle tip insert 850 of a different type. In this example, incoming melt enters chamber 820 and feeds through internal branching 830 and exits on opposite sides into an annular chamber 870. From chamber 870, the melt flows into chamber 840 defined between nozzle insert walls and a conical nozzle tip 850. From chamber 840, the melt exits tip 860. FIGS. 59-61 are similar to the technology in U.S. Pat. No. 6,503,438 to Beaumont et al. and achieve a recombination of melt along multiple axes. For example, if the incoming melt were coming straight from the sprue, with no branches and symmetry to the melt conditions at the entrance to chamber 820, the melt would split and recombine similar to FIG. 44.

Dynamic control of melt rotation in a hot runner system could be provided in the hot nozzle of the hot runner system by using an adjustable pin whose adjustment could be the radial, linear or combination of radial and linear positioning of the pin. The pin could be similar to linearly movable pins commonly used in mechanically actuated valve gated hot runner nozzles. A melt repositioning device could be defined within the pin or between the pin and the flow channel walls of the hot nozzle in which the pin is inserted. Movement of the pin would result in the modification of the flow channel geometry, or positioning of the flow channel geometry, resulting in the repositioning of asymmetric melt conditions to a desirable position. Adjustment could occur at the nozzle tip or anywhere along the length of the nozzle. The adjustment can be achieved through a manually operated actuator mechanism or a machine-driven actuator mechanism. Adjustment could occur as melt is traveling through the runner system to the part forming cavity.

The invention is not limited to use with hot or cold runner molds as used with thermoplastic injection. The invention could be used with any solidifying or non-solidifying runner mold with any laminar flowing material capable of developing non-homogeneous melt conditions across a flow channel. Additionally, the invention could be used with any other plastic process equipment or process including extrusion or blow molding where non-homogeneous melt conditions can develop across a flow channel. Further, the invention could be used with any non-plastics processes or equipment where it may be desirable to adjustably control the distribution of non-homogeneous fluid conditions across a steam of laminar flowing fluid.

The invention has been described with reference to several preferred embodiments, but these embodiments are illustrative and non-limiting. Various modifications, substitutes and/or improvements may be possible within the spirit and scope of the invention.

What is claimed is:

1. A method of adjustably controlling the position of non-homogeneous conditions that occur across a stream of laminar flowing material that flows at a first level in at least one flow path of a tool, comprising:

providing within at least one flow path of the tool an adjustable flow diverter device having a flow geometry that is adjustable in situ within a body of the tool to reposition the non-homogeneous conditions of the laminar flowing material to desired positions within the cross section of the flow path downstream of the adjustable flow diverter device; the adjustable flow diverter device including a first flow path portion and a second flow path portion; the first flow path portion having an interconnecting area and the second flow path portion having an interconnecting area; a third flow path portion connecting the interconnecting area of the first flow path portion and the interconnecting area of the second flow path portion, the third flow path portion having a structure which enables it to interconnect some or substantially the entire stream of laminar flowing material to and/or from a second flow level that is different from the flow level of at least one of the first and second flow path portions; and the flow geometry of the adjustable flow diverter device being adjustable in situ by moving the third flow path portion to one of multiple positions with respect to one of the interconnecting areas to adjust the flow geometry of the diverter device to reposition the non-homogeneous conditions;

flowing a stream of laminar flowing material in the flow path in which the adjustable flow diverter device is located so that non-homogeneous melt conditions occur across laminates of the stream; and adjusting the flow geometry of the adjustable flow diverter device in situ within the tool body so that the non-homogeneous conditions of the laminar flowing material are repositioned to the desired positions within the cross section of the flow path of the tool.

2. A method according to claim 1 wherein the first flow path portion has an interconnecting area at about one end of the first flow path portion and the second flow path portion has an interconnecting area at about one end of the second flow path portion; the third flow path portion is rotatable, and the flow geometry of the adjustable flow diverter device is adjusted by rotating the rotatable flow path portion to one of multiple positions with respect to the interconnecting area of the first flow path portion and to one of multiple portions with respect to the interconnecting area of the second flow path portion to reposition the non-homogeneous conditions of the flowing material.

3. A method according to claim 1 wherein the third flow path portion is rotatable; the flow geometry of the adjustable flow diverter device is adjusted by rotating the rotatable flow path portion to one of multiple positions with respect to the interconnecting area of the first flow path portion and to one of multiple portions with respect to the interconnecting area of the second flow path portion to adjust the flow geometry of the diverter device to reposition the non-homogeneous conditions of the flowing material; and one of the flow path portions at the intersection of the interconnecting area of the first flow path portion with the rotatable flow path portion has a first divergent flow path area and one of the flow paths at the intersection of the interconnecting area of the second flow path portion and the rotatable flow path portion has a second divergent flow path area.

4. A method according to claim 3 wherein the first divergent flow path is located on the interconnecting area of the first flow path portion and the second divergent flow path is located on the interconnecting area of the second flow path portion.

5. A method according to claim 3 wherein the first divergent flow path has a substantially arcuate shape and is located on the interconnecting area of the first flow path portion and the second divergent flow path has a substantially arcuate shape and is located on the interconnecting area of the second flow path portion.

6. A method according to claim 1 wherein the third flow path portion is rotatable and the method includes rotating the rotatable flow path portion to one of its multiple positions with respect to the interconnecting area of the first flow path to adjust the flow geometry of the diverter device to reposition the non-homogeneous conditions of the flowing material in a circumferential direction; and one of the flow path portions at the intersection of the interconnecting area of the first flow path portion with the rotatable flow path portion has a divergent flow path with respect to that flow path portion.

7. A method according to claim 6 wherein the divergent flow path is located on the first flow path portion.

8. A method according to claim 6 wherein the first divergent flow path has an approximately arcuate shape and is located on the first flow path portion.

9. A method according to claim 1 wherein the first flow path portion and the second flow path portion each have a flow path that splits into two branching flow path portions, each branching flow path portion having an interconnecting area at about one end of that branching flow path portion; the third flow path portion comprising a pair of rotatable flow path portions, each rotatable flow path portion connecting an interconnecting area of one of the branching flow path portions of the first flow path portion and an interconnecting area of a branching flow path portion of the second flow path portion; rotating each rotatable flow path portion to one of its multiple positions with respect to the interconnecting areas of the branching flow path portions of the first flow path portion and the second flow path portion that it intersects to adjust the flow geometry of the diverter device to reposition the non-homogeneous conditions of the flowing material, as the stream of laminar flowing material flows through the second flow level.

10. A method according to claim 1 wherein the first flow path portion and the second flow path portion each has a flow path that splits into two branching flow path portions, each branching flow path portion having an interconnecting area at about one end of that branching flow path portion; the third flow path portion comprises a pair of rotatable flow path portions, each rotatable flow path portion connecting an interconnecting area of one of the branching flow path portions of the first flow path portion and an interconnecting area of one of the branching flow path portions of the second flow path portion; rotating each rotatable flow path portion to one of its multiple positions with respect to the interconnecting areas of the branching flow path portions of the first flow path portion and the second flow path portion that it intersects to adjust the flow geometry of the diverter device to reposition the non-homogeneous conditions of the flowing material as the stream of laminar flowing material flows through the second flow level; a divergent flow path on one of the flow path portions at the intersection of each rotatable flow path portion with an interconnecting area of one of the branching flow path portions of the first flow path portion; and a divergent flow path on one of the flow path portions at the intersection of each rotatable flow path portion with an interconnecting area of one of the branching flow path portions of the second flow path portion.

11. A method according to claim 10 wherein the divergent flow paths at the intersection of each rotatable flow path portion with an interconnecting area of a branch of the first flow path portion are on the branch of the first flow path portion and the divergent flow paths at the intersection of each rotatable flow path portion with an interconnecting area of a branch of the second flow path portion are on the second flow path portion.

12. A method according to claim 10 wherein each interconnecting area has an approximately arcuate shape.

13. A method according to claim 1 wherein the first flow path portion has a flow path that has an interconnecting area at about one end of the first flow path portion; the third flow path portion comprises a movable flow path portion that moves in a direction substantially perpendicular to the flow path of the first flow path portion; the movable flow path portion connecting the interconnecting area of the first flow path portion with the second flow path portion; moving the movable flow path portion to one of multiple positions with respect to the interconnecting area of the first flow path portion to adjust the flow geometry of the diverter device to reposition the non-homogeneous conditions of the flow material as the stream of laminar flowing material flows through the second flow level.

14. A method according to claim 1 wherein the first flow path portion has a flow path that splits into two branching flow path portions and each branching flow path portion has an interconnecting area at about one end of that branching flow path portion; the third flow path portion comprises a movable flow path portion that moves in a direction substantially perpendicular to the flow path of the first flow path portion; the movable flow path portion connecting the interconnecting areas of the branching flow path portions with the second flow path portion; the movable flow path portion being movable to multiple positions with respect to the interconnecting areas of the branching flow path portions of the first flow path portion to adjust the flow geometry of the diverter device to reposition the non-homogeneous conditions of the flowing material as the stream of laminar flowing material flows through the second flow level.

15. A method according to claim 1 in which the adjustable flow diverter device is located in line with the at least one flow path and is adjustable to split at least some of the stream of laminar flowing material into two repositioning flow paths, each of which is constructed to reposition the non-homogeneous melt conditions; the third flow path portion includes an in-line flow path that is in line with the at least one flow path, with the adjustable flow diverter device constructed to merge the in-line flow path with the two repositioning flow paths into a downstream flow path to adjust the distribution of non-homogeneous melt conditions; and the third flow path portion is adjustable to direct at least some of the stream of laminar flowing material to the in-line flow path.

16. A method accordingly to claim 1 wherein the adjustable flow diverter device is located in line with the at least one flow path and can split at least some of the stream of laminar flowing material into two separable streams of laminar flowing material that are recombined downstream into repositioned non-homogeneous melt conditions; the third flow path portion including a vertically adjustable pin; and the method includes adjusting the pin to control the repositioning of the non-homogeneous melt conditions to a desired position.

17. A method according to claim 1 wherein the adjustable flow diverter is located in line of the at least one flow path and splits at least some of the stream of laminar flowing material into two separate streams that are recombined downstream to form repositioned, non-homogeneous melt conditions; and the third flow path portion being adjustable to enable at least some of the stream of laminar flowing material to pass in line with the at least one flow path without being split to control the repositioning of the non-homogeneous melt conditions to desired positions.

18. A method according to claim 1 wherein the adjustable flow diverter device is located in line with the at least one flow path and includes a vertically adjustable pin that can split at least some of the stream of laminar flowing material into two separated streams of laminar flowing material and can cause the two separated streams to flow to a second flow level and to be recombined downstream into repositioned non-homogeneous melt conditions; and vertically adjusting the adjustable pin to control the repositioning of the non-homogeneous melt conditions to a desired position.

19. A method according to claim 1 wherein the adjustable flow diverter device includes a controller actuator that provides a closed loop automatic adjustment of the adjustable flow geometry of the diverter device or a controller actuator that allows for an open loop adjustment of the adjustable flow geometry of the diverter device and the flow geometry of the adjustable flow diverter device is adjusted by operation of the controller actuator.

20. A method according to claim 1 in which the adjustable flow diverter device includes a manually operable actuator and the flow geometry of the diverter device is adjusted through the use of the manually operable actuator.

21. A method according to claim 1 in which the adjustable flow diverter device includes a machine driven actuator and the flow geometry of the diverter device is adjusted by the operation of the machine.

22. A method according to claim 1 in which the adjustable flow diverter device includes an actuator comprising a pneumatic, hydraulic, mechanical or electrical mechanism attached to the adjustable flow geometry of the diverter device and the flow geometry is adjusted by operation of the mechanism.

23. A method according to claim 1 in which the adjustable flow diverter includes an actuator that adjusts the adjustable flow geometry over time to change the repositioning of the non-homogeneous conditions while material is flowing.

24. A method according to claim 1 that includes one or more pressure transducers or thermocouples located at various positions along the flow path to sense fluid pressure or temperature variations, respectively, along the flow path and flow geometry is adjusted over time in response to fluid pressure variations or temperature variations to change the fluid flow repositioning while material is flowing.

25. A method according to claim 1 wherein the adjustable flow diverter device includes a controller actuator that provides a closed loop adjustment of the adjustable flow geometry of the diverter device or a controller that allows for an open loop adjustment of the adjustable flow geometry of the diverter device, either controller actuator being operable in response to one or more pressure or mold process timing or temperature signals to adjust the flow front of the stream of laminar flowing material.

26. A method according to claim 1 wherein the tool is a hot runner mold.

27. A method according to claim 1 wherein the tool is a hot runner mold and the tool is constructed to locate the adjustable flow diverter device in at least one manifold, hot nozzle, hot drop or valve gate.

28. A tool including an adjustable flow diverter device for controlling non-homogeneous melt conditions which occur in a direction across the flow path of laminates of a stream of laminar flowing material, comprising:
  a tool body having at least one product forming cavity and at least one flow path through which a stream of laminar flowing material flows to fill the at least one product forming area; and
  an adjustable flow diverter device located in at least a portion of the at least one flow path and in line of the at least one flow path and including a first component having a discontinuous flow directing section with a discontinuous divergent path and a second component having a flow channel portion that connects the discontinuous flow directing section with a downstream flow path, the second component being relatively rotatable in situ relative to the first component to precisely reposition the non-homogeneous conditions of laminar flowing material in a circumferential direction to a position having a desired asymmetrical or symmetrical melt condition relative to a downstream branching runner or the at least one product forming area.

29. The tool according to claim 28, wherein the discontinuous flow directing section has a branching Y path.

30. The tool according to claim 28, wherein the discontinuous flow directing section includes at least two divergent paths.

31. The tool according to claim 28, wherein the discontinuous flow directing section includes at least one branch.

32. The tool according to claim 28, wherein the adjustable flow diverter is located inline of the runner and splits the stream of laminar flowing material into two separated streams that are recombined downstream into a repositioned non-homogeneous melt condition, the adjustable flow diverter controlling the repositioning to a desired position.

33. The tool according to claim 32, wherein the adjustable flow diverter is configured to enable at least some of the stream of laminar flowing material to pass through the adjustable inline flow diverter without being split.

34. A method of adjusting the rotational positioning in the circumferential direction of multiple streams of laminar flowing fluid, comprising:
- positioning non-homogeneous melt conditions within the individual streams of laminar flowing material toward a desirable position by directing the fluid through an adjustable flow diverter device;
- recombining the melt streams into a single melt stream; and
- adjusting the flow geometry of the flow diverter device in situ to achieve a desirable non-homogeneous melt distribution within the combined streams of laminar flowing fluid as a result of relative movement or replacement of a portion of the flow diverter device to directly control the amount of rotation occurring in the circumferential direction within one or more of the streams of laminar flowing fluid.

35. A tool including an adjustable flow diverter device for controlling non-homogeneous conditions which occur in a direction across a flow path of laminates of a stream of laminar flowing material, comprising:
- at least one flow path through which a stream of laminar flowing material flows at a first flow level; and
- an adjustable flow diverter device located in at least a portion of the at least one flow path in which the non-homogeneous conditions occur across the stream of laminar flowing material, the adjustable flow diverter device including a first flow path portion and a second flow path portion; the first flow path portion having an interconnecting area and the second flow path portion having an interconnecting area; a third flow path portion connecting the interconnecting area of the first flow path portion and the interconnecting area of the second flow path portion, the third flow path portion having a structure which enables it to interconnect some or substantially the entire stream of laminar flowing material to and/or from a second flow level that is different from the flow level of at least one of the first and second flow path positions, the third flow path portion being adjustable in situ with respect to at least one of the interconnecting areas to adjust the flow path geometry of the diverter device to reposition the non-homogeneous conditions of the laminar flowing material in a circumferential direction to desired positions having a desired asymmetrical or symmetrical melt conditions on a cross section of a flow path downstream of the adjustable flow diverter device.

36. A tool according to claim 35 wherein the first flow path portion has an interconnecting area at about one end of the first flow path portion and the second flow path portion has an interconnecting area at about one end of the second flow path portion; the third flow path portion connecting the interconnecting area of the first flow path portion and the interconnecting area of the second flow path portion; the third flow path portion being rotatable to multiple positions with respect to at least one of the interconnecting areas to adjust the flow geometry of the diverter device to reposition the non-homogeneous conditions of the flowing material in a circumferential direction.

37. A tool according to claim 35 wherein the first flow path portion has an interconnecting area and the second flow path portion has an interconnecting area; the third flow path portion connecting the interconnecting area of the first flow path portion and the interconnecting area of the second flow path portion; the third flow path portion being rotatable to multiple positions with respect to the interconnecting area of the first flow path portion and to multiple positions with respect to the interconnecting area of the second flow path portion to adjust the flow geometry of the diverter device to reposition the non-homogeneous conditions of the flowing material in a circumferential direction.

38. A tool according to claim 35 wherein the first flow path portion has an interconnecting area and the second flow path portion has an interconnecting area; the third flow path portion connecting the interconnecting area of the first flow path portion and the interconnecting area of the second flow path portion; the third flow path portion being rotatable to multiple positions with respect to the interconnecting area of the first flow path portion and to multiple portions with respect to the interconnecting area of the second flow path portion to adjust the flow geometry of the diverter device to reposition the non-homogeneous conditions of the flowing material in a circumferential direction; one of the flow path portions at the intersection of the interconnecting area of the first flow path portion with the rotatable flow path portion having a first divergent flow path area, and one of the flow paths at the intersection of the interconnecting area of the second flow path portion and the rotatable flow path portion having a second divergent flow path area.

39. A tool according to claim 38 wherein the first divergent flow path is located on the interconnecting area of the first flow path portion and the second divergent flow path is located on the interconnecting area of the second flow path portion.

40. A tool according to claim 38 wherein the first divergent flow path has a substantially arcuate shape and is located on the interconnecting area of the first flow path portion and the second divergent flow path has a substantially arcuate shape and is located on the interconnecting area of the second flow path portion.

41. A tool according to claim 35, wherein the third flow path portion is rotatable to multiple positions with respect to the interconnecting area of the first flow path portion to adjust the flow geometry of the diverter device to reposition the non-homogeneous conditions of the flowing material in a circumferential direction, one of the flow path portions at the intersection of the interconnecting area of the first flow path portion with the third flow path portion having a divergent flow path with respect to that flow path portion.

42. A tool according to claim 41 wherein the divergent flow path is located on the first flow path portion.

43. A tool according to claim 41 wherein the divergent flow path has an approximately arcuate shape and is located on the first flow path portion.

44. A tool according to claim 35 wherein the first flow path portion and the second flow path portion each have a flow path that splits into two branching flow path portions, each branching flow path portion having an interconnecting area; the third flow path portion comprising a pair of rotatable flow path portions, each rotatable flow path portion connecting an interconnecting area of one of the branching flow path portions of the first flow path portion and an interconnecting area of one of the branching flow path portions of the second flow path portion; each rotatable flow path portion being rotatable to multiple positions with respect to the interconnecting areas of the branching flow path portions of the first flow path portion and the second flow path portion that it intersects to adjust the flow geometry of the diverter device to reposition the non-homogeneous conditions of the flowing material as the stream of laminar flowing material flows through the second flow level.

45. A tool according to claim wherein the first flow path portion and the second flow path portion each have a flow path that splits into two branching flow path portions, each branching flow path portion having an interconnecting area at about one end of that branching flow path portion; the third flow path portion comprising a pair of rotatable flow path portions, each rotatable flow path portion connecting an interconnecting area of one of the branching flow path portions of the first flow path portion and an interconnecting area of one of the branching flow path portions of the second flow path portion; each rotatable flow path portion being rotatable to multiple positions with respect to the interconnecting areas of the branching flow path portions of the first flow path portion and the second flow path portion that it intersects to adjust the flow geometry of the diverter device to reposition the non-homogeneous conditions of the flowing material as the stream of laminar flowing material flows through the second flow level; a divergent flow path on one of the flow path portions at the intersection of each rotatable flow path portion with an interconnecting area of one of the branching flow path portions of the first flow path portion; and a divergent flow path on one of the flow path portions at the intersection of each rotatable flow path portion with an interconnecting area of one of the branching flow path portions of the second flow path portion.

46. A tool according to claim 45 wherein the divergent flow paths at the intersection of each rotatable flow path portion with an interconnecting area of a branch of the first flow path portion are on the branch of the first flow path portion and the divergent flow paths at the intersection of each rotatable flow path portion with an interconnecting area of a branch of the second flow path portion are on the second flow path portion.

47. A tool according to claim 45 wherein each interconnecting area has an approximately arcuate shape.

48. A tool according to claim 35 wherein the first flow path portion has a flow path that has an interconnecting area at about one end of the first flow path portion; the third flow path portion comprises a movable flow path portion that moves in a direction substantially perpendicular to the flow path of the first flow path portion; the movable flow path portion connecting the interconnecting area of the first flow path portion with the second flow path portion; the movable flow path portion being movable to multiple positions with respect to the interconnecting area of the first flow path portion to adjust the flow geometry of the diverter device to reposition the non-homogeneous conditions of the flow material as the stream of laminar flowing material flows through the second flow level.

49. A tool according to claim 35 wherein the first flow path portion has a flow path that splits into two branching flow path portions, each branching flow path portion having an interconnecting area at about one end of that branching flow path portion; the third flow path portion comprises a movable flow path portion that moves in a direction substantially perpendicular to the flow path of the first flow path portion; the movable flow path portion connecting the interconnecting areas of the branching flow path portions with the second flow path portion; the movable flow path portion being movable to multiple positions with respect to the interconnecting areas of the branching flow path portions of the first flow path portion to adjust the flow geometry of the diverter device to reposition the non-homogeneous conditions of the flowing material as the stream of laminar flowing material flows through the second flow level.

50. A tool according to claim 35 in which the adjustable flow diverter device is located in line with the at least one flow path and is adjustable to split at least some of the stream of laminar flowing material into two repositioning flow paths, each of which is constructed to reposition the non-homogeneous melt conditions; the third flow path portion includes an in-line flow path that is in line with the at least one flow path, is adjustable to direct at least some of the stream of laminar flowing material to the in-line flow path and is constructed to merge the in-line flow path with the two repositioning flow paths into a downstream flow path to adjust the distribution of non-homogeneous melt conditions.

51. A tool accordingly to claim 35 wherein the adjustable flow diverter device is located in line with the at least one flow path and can split at least some of the stream of laminar flowing material into two separable streams that are recombined downstream into repositioned non-homogeneous melt conditions, the third flow path portion including a pin that is adjustable vertically to control the repositioning of the non-homogeneous melt conditions to a desired position.

52. A tool according to claim 35 wherein the adjustable flow diverter is located in line of the at least one flow path and splits at least some of the stream of laminar flowing material into two separate streams that are recombined downstream to form repositioned non-homogeneous melt conditions, the third flow path portion being adjustable to enable at least some of the stream of laminar flowing material to pass in line with the at least one flow path without being split, the adjustable flow diverter controlling the repositioning to a desired position.

53. A tool according to claim 35 wherein the adjustable flow diverter device is located in line with the at least one flow path and includes a vertically adjustable pin that can split at least some of the stream of laminar flowing material into two separated streams and can cause the two separated streams to flow to a second flow level and to be recombined downstream into repositioned non-homogeneous melt conditions, the vertically adjustable pin controlling the repositioning of the non-homogeneous melt conditions to a desired position.

54. A tool according to claim 35 wherein the adjustable flow diverter device includes a controller actuator that provides a closed loop automatic adjustment of the adjustable flow geometry of the diverter device or a controller actuator that allows for an open loop adjustment of the adjustable flow geometry of the diverter device.

55. A tool according to claim 35 in which the adjustable flow diverter device includes a manually operable actuator to adjust the adjustable flow geometry of the diverter device.

56. A tool according to claim 35 in which the adjustable flow diverter device includes a machine driven actuator to adjust the adjustable flow geometry of the diverter device.

57. A tool according to claim 35 in which the adjustable flow diverter device includes an actuator comprising a pneumatic, hydraulic, mechanical or electrical mechanism to adjust the adjustable flow geometry of the diverter device.

58. A tool according to claim 35 in which the adjustable flow diverter includes an actuator that adjusts the adjustable flow geometry over time to change the repositioning of the non-homogeneous conditions while material is flowing.

59. A tool according to claim 35 that includes one or more pressure transducers or thermocouples located at various positions along the flow path to sense fluid pressure or temperature variations, respectively, along the flow path so as to enable the flow diverter device to adjust the adjustable flow geometry over time to change the fluid flow repositioning while material is flowing.

60. A tool according to claim 35 wherein the adjustable flow diverter device includes a controller actuator that provides a closed loop adjustment of the adjustable flow geometry of the diverter device or a controller that allows for an open loop adjustment of the adjustable flow geometry of the diverter device, either controller actuator being operable in response to one or more pressure or mold process timing or temperature signals to adjust the flow front of the stream of laminar flowing material.

61. A tool according to claim 35 wherein the tool is a hot runner mold.

62. A tool according to claim 35 wherein the tool is a hot runner mold and the adjustable flow diverter is located in at least one manifold, hot nozzle, hot drop or valve gate.

63. An insert for a tool having at least one flow path through which a stream of laminar flowing material flows at a first flow level, the insert comprising:
an adjustable flow diverter device located in at least a portion of the at least one flow path in which non-homogeneous conditions occur across the stream of laminar flowing material, the adjustable flow diverter device including a first flow path portion and a second flow path portion; the first flow path portion having an interconnecting area and the second flow path portion having an interconnecting area; a third flow path portion connecting the interconnecting area of the first flow path portion and the interconnecting area of the second flow path portion, the third flow path portion having a structure which enables it to interconnect some or substantially the entire stream of laminar flowing material to and/or from a second flow level that is different from the flow level of at least one of the first and second flow path positions, the third flow path portion being adjustable in situ with respect to at least one of the interconnecting areas to adjust the flow path geometry of the diverter device to reposition the non-homogeneous conditions of the laminar flowing material in a circumferential direction to desired positions having a desired asymmetrical or symmetrical melt conditions on a cross section of a flow path downstream of the adjustable flow diverter device.

64. An insert for a tool according to claim 63 wherein the first flow path portion has an interconnecting area at about one end of the first flow path portion and the second flow path portion has an interconnecting area at about one end of the second flow path portion; the third flow path portion connecting the interconnecting area of the first flow path portion and the interconnecting area of the second flow path portion; the third flow path portion being rotatable to multiple positions with respect to at least one of the interconnecting areas to adjust the flow geometry of the diverter device to reposition the non-homogeneous conditions of the flowing material in a circumferential direction.

65. An insert for a tool according to claim 63 wherein the first flow path portion has an interconnecting area and the second flow path portion has an interconnecting area; the third flow path portion connecting the interconnecting area of the first flow path portion and the interconnecting area of the second flow path portion: the third flow path portion being rotatable to multiple positions with respect to the interconnecting area of the first flow path portion and to multiple positions with respect to the interconnecting area of the second flow path portion to adjust the flow geometry of the diverter device to reposition the non-homogeneous conditions of the flowing material in a circumferential direction.

66. An insert for a tool according to claim 63 wherein the first flow path portion has an interconnecting area and the second flow path portion has an interconnecting area; the third flow path portion connecting the interconnecting area of the first flow path portion and the interconnecting area of the second flow path portion; the third flow path portion being rotatable to multiple positions with respect to the interconnecting area of the first flow path portion and to multiple portions with respect to the interconnecting area of the second flow path portion to adjust the flow geometry of the diverter device to reposition the non-homogeneous conditions of the flowing material in a circumferential direction; one of the flow path portions at the intersection of the interconnecting area of the first flow path portion with the rotatable flow path portion having a first divergent flow path area, and one of the flow paths at the intersection of the interconnecting area of the second flow path portion and the rotatable flow path portion having a second divergent flow path area.

67. An insert for a tool according to claim 66 wherein the first divergent flow path is located on the interconnecting area of the first flow path portion and the second divergent flow path is located on the interconnecting area of the second flow path portion.

68. An insert for a tool according to claim 66 wherein the first divergent flow path has a substantially arcuate shape and is located on the interconnecting area of the first flow path portion and the second divergent flow path has a substantially arcuate shape and is located on the interconnecting area of the second flow path portion.

69. An insert for a tool according to claim 63, wherein the third flow path portion is rotatable to multiple positions with respect to the interconnecting area of the first flow path portion to adjust the flow geometry of the diverter device to reposition the non-homogeneous conditions of the flowing material in a circumferential direction, one of the flow path portions at the intersection of the interconnecting area of the first flow path portion with the third flow path portion having a divergent flow path with respect to that flow path portion.

70. An insert for a tool according to claim 69 wherein the divergent flow path is located on the first flow path portion.

71. An insert for a tool according to claim 69 wherein the divergent flow path has an approximately arcuate shape and is located on the first flow path portion.

72. An insert for a tool according to claim 63 wherein the first flow path portion and the second flow path portion each have a flow path that splits into two branching flow path portions, each branching flow path portion having an interconnecting area; the third flow path portion comprising a pair of rotatable flow path portions, each rotatable flow path portion connecting an interconnecting area of one of the branching flow path portions of the first flow path portion and an interconnecting area of one of the branching flow path portions of the second flow path portion; each rotatable flow path portion being rotatable to multiple positions with respect to the interconnecting areas of the branching flow path portions of the first flow path portion and the second flow path portion that it intersects to adjust the flow geometry of the diverter device to reposition the non-homogeneous conditions of the flowing material as the stream of laminar flowing material flows through the second flow level.

73. An insert for a tool according to claim 63 wherein the first flow path portion and the second flow path portion each have a flow path that splits into two branching flow path portions, each branching flow path portion having an interconnecting area at about one end of that branching flow path portion; the third flow path portion comprising a pair of rotatable flow path portions, each rotatable flow path portion connecting an interconnecting area of one of the branching flow path portions of the first flow path portion and an interconnecting area of one of the branching flow path portions of the second flow path portion: each rotatable flow path portion being rotatable to multiple positions with respect to the interconnecting areas of the branching flow path portions of the first flow path portion and the second flow path portion that it intersects to adjust the flow geometry of the diverter device to reposition the non-homogeneous conditions of the flowing material as the stream of laminar flowing material flows through the second flow level; a divergent flow path on one of the flow path portions at the intersection of each rotatable flow path portion with an interconnecting area of one of the branching flow path portions of the first flow path portion; and a divergent flow path on one of the flow path portions at the intersection of each rotatable flow path portion with an interconnecting area of one of the branching flow path portions of the second flow path portion.

74. An insert for a tool according to claim 73 wherein the divergent flow paths at the intersection of each rotatable flow path portion with an interconnecting area of a branch of the first flow path portion are on the branch of the first flow path portion and the divergent flow paths at the intersection of each rotatable flow path portion with an interconnecting area of a branch of the second flow path portion are on the second flow path portion.

75. An insert for a tool according to claim 73 wherein each interconnecting area has an approximately arcuate shape.

76. An insert for a tool according to claim 63 wherein the first flow path portion has a flow path that has an interconnecting area at about one end of the first flow path portion; the third flow path portion comprises a movable flow path portion that moves in a direction substantially perpendicular to the flow path of the first flow path portion; the movable flow path portion connecting the interconnecting area of the first flow path portion with the second flow path portion; the movable flow path portion being movable to multiple positions with respect to the interconnecting area of the first flow path portion to adjust the flow geometry of the diverter device to reposition the non-homogeneous conditions of the flow material as the stream of laminar flowing material flows through the second flow level.

77. An insert for a tool according to claim 63 wherein the first flow path portion has a flow path that splits into two branching flow path portions, each branching flow path portion having an interconnecting area at about one end of that branching flow path portion; the third flow path portion comprises a movable flow path portion that moves in a direction substantially perpendicular to the flow path of the first flow path portion; the movable flow path portion connecting the interconnecting areas of the branching flow path portions with the second flow path portion; the movable flow path portion being movable to multiple positions with respect to the interconnecting areas of the branching flow path portions of the first flow path portion to adjust the flow geometry of the diverter device to reposition the non-homogeneous conditions of the flowing material as the stream of laminar flowing material flows through the second flow level.

78. An insert for a tool according to claim 63 in which the adjustable flow diverter device is located in line with the at least one flow path and is adjustable to split at least some of the stream of laminar flowing material into two repositioning flow paths, each of which is constructed to reposition the non-homogeneous melt conditions; the third flow path portion includes an in-line flow path that is in line with the at least one flow path, is adjustable to direct at least some of the stream of laminar flowing material to the in-line flow path and is constructed to merge the in-line flow path with the two repositioning flow paths into a downstream flow path to adjust the distribution of non-homogeneous melt conditions.

79. An insert for a tool accordingly to claim 63 wherein the adjustable flow diverter device is located in line with the at least one flow path and can split at least some of the stream of laminar flowing material into two separable streams that are recombined downstream into repositioned non-homogeneous melt conditions, the third flow path portion including a pin that is adjustable vertically to control the repositioning of the non-homogeneous melt conditions to a desired position.

80. An insert for a tool according to claim 63 wherein the adjustable flow diverter is located in line of the at least one flow path and splits at least some of the stream of laminar flowing material into two separate streams that are recombined downstream to form repositioned non-homogeneous melt conditions, the third flow path portion being adjustable to enable at least some of the stream of laminar flowing material to pass in line with the at least one flow path without being split, the adjustable flow diverter controlling the repositioning to a desired position.

81. An insert for a tool according to claim 63 wherein the adjustable flow diverter device is located in line with the at least one flow path and includes a vertically adjustable pin that can split at least some of the stream of laminar flowing material into two separated streams and can cause the two separated streams to flow to a second flow level and to be recombined downstream into repositioned non-homogeneous melt conditions, the vertically adjustable pin controlling the repositioning of the non-homogeneous melt conditions to a desired position.

82. An insert for a tool according to claim 63 wherein the adjustable flow diverter device includes a controller actuator that provides a closed loop automatic adjustment of the adjustable flow geometry of the diverter device or a controller actuator that allows for an open loop adjustment of the adjustable flow geometry of the diverter device.

83. An insert for a tool according to claim 63 in which the adjustable flow diverter device includes a manually operable actuator to adjust the adjustable flow geometry of the diverter device.

84. An insert for a tool according to claim 63 in which the adjustable flow diverter device includes a machine driven actuator to adjust the adjustable flow geometry of the diverter device.

85. An insert for a tool according to claim 63 in which the adjustable flow diverter device includes an actuator comprising a pneumatic, hydraulic, mechanical or electrical mechanism to adjust the adjustable flow geometry of the diverter device.

86. An insert for a tool according to claim 63 in which the adjustable flow diverter includes an actuator that adjusts the adjustable flow geometry over time to change the repositioning of the non-homogeneous conditions while material is flowing.

87. An insert for a tool according to claim 63 that includes one or more pressure transducers or thermocouples located at various positions along the flow path to sense fluid pressure or temperature variations, respectively, along the flow path so as to enable the flow diverter device to adjust the adjustable flow geometry over time to change the fluid flow repositioning while material is flowing.

88. An insert for a tool according to claim 63 wherein the adjustable flow diverter device includes a controller actuator that provides a closed loop adjustment of the adjustable flow geometry of the diverter device or a controller that allows for an open loop adjustment of the adjustable flow geometry of the diverter device, either controller actuator being operable in response to one or more pressure or mold process timing or temperature signals to adjust the flow front of the stream of laminar flowing material.

89. An insert for a tool according to claim 63 wherein the tool is a hot runner mold.

90. An insert for a tool according to claim 63 wherein the tool is a hot runner mold and the adjustable flow diverter is located in at least one manifold, hot nozzle, hot drop or valve gate.

* * * * *